United States Patent
Prater et al.

(10) Patent No.: US 7,770,231 B2
(45) Date of Patent: Aug. 3, 2010

(54) FAST-SCANNING SPM AND METHOD OF OPERATING SAME

(75) Inventors: Craig Prater, Goleta, CA (US); Chanmin Su, Ventura, CA (US); Nghi Phan, Santa Barbara, CA (US); Jeffrey M. Markakis, Santa Barbara, CA (US); Craig Cusworth, Redding, CA (US); Jian Shi, Goleta, CA (US); Johannes H. Kindt, Santa Barbara, CA (US); Steven F. Nagle, Santa Barbara, CA (US); Wenjun Fan, Oxnard, CA (US)

(73) Assignee: Veeco Instruments, Inc., Plainview, NY (US)

( * ) Notice: Subject to any disclaimer, the term of this patent is extended or adjusted under 35 U.S.C. 154(b) by 149 days.

(21) Appl. No.: 11/832,881

(22) Filed: Aug. 2, 2007

(65) Prior Publication Data
US 2009/0032706 A1 Feb. 5, 2009

(51) Int. Cl.
*G01N 23/00* (2006.01)
(52) U.S. Cl. ............ 850/6; 850/1; 850/5; 850/33; 850/53; 250/306; 250/307
(58) Field of Classification Search .......... 250/306, 250/307; 850/1, 3, 5, 6, 21, 33, 52, 53, 56, 850/60, 61, 62, 63; 73/105
See application file for complete search history.

(56) References Cited

U.S. PATENT DOCUMENTS

| | | |
|---|---|---|
| 5,266,801 A | 11/1993 | Elings et al. |
| RE34,489 E | 12/1993 | Hansma et al. |
| 5,388,452 A | 2/1995 | Harp et al. |
| 5,412,980 A | 5/1995 | Elings et al. |
| 5,681,987 A * | 10/1997 | Gamble ............... 73/105 |
| 6,032,518 A * | 3/2000 | Prater et al. .......... 73/105 |
| 6,297,502 B1 * | 10/2001 | Jarvis et al. .......... 850/7 |

(Continued)

FOREIGN PATENT DOCUMENTS

JP 08 122342 5/1996

(Continued)

OTHER PUBLICATIONS

S. Morita, H. Yamada, and T. Ando, Japan AFM roadmap 2006. Nanotechnol. 18:08401 (10 pages) (2007).

(Continued)

*Primary Examiner*—Bernard E Souw
*Assistant Examiner*—Michael J Logie
(74) *Attorney, Agent, or Firm*—Boyle Frederickson, S.C.

(57) ABSTRACT

A method and apparatus are provided that have the capability of rapidly scanning a large sample of arbitrary characteristics under force control feedback so has to obtain a high resolution image. The method includes generating relative scanning movement between a probe of the SPM and a sample to scan the probe through a scan range of at least 4 microns at a rate of at least 30 lines/sec and controlling probe-sample interaction with a force control slew rate of at least 1 mm/sec. A preferred SPM capable of achieving these results has a force controller having a force control bandwidth of at least closed loop bandwidth of at least 10 kHz.

26 Claims, 24 Drawing Sheets

U.S. PATENT DOCUMENTS

| | | | |
|---|---|---|---|
| 6,677,567 B2 * | 1/2004 | Hong et al. | 250/201.3 |
| 6,945,099 B1 * | 9/2005 | Su et al. | 73/105 |
| 6,945,100 B2 * | 9/2005 | Kwon et al. | 73/105 |
| 6,951,129 B2 * | 10/2005 | Kwon et al. | 73/105 |
| 7,013,717 B1 | 3/2006 | Struckmeier et al. | |
| 7,170,054 B2 | 1/2007 | Iyoki et al. | |
| 7,249,494 B2 * | 7/2007 | Hwang et al. | 73/105 |
| H2223 H * | 9/2008 | Brizzolara | 422/56 |
| 2001/0054691 A1 * | 12/2001 | Park et al. | 250/309 |
| 2005/0061970 A1 | 3/2005 | Knebel et al. | |
| 2005/0242283 A1 | 11/2005 | Hasegawa et al. | |
| 2006/0037379 A1 * | 2/2006 | Mancevski et al. | 73/1.89 |
| 2006/0097163 A1 * | 5/2006 | Hoen et al. | 250/309 |
| 2006/0112760 A1 | 6/2006 | Hansma et al. | |
| 2006/0113469 A1 * | 6/2006 | Baba et al. | 250/310 |
| 2006/0191329 A1 * | 8/2006 | Adderton et al. | 73/105 |
| 2006/0230474 A1 * | 10/2006 | Mininni et al. | 977/850 |
| 2006/0272398 A1 | 12/2006 | Hwang et al. | |
| 2006/0284083 A1 | 12/2006 | Kurenuma et al. | |
| 2007/0033991 A1 * | 2/2007 | Rice et al. | 73/105 |
| 2008/0055598 A1 * | 3/2008 | Haaheim | 356/399 |
| 2008/0223119 A1 | 9/2008 | Phan et al. | |

FOREIGN PATENT DOCUMENTS

| | | |
|---|---|---|
| WO | 0123939 A2 | 4/2001 |
| WO | 03/009305 | 1/2003 |

OTHER PUBLICATIONS

T. Uchihashi, H. Yamashita, and T. Ando, Fast Phase Imaging in Liquids Using a Rapid scan Atomic Force Microscope. Appl. Phys. Lett. 89, 213112 (3 pages) (2006).

N. Kodera, M. Sakashita, and T. Ando, A Dynamic PID Controller for High-Speed Atomic Force Microscopy. Rev. Sci. Instrum. 77(8): 083704 (7 pages) (2006).

H. Koide, T. Kinoshita, Y. Tanaka, S. Tanaka, N. Nagura, G. Meyer zu Hörste, A. Miyagi, and T. Ando, Identification of the Specific IQ Motif of Myosin V from which Calmodulin Dissociates in the Presence of Ca2+. Biochemistry 45(38): 11598-11604 (2006).

M. Yokokawa, C. Wada, T. Ando, N. Sakai, A. Yagi, S.H. Yoshimura and K. Takeyasu, Fast-Scanning Atomic Force Microscopy Reveals the ATP/ADP-Dependent Conformational Changes of GroEL. EMBO J. 25:4567-4576 (2006).

M. Yokokawa, S.H. Yoshimura, Y. Naito, T. Ando, A. Yagi, N. Sakai, K. Takeyasu, Fast-Scanning Atomic Force Microscopy Reveals the Molecular Mechanism of DNA Cleavage by Apalendonuclease. IEE Proc Nanobiotechnol. 153 (4):60-66 (2006).

T. Ando, T. Uchihashi, N. Kodera, A. Miyagi, R. Nakakita, H. Yamashita and M. Sakashita, High-speed Atomic Force Microscopy for Studying the Dynamic Behavior of Protein Molecules at Work. Jpn. J. Appl. Phys. 45(3B):1897-1903 (2006).

T. Uchihashi, N. Kodera, H. Itoh, H. Yamashita and T. Ando, Feedforward Control for High-Speed AFM Imaging of Biomolecules. Jpn. J. Appl. Phys. 45(3B):1904-1908 (2006).

T. Ando, T. Uchihashi, N. Kodera, A. Miyagi, R. Nakakita, H. Yamashita and K. Matada, High-Speed AFM for Studying the Dynamic Behavior of Protein Molecules at Work. e-J. Surf. Sci. Nanotech. 3:384-392 (2005).

N. Kodera, H. Yamashita and T. Ando, Active Damping of the Scanner for High-speed Atomic Force Microscopy. Rev. Sci. Instrum. 76: 053708 (5 pages) (2005).

N. Kodera, T. Kinoshita, T. Ito and T. Ando, High-resolution Imaging of Myosin Motor in Action by a High-speed Atomic Force Microscope. Adv. Exp. Med. Biol. 538:119-127 (2003).

R. Ishikawa, T. Sakamoto, T. Ando, S. Higashi-Fujime and K. Kohama, Polarized Actin Bundles Formed by Human fascin-1: Their Sliding and Disassembly on Myosin II and Myosin V in vitro. J. Neurochem. 87:676-685 (2003).

T. Ando, N. Kodera, Y. Naito, T. Kinoshita, K. Furuta & Y.Y. Toyoshima, A High Speed Atomic Force Microscope for Studying Biological Macromolecules in Action. ChemPhysChem 4:1196-1202 (2003).

Ando, T., N. Kodera, D. Maruyama, E. Takai, K. Saito & A. Toda, A High-speed Atomic Force Microscope for Studying Biological Macromolecules in Action. Jpn. J. Appl. Phys. 41:4851-4856 (2002).

Ando, T., N. Kodera, E. Takai, D. Maruyama, K. Saito & A. Toda, A High-speed Atomic Force Microscope for Studying Biological Macromolecules. Proc. Natl. Acad. USA 98:12468-12472 (2001).

Amitani, I., T. Sakamoto & T. Ando, Link between the Enzymatic and Mechanical Behavior in an Actomyosin Motor. Biophys. J. 80:379-397 (2001).

Sakamoto T., I. Amitani, E. Yokota & T. Ando, Direct Observation of Processive Movement by Individual Myosin V Molecules. Biochem. Biophys. Res. Commun. 272:586-590 (2000).

Adachi K., K. Kinosita, Jr. & T. Ando, Single-fluorophore Imaging with an Unmodified Epifluorescence and Conventional Video Camera. J. Microscopy 195:125-132 (1999).

Nakajima H., Y. Kunioka, K. Nakano, K. Shimizu, M. Seto & T. Ando, Scanning Force Microscopy of the Interaction Events between a Single Molecule of Heavy Meromyosin and Actin. Biochem. Biophys. Res. Commun. 234:178-182 (1997).

Kunioka Y. & T. Ando, Innocuous Labeling of the Subfragment-2 region of Skeletal Muscle Heavy Meromyosin with a Fluorescent Polyacrylamide Nanobead and Visualization of Individual Heavy Meromyosin Molecules. J. Biochem. 119:1024-1032 (1996).

Yamamoto T., S. Nakayama, N. Kobayashi, E. Munekata T. Ando, Determination of Electrostatic Potential around Specific Locations on the Surface of Actin by Diffusion-enhanced Fluorescence Resonace Energy Transfer. J. Mol. Biol. 241:714-731 (1994).

Hansma, P., G. Schitter, G.E. Fantner, C. Prater, High-Speed Atomic Force Microscopy. Science 314, 601; DOI: 10.1126/science. 1133497 (2 pages) (2006).

Picco., L.M., L. Bozec, A. Ulcinas, D.J. Engledew, M. Antognozzi, M.A. Horton, M.J. Miles, Breaking the Speed Limit with Atomic Force Microscopy. Nanotechnology 18: 044030 (4 pages) (2007).

Veeco Dimension 3100 Atomic Force Microscope (AFM), Procedure (13 pages) (Nov. 20, 2006).

NanoStation II—PucoTech, http://pucotech.en.ec21.com/product_detail.jsp?group_id=GC01640383&product_id=CA... (5 pages) (Feb. 23, 2007).

T. Uchihashi, N. Kodera, H. Itoh, H. Yamashita, T. Ando, Feed-Forward Compensation for High-Speed Atomic Force Microscopy Imaging of Biomolecules. Jpn. J. Appl. Phys. 45:1904-1908 (2006).

S. Hafizovic, D. Barrettino, T. Volden, J. Sedivy, K.U. Kirstein, O. Brand, A. Hierlemann, Single-Chip Mechatronic Microsystem for Surface Imaging and Force Response Studies, PNAS, vol. 101, No. 49, pp. 17011-17015 (Dec. 2004).

G.E. Fantner, G. Schiffer, H.J. Kindt, T. Ivanov, K. Ivanova, R. Patel, N. Holten-Andersen, J. Adams, P.J. Thurner, I.W. Rangelow, P.K. Hansma, Components for High Speed Atomic Force Microscopy. Ultramicroscopy 106 (2006) 881-887.

M.J. Rost, L. Crama, P. Schakel, E. van Tol, G.B.E.M. van Velzen-Williams, C.F. Overgauw, H. ter Horst, H. Dekker, B. Okhuijsen, M. Seynen, A. Vijftigschild, P. Han, A.J. Katan, K. Schoots, R. Schumm, W. van Loo, T.H. Oosterkamp, and J.W.M. Frenken, Scanning Probe Microscopes Go Video Rate and Beyond. Review of Scientific Instruments, 76, 053710 (2005).

Q. Zou, K.K. Leang, E. Sadoun, M.J. Reed, and S. Devasia, Control Issues in High-Speed AFM for Biological Applications: Collagen Imaging Example. Asian J. Control. Jun. 2004; 6(2): 164-178.

G. Schitter, F. Allgower, and A. Stemmer, A New control Strategy for High-Speed Atomic Force Microscopy. Nanotechnology 15 (2004) 108-114.

Q. Zou, C. Vander Giessen, J. Garbini, and S. Devasia, Precision Tracking of Driving Wave Forms for Inertial Reaction Devices. Review of Scientific Instruments, 76, 023701-1 (2005).

G. Schitter, A. Stemmer, and F. Allgower, Robust 2DOF-Control of a Piezoelectric Tube Scanner for High Speed Atomic Force Microscopy, Proceedings of the American Control Conference, Denver, CO Jun. 4-6, 2003 (pp. 3720-3725).

G. Schitter, K.J. Astrom, B. DeMartini, G.E. Fantner, K. Turner, P. Thurner, and P.K. Hansma, Design and Modeling of a High-Speed Scanner for Atomic Force Microscopy. Proceedings of the American Control Conference, Minneapolis, MN, Jun. 14-16, 2004 (pp. 502-507).

S. Devasia, Degang Chen, and Brad Paden, Nonliner Inversion-Based Output Tracking, IEEE Transactions on Automatic Control, vol. 41, No. 7, Jul. 1996 (pp. 930-942).

Written Opinion of the International Searching Authority, Dated Feb. 24, 2009, for International Application No. PCT/US2008/072107.

Notification Concerning Transmittal of International Preliminary Report on Patentability and Written Opinion of the International Searching Authority, Dated Oct. 1, 2009, for International Application No. PCT/US2008/057217.

* cited by examiner

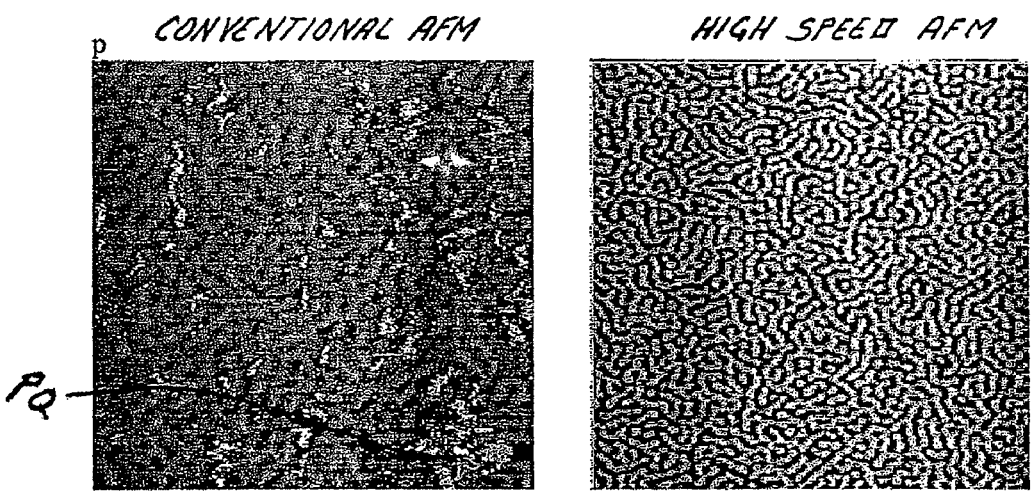
FIG. 3A  FIG. 3B
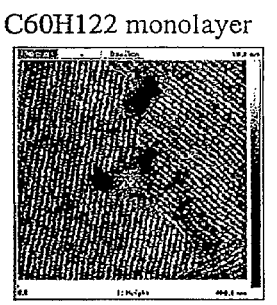 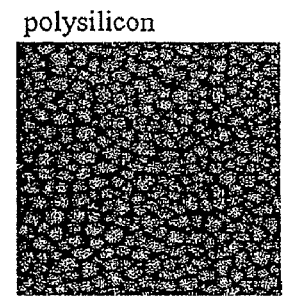
FIG. 3C  FIG. 3D  FIG. 3E
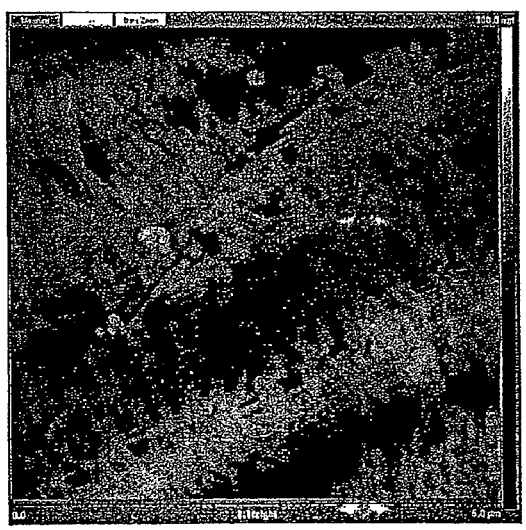 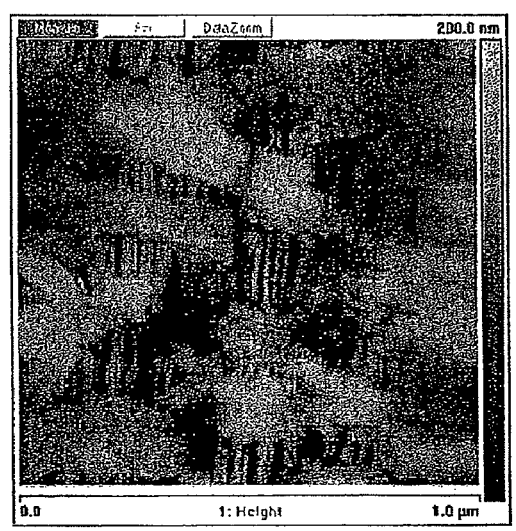
FIG. 3F
Celgard polymer
60 lines/sec (4000 x
4000 image in ~1 min
Celgard polymer 488 lines/sec
FIG. 3G

FAST-SCANNING SPM AND METHOD OF OPERATING SAME

STATEMENT OF GOVERNMENT INTEREST

This invention was made with United States government support awarded by the following agency: NIST/ATP (Award #70NANB4H3055). The United States has certain rights in this invention.

BACKGROUND OF THE INVENTION

1. Field of the Invention

The present invention is directed to scanning probe microscopes (SPMs), and, more particularly, relates to a SPM that can acquire high-quality images at high acquisition rates and to a method of operating such an SPM.

2. Description of Related Art

Scanning probe microscopes (SPMs), such as the atomic force microscope (AFM), are devices which typically use a tip and low tip-sample interaction forces to characterize the surface of a sample down to atomic dimensions. Generally, SPMs include a probe having a tip that is introduced to a surface of a sample to detect changes in the characteristics of a sample. By providing relative scanning movement between the tip and the sample, characteristic data can be acquired over a particular region of the sample and a corresponding map of the sample can be generated.

The atomic force microscope (AFM) is a very popular type of SPM. A typical AFM is shown schematically in FIG. 1. AFM 10 employs a probe 12 having a cantilever 14 and a tip 16. Scanner 24 generates relative motion between the probe 12 and a sample 22 while the probe-sample interaction is monitored. In this way, images or other measurements of the sample can be obtained. Scanner 24 typically includes one or more actuators that usually generate motion in three orthogonal directions (XYZ). Scanner 24 may be a single integrated unit such as a piezoelectric tube actuator that moves either the sample or the probe in all three axes. It moves the probe 12 in the illustrated example. Alternatively, the scanner may be an assembly of multiple separate actuators. Some AFMs separate the scanner into multiple components, for example an xy actuator that moves the sample and a separate z-actuator that moves the probe. Probe 12 is often coupled to an oscillating actuator or drive 15 that is used to drive probe 12 at or near a resonant frequency of cantilever 14. Alternative arrangements measure the deflection, torsion, or other motion of cantilever 14. Probe 12 is often formed from a microfabricated cantilever 14 with an integrated tip 16.

If the AFM is configured for an oscillation mode of operation, an electronic signal is applied from an AC signal source 18 under control of a probe-sample interaction is typically controlled via force control feedback by controller 20. Motion of the cantilever 14 is monitored by directing a sensing light beam from a sensing light source (not shown), such as a laser, to the backside of cantilever 14. The beam is then reflected towards a detector 26, such as a four quadrant photodetector. As the beam translates across detector 26, appropriate signals are transmitted to controller 20, which processes the signals to determine changes in the oscillation of probe 14.

Controller 20 generates control signals to maintain either a relative constant interaction between the tip 16 and sample or a constant deflection of the cantilever 14. Measurement involves controlling the scanner 24 to move either the sample or the probe (the probe 12 in the present example) up and down relatively perpendicular to the surface of the sample 22 under feedback. The scanner 24 is controlled to perform a scan operation by effecting relative probe-sample motion in an "x-y" plane that is at least generally parallel to the surface of the sample 22. (Note that many samples have roughness, curvature and tilt that deviate from a flat plane, hence the use of the term "generally parallel." The term "parallel" may also be used herein and should be construed to also mean "generally parallel.") The scan typically takes the form of a raster scan in which data is taken along lines in the x direction that are closely spaced in the y direction. The maximum length of the lines in the x direction is known as the "scan range." In this way, the data associated with this vertical motion can be stored and then used to construct an image of the sample surface corresponding to the sample characteristic being measured, e.g., surface topography.

The measured characteristic of probe-sample interaction will depend in part on the AFM's intended mode of operation. That is, AFMs may be designed to operate in a variety of modes including contact mode and oscillating mode. In contact mode, the probe 12 is lowered into interaction with the sample 22, and cantilever deflection or a related characteristic is monitored and controlled to a setpoint. In an oscillating mode such as the popular mode known as TappingMode™ (TappingMode™ is a trademark owned by the present assignee), the probe is oscillated by a probe oscillator 15 via an AC signal source 18 at or near a resonant frequency of the cantilever 14. A force control loop attempts to maintain the amplitude of this oscillation at a desired setpoint value to minimize the "tracking force," i.e. the force resulting from tip/sample interaction. (Alternative feedback arrangements keep the phase and/or oscillation frequency constant or a combination of the above. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

The most broadly adopted commercial SPMs usually require a total scan time of several minutes to cover an area of several square microns at high resolution (e.g. 512×512 pixels), low tracking force, and high image quality. In general, the practical limit of SPM scan speed is a result of the maximum speed at which the SPM can be scanned while maintaining a tracking force that is low enough not to damage the tip and/or sample or to at least limit the damage to the tip and/or sample to acceptable levels.

Recent work in high-speed SPM has been performed by a number of groups, including, for example, the research groups of Paul Hansma at the University of California, Toshio Ando of Kanazawa University, Mervyn Miles at the University of Bristol, the Frenken Group at the University of Leiden, and commercial companies, such as, Olympus and Infinitesima.

Obtaining a high quality, high speed AFM image demands outstanding performance of each and every major sub-system of the AFM. Just as the strength of a chain is governed by the weakest link, the performance of a high speed AFM is often governed by its weakest or slowest subsystem. An AFM sub-system that fails to provide the necessary range, speed, bandwidth, slew rate, linearity etc. will either lead to diminished performance of the overall system and/or unacceptable flaws in the image quality. Despite some excellent progress, earlier SPM systems have not achieved the suite of simultaneous performance metrics required to broadly enable applicable high speed AFM.

SUMMARY OF THE INVENTION

In accordance with a first aspect of the invention, a method is provided that has the capability of rapidly scanning a large sample of arbitrary characteristics so as to obtain a high quality, high resolution image. The method includes generating relative scanning movement between a probe of the SPM and a sample to scan the probe through a scan range of at least 4 microns at a rate of at least 30 lines/sec. and controlling probe-sample interaction with a force control slew rate of at least 1 mm/sec.

In order to minimize the effects of noise on the acquired signals measures are taken to attenuate noise in the actuator position compared to noise exhibited by the position sensor within a scan bandwidth equal to about seven times the scan frequency. These measures preferably take the combination of a feed forward control and a feedback control in all three principal directions. The feed forward control may include using an inversion-based control algorithm that uses a transfer function associated with the actuator.

A SPM configured in accordance with the invention could be used to scan a wide variety of conductive or non-conductive samples, including patterned wafers, biological samples, polymers, thin films, and data storage device components. Embodiments of the current invention can scan samples with an RMS roughness of greater than 5 nm, scan samples with aspect ratios >5:1 and scan highly corrugated samples, such as trenches and vias, with high a steep step-like structures greater than 50 nm in height.

Scanning may take place under force-feedback to prevent or reduce wear or damage of the tip or sample.

In order to facilitate performance of this method, the SPM may have a relatively stiff, relatively light-weight tip scanner having a high fundamental resonant frequency. The tip scanner has a lowest fundamental resonant frequency greater than 5 kHz, preferably greater than 7 kHz, and even more preferably greater than 10 kHz. It preferably incorporates an optical objective, most preferably a scanned objective that may or may not be moved by the actuator. The objective focuses sensing and illumination light on the probe of the SPM. The objective may be vertically movable within the scan head to increase the focus range for a laser or other sensing light source, permitting the use of a relatively high cantilever with a commensurately high resonant frequency. The movable objective also permits illumination light to be focused on distinctly spaced objects, such as the probe and a sample surface located well beneath the probe. The objective may also be a "tracking objective" that moves with the scanner in the x-y plane to allow a sensing light beam's focused spot to at least generally follow the scanning motion of probe during scanning. Optics may be provided to permit panning of both the illumination beam of an integrated optical microscope and the sensing light beam as a unit. This panning permits the alignment or targeting of the focused sensing light beam on the cantilever under direct or indirect visual inspection of the focused illumination beam. This alignment or targeting permits the use of an even smaller cantilever with a commensurately smaller resonant frequency.

The probe may include a high-bandwidth microfabricated cantilever with an integrated tip. The microfabrication may be performed using an ectro-chemicals etch to define cantilever length. The probe may have a force detection bandwidth greater than 30 kHz, apply a force to the sample of less than 10 nN when activated in oscillation mode, and have a step response time of about 10 µs.

In accordance with another aspect of the invention, a SPM is provided comprising a probe, a scanner that generates relative motion between the probe and a sample over a scan range of at least 4 µm at a rate of at least 30 lines/sec., and a force controller that controls probe/sample interaction under closed loop feedback, the force controller having a force control bandwidth of at least 5 kHz. The force feedback controller may be formed by the combination of a z actuator, a controller, and a detector.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 3A is exemplary image obtained by a prior art AFM appropriately labeled "Prior Art";

FIG. 3B-3G are exemplary images obtained by an embodiment of an AFM constructed in accordance with the present invention.

DETAILED DESCRIPTION OF THE PREFERRED EMBODIMENTS

As discussed in the "Summary" section above, the invention relates to a fast-acting scanning probe microscope (SPM) such as an atomic force microscope (AFM) and to its method of operation. The preferred SPM has the ability to obtain high quality images while scanning large samples at high speeds.

A preferred embodiment of a SPM in the form of an AFM will now be described that achieves these and many other goals, it being understood that AFMs and other SPMs may be provided that fall within the scope of the present invention.

1. System Overview

The preferred AFM as illustrated and described herein includes several refinements when compared to prior art AFMs, namely:
  A force control loop that can operate with a bandwidth of up to 100 kHz (Section 2);
  A tip scanner with a high fundamental resonant frequency and with integrated optics facilitating probe targeting and tracking (see Section 3 below).
  An AFM system architecture to support high speed scanning of large samples (see Section 4 below);
  a high-bandwidth probe (see Section 5 below);
  Small strain-gauge sensors that monitor operation of the tip scanner's actuator to enable precise feedback control of all actuators of the scanner (see Section 6 below); and
  A scan controller that utilizes feed-forward feedback control to obtain linear images without sinusoidal distortion or the need to correct for sinusoidal distortion (see Section 7 below).

As mentioned previously, prior SPMs have been limited by parameters including their xy and z range, their force control bandwidth and slew rate, and xy scan speed. We will now describe how the innovations of the current invention enable breakthrough performance compared to prior AFMs. We will first describe the key elements, referring to a simplified conceptual diagram, and then move to more detailed descriptions of key elements.

Figure 1:
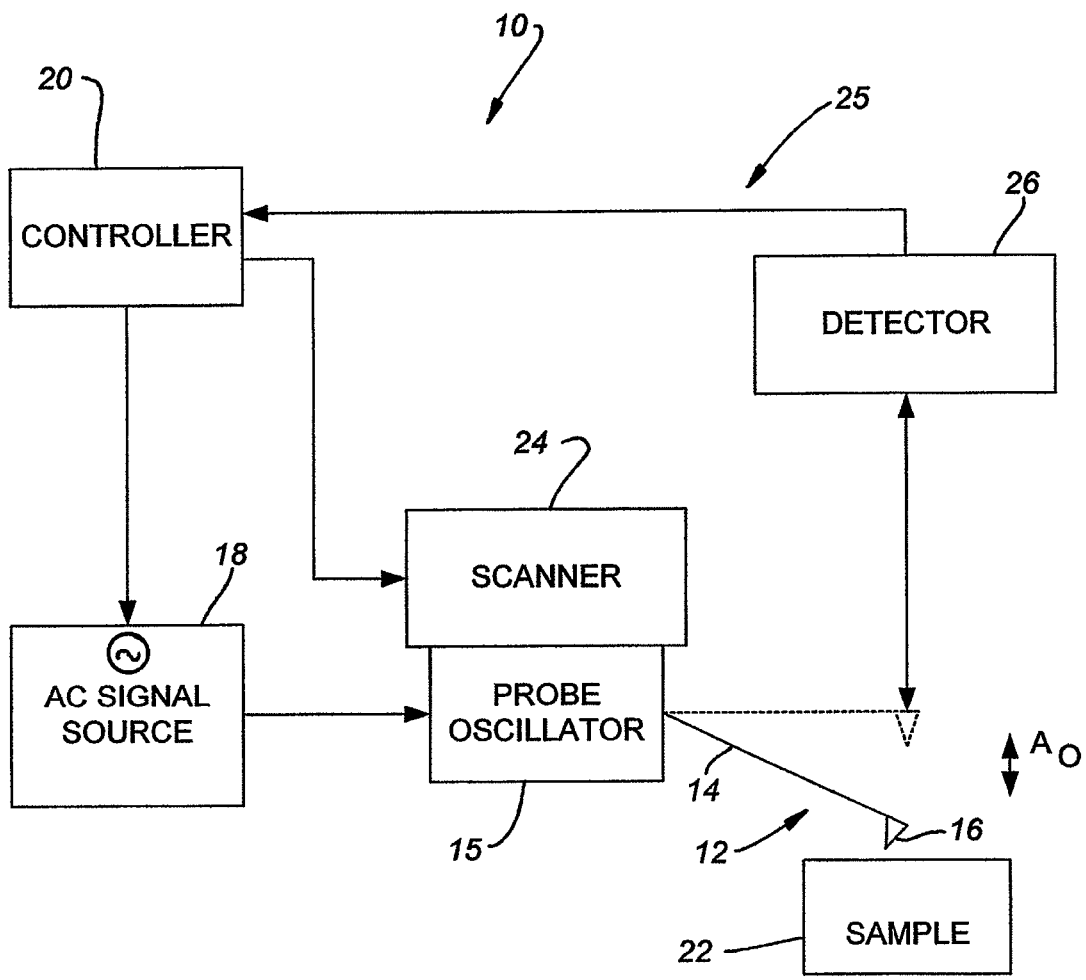
FIG. 1 schematically illustrates a prior art AFM and is, appropriately, labeled PRIOR ART.
Figure 2:
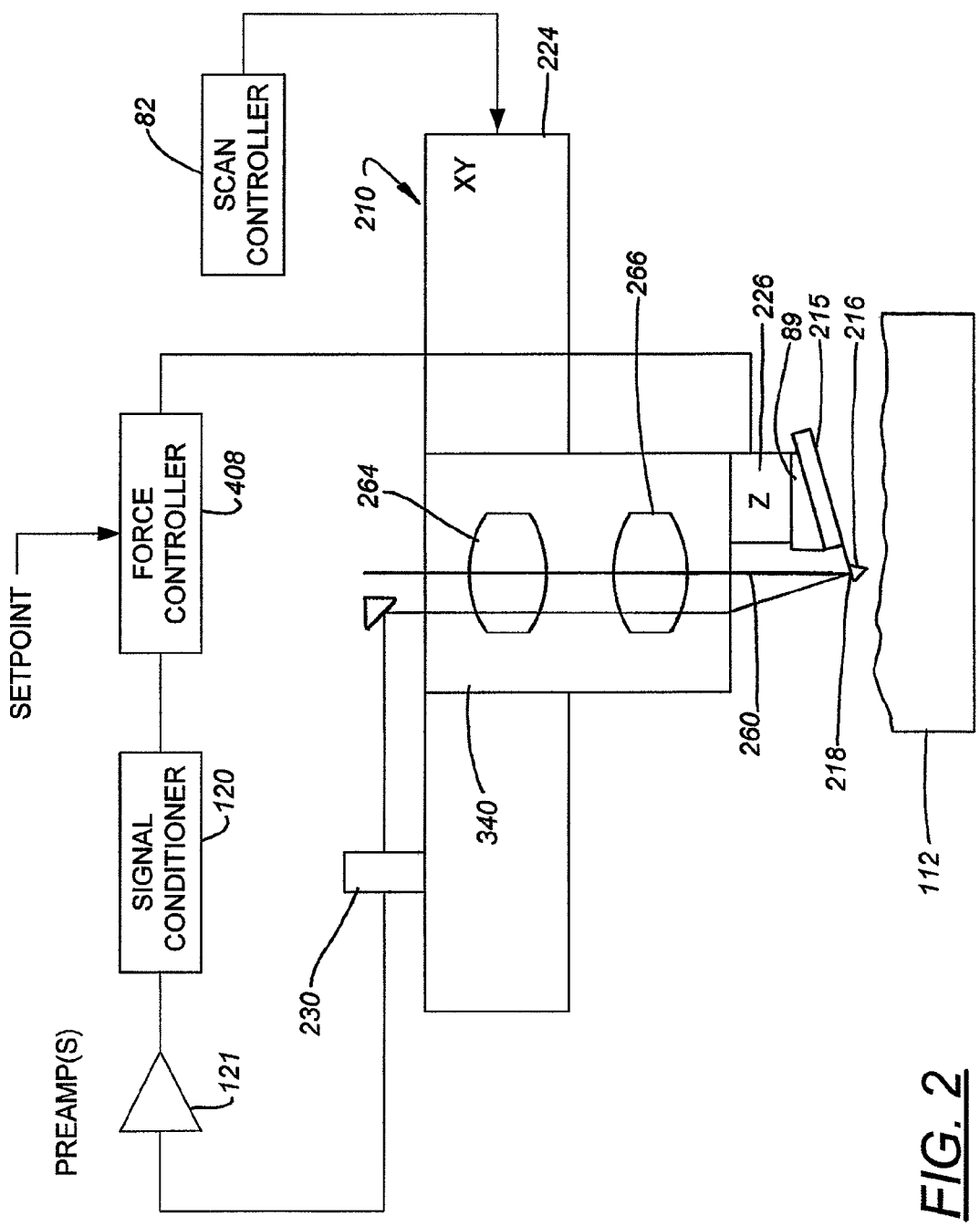
FIG. 2 schematically illustrates a simplified conceptual diagram of an embodiment of the AFM of the current invention.

Referring to FIG. 2, a high bandwidth AFM probe 215 is scanned relative to a sample 112 using a high resonance scanner 224. High bandwidth probe 215 typically includes a cantilever 216 and a tip 218 mounted on the free end portion of the cantilever 216. Alternatively, high bandwidth probe 215 may comprise a membrane supporting a tip or arbitrarily complex geometry that allows bending or flexing of a portion of the probe to enable motion of the tip 218. Cantilever 216 (or other tip support) of high bandwidth probe 215 preferably has a response bandwidth in excess of 10 kHz and more preferably in excess of 50 kHz. High bandwidth scanner 224 moves the probe 215 to generate relative motion between the tip 218 and sample 112. In this arrangement, the system can scan even large and/or heavy samples as the dynamics of scanner 224 are not affected by the sample size and mass. Scanner 224 preferably has a loaded fundamental resonant frequency in excess of 5 kHz and more preferably in excess of 10 kHz and may be used to generate scan motion at scan rates in excess of 30 lines/sec., more preferably in excess of 100 lines/sec. and most preferably in excess of 1000 lines/sec. Scan controller 82 generates control signals to enable high speed motion of tip scanner 224. In the embodiment shown, the probe 215 is scanned by scanner 224, but many of the fast scan advantages described in this specification can also be obtained by physically scanning a sample instead of or in addition to the probe.

Probe tip 218 may be oscillated for use in TappingMode™, non-contact mode, Torsional Resonance mode (TR-Mode™), torsional harmonic mode, (Harmonix™) and/or other oscillating tip modes. In this case, the tip is usually oscillated at or near a resonance of the cantilever 216 or another tip support (such as a membrane). Such cantilever or membrane or similar tip support preferably has a resonant frequency in excess of 800 kHz, more preferably in excess of 1 MHz and even more preferably in excess of 5 MHz. Alternatively, the probe tip 218 may be operated in contact mode.

Interactions of probe tip 218 with the surface of sample 112 result in changes in the motion of the probe tip 218. This motion may be detected by a variety of techniques, including the well-known optical lever technique, by an optical interferometer, a Doppler Vibrometer, or by capacitive, piezoelectric, or piezoresistive detection. Alternative techniques that produce a signal indicative of the motion and/or position of the probe may also be employed. In the case of optical detection techniques, a light beam is transmitted through scanning lenses 264 and 266 and then reflected or scattered off the cantilever and is received by a detector 230. Scanning lenses 264 and 266 may be moved by scanner 224 such that their motion is synchronous with that of the tip. In this way, the focused spot created by the lenses tracks the moving cantilever. Detector 230 has a bandwidth sufficient to detect the motion of probe tip 218. Typically, this implies that the detector has a bandwidth in excess of the frequency at which the probe tip 218 is oscillated and/or higher than the frequency of motions to be detected as a result of the tip-sample interactions as the tip is scanned over the sample.

A high-bandwidth/high slew rate force controller 408 is used to minimize or otherwise control the tip-surface interaction. The force controller is often employed to minimize tip and sample damage during these high scan speeds. The force controller may also be used to maintain the AFM at a specific level of interaction and/or a specific tip-sample distance. Force controller 408 sends control signals to a high-bandwidth/high slew rate z-actuator 226 that is used to adjust the relative tip-sample distance. Force controller 408 preferably has a closed loop force control bandwidth in excess of 10 kHz and more preferably in excess of 50 kHz and most preferably in excess of 100 kHz. In addition, force controller 408, in combination with z-actuator 226, preferably has a slew rate in excess of 1 mm/sec, more preferably in excess of 4 mm/sec, and most preferably in excess of 7 mm/sec.

Preferred performance characteristics of a system constructed in accordance with the invention are summarized in Table 1:

TABLE 1

Key Figures of Merit

|  | Preferred performance | More preferred performance | Most preferred performance |
|---|---|---|---|
| XY scan range | >4 um | >10 um | >20 um |
| XY scanner fundamental resonance | >5 kHz | >7 kHz | >10 kHz |
| XY scan rate | >30 lines/sec | >100 lines/sec | >1000 lines/sec |
| Force control bandwidth | >10 kHz | >50 kHz | >100 kHz |
| Force control slew rate | 1 mm/sec | 4 mm/sec | 7 mm/sec |
| AFM probe bandwidth | >10 kHz | >20 kHz | >50 kHz |
| Cantilever resonant frequency | >800 kHz | >1 MHz | >5 MHz |

To our knowledge, no other prior art SPM achieves the combination of performance characteristics comprising even the first or "preferred performance" column. The inventors, however, have achieved a combination of performance characteristics exceeding the "More Preferred Performance" column using the techniques described in this specification. Additionally, the inventors have designed and successfully tested subsystems that accomplish the performance of the "Most Preferred Performance" column. It is believed that the information provided herein readily enables construction of a system that achieves the characteristics listed in the "Most Preferred Performance" column. These combinations of performance characteristics enable an unprecedented combination of scan speed, scan range, image quality and force control. Additional breakthrough performance of various subsystems will be described below.

The inventors have used the AFMs as described herein to obtain high quality AFM images of a wide variety of samples with surprisingly good results. FIG. 3B-3G shows some representative images taken on one embodiment of the current invention. FIGS. 3A and 3B shows a comparison of a TappingMode phase image (acquired using, for example, the techniques described in U.S. Pat. No. RE36,488) of a copolymer sample taken using a conventional AFM (FIG. 3A) and using a high speed AFM constructed in accordance with the current invention (FIG. 3B). The images were both obtained while scanning at 79 lines/sec. Conventional AFMs typically measure such samples at rates under a few lines per second. Notice from FIG. 3A that the image from the conventional AFM shows many artifacts of poor force control (white spots and streaks, (one example is labeled as "PQ") and a loss of resolution and contrast when used at high speed. The high-speed AFM image of FIG. 3G, by comparison, shows a very clear high resolution image.

FIGS. 3C and 3E show exemplary high speed images of an organic monolayer of $C_{60}H_{122}$, a titanium thin film, and a polysilicon film, respectively. Each of these images was obtained from scans at speeds in excess of 30 lines/sec. These samples were selected to test the damage to the sample (in the case of the soft organic monolayer) and the tip (in the case of the Ti and polysilicon films.) All samples could be imaged with a preferred embodiment of the invention AFM for extended periods of time without noticeable damage to the tip and/or sample.

FIGS. 3F and 3G show images of a Celgard® polymer membrane. FIG. 3F shows a 4 um region that was imaged at 60 lines/sec with a pixel resolution of 4000×4000. At conventional scan speeds of ~1 line/sec, this image would require over an hour to acquire. At 60 lines/sec. the image in 3F required just over 1 minute to acquire. FIG. 3G shows an image of the Celgard sample acquired at 488 lines/sec.

The following section will outline some of the key advances that were required to enable the performance described above.

2. Force Control

Together, the cantilever probe, force controller and z actuator(s) form part of a force control loop. (The force control loop may also contain many variations of optical, optoelectronic, analog and/or electronics connecting these main components.) As mentioned previously, a practical limit of AFM or other SPM scan speed is a result of the maximum speed at which the SPM can be scanned while maintaining a tracking force that is low enough to cause minimal or no damage to the tip and/or the sample. The force control loop is used to adjust the relative position of the AFM probe to track variations in the sample surface and to attempt to keep the tip-sample interaction force below acceptable damage thresholds. The performance of the force control loop is governed in part by three key figures of merit: force control bandwidth, slew rate, and range.

We will first discuss force control bandwidth. In the case of a system with a DC response and high-frequency cutoff, the force control bandwidth can be expressed as the frequency at which a small amplitude input signal is attenuated by 3 dB compared to the DC response. As the AFM tip scans over a sample surface, spatial variations in the sample surface turn into time variations in the measured cantilever response. For example, consider an AFM probe scanning over a sinusoidal surface with a period of 100 nm. If this sample is scanned at a rate of 100 lines per second over a scan range of 10 um, the resulting signal detected by the AFM probe would have frequency $f_s$ given by:

$$f_s = 2(100 \text{ lines/sec}) \times (10 \text{ um}/100 \text{ nm}) = 20 \text{ kHz}.$$

(The factor of 2 in this illustrative example comes from the common—but not required—practice of scanning a sample in two directions, so-called "trace and retrace.")

If the force control feedback loop were 20 kHz, the amplitude of the sinusoidal features would be attenuated by 3 dB at the force controller output. Using the components described in this specification, the current inventors have developed a force control loop with a bandwidth exceeding 100 kHz for contact mode AFM and exceeding 15 kHz for TappingMode or other oscillating tip imaging modes. Note, however, that it is still possible to get information about sample features at frequencies higher than the bandwidth of the force controller by recording the "error signal", i.e. a signal representative of the difference between the cantilever's actual motion and the setpoint of the force controller. In a preferred embodiment, both the error signal and the motion of the z-actuator(s) are used to reconstruct an accurate measurement of the topography of the sample.

As mentioned previously, one limit of SPM performance is the speed at which the tip can be scanned over the sample without causing unacceptable damage to the tip and/or sample. Damage to tips and/or samples may occur during scanning if the topography of a sample is changing faster than the force feedback loop can respond. In this case, a force error will accumulate. When the force error leads to a stress larger than the tip and/or sample can accommodate, damage can occur. This problem can be mitigated using cantilevers with spring constants low enough such that uncompensated force variations are small. While the yield stress is different for different tip and sample materials, it is desirable to create a system with as high of a force control bandwidth as possible.

Figure 4A:
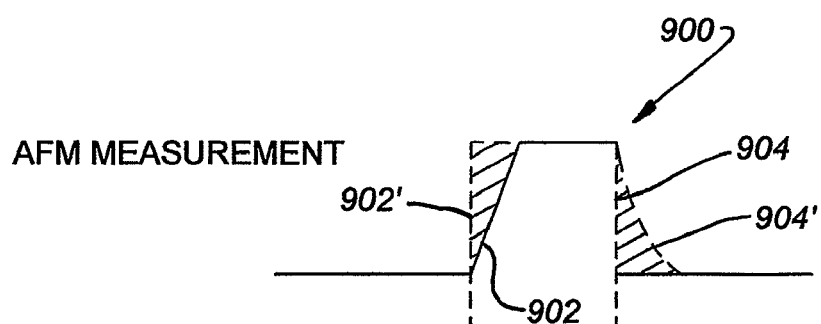
FIGS. 4A and 4B are graphs illustrating slew rate for an AFM z-actuator.
Figure 4B:
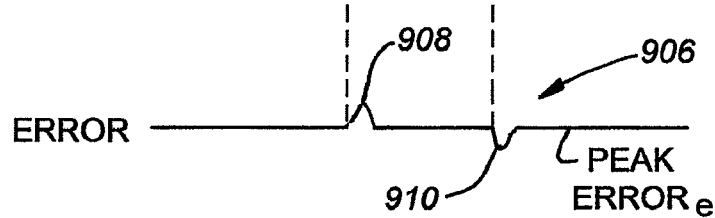

The next figure of merit is force control slew rate or simply "slew rate." The slew rate of the force control loop is the rate at which the control loop can drive an actuator to move the tip to climb a sharp edge and is stated in terms of distance per unit time. The challenges incident to climbing such an edge can be appreciated with reference to FIG. 4A, which shows a sample feature 900 of arbitrary cross-sectional shape with first and vertical second sidewalls 902 and 904 of a common maximum height $h_{MAX}$. Any point along those sidewalls will have a height $h_{ACT}$ somewhere between 0 (assuming that the base of the feature is at a reference plane of 0 height) and $h_{Max}$. A SPM that does not image that feature perfectly will generate an image shown in dotted lines 902' and 904' in FIG. 4A in which at least some of the determined heights $h_{DET}$ will deviate from the corresponding actual heights $h_{ACT}$. The magnitude of the resulting error at any given point is the difference $h_{ACT}-h_{DET}$. The largest such error, typically occurring at the leading edge of the first wall 902 and the trailing edge of the second wall 904, is the peak error seen at points 908 and 910 in the curve 906 of FIG. 4B, is $e_{MAX}$. The desired slew rate for a system is one that maintains that error to within acceptable limits while avoiding damage to the tip and/or sample.

In practice, the required slew rate for a particular system is given by the xy scan speed and the angle of the tip. More specifically, the required slew rate $V_z$ in the z direction is given by:

$$V_z = \frac{V_x}{\tan\theta} \quad \text{Equation 1}$$

Where:
$V_x$ is the relative tip velocity in a fast scan (typically x) direction; and
$\theta$ is the half angle of the tip relative to the vertical.

High force slew rates $V_z$ are especially important when the probe must follow steep features, for example a trench or a step. The slew rate $V_z$ governs the voltage that the amplifier 130 of FIG. 2 can apply to enable actuator 226 to follow steep features. For example, scanning a vertical step at 100 Hz in the fast scan or "x" direction, with a maximum scan range of 10 um, would imply an x slew rate $V_x$ of 10 um×100 Hz=1 mm/sec. With a tip half angle $\theta$ of 10°, the desired z-actuator slew rate would be 5.7 mm/sec.

In one embodiment of the current invention, the AFM's force controller employs integral feedback to control the tip-sample interaction force. In the case of first order integral feedback, when the tip is attempting to track a sloped feature, a steady state error will occur. The amplitude of the error is given by:

$$e = V_z/K_v, \quad \text{Equation 2}$$

Where:
$V_z$ is the vertical slew rate, and
$K_v$ is the velocity loop gain.
This implies a desired system design such that:

$$K_v > V_z/e_{max}, \quad \text{Equation 3}$$

Where $e_{max}$ is the maximum acceptable error.

Consider a specific example for the purposes of illustration. In traditional TappingMode or non-contact mode, it is generally desirable that the amplitude error not exceed the oscillation amplitude of the cantilever. In the case that an error exceeds the oscillation amplitude, the cantilever tip may come into static contact with the sample, generating larger forces than desired. If we consider a cantilever oscillating with an amplitude of 50 nm, for example, we would generally hope to avoid position errors e of greater than 50 nm. In contact mode, it is often desirable to limit the tip-sample interaction force by controlling the maximum deflection of the cantilever. Often, the maximum desired cantilever deflection is in the same range of a few to tens of nm. For our example, take a maximum desired error of 50 nm. If we use $e_{max}$=50 nm, and $V_z$=5.7 mm/sec from the example above, one should endeavor to build a system with a velocity loop gain of:

$$K_v > (5.7 \text{ mm/sec})/(50 \text{ µm}) = 114,000/\text{s}. \quad \text{Equation 4}$$

For smaller acceptable errors, or larger slew rates, one should target a higher $K_v$. The current inventors have achieved a velocity loop gain of 140,000. (Note that the required $K_v$ will depend on the topography and toughness of a given sample and tip. Thus, the broadest range of samples may be successfully imaged with the highest $K_v$.)

Velocity loop gain $K_v$ is a figure of merit for a first order integral feedback loop. In a traditional PI feedback loop, the maximum value of the gain $K_v$ is set by a stability requirement that the system gain must be less than one at a phase shift of 180°. (At gains higher than 1, unstable positive feedback exists.) The limiting value of the dc gain $K_v$ is often set by electro/mechanical resonances and/or phase shifts of an SPM system. These resonances generate peaks in the gain versus frequency that would push the system gain over unity at 180° if the value of the dc gain is too high. For a system with a dominant resonance at frequency $f_n$ and quality factor Q, the limiting value of $K_v$ is given by $$K_v = 2\pi f_n/Q. \quad \text{Equation 5}$$

(AFM systems with more complex resonant behavior may have more complicated stability criteria, especially in the case of multiple closely spaced resonances.) The current inventors have designed a scanned tip AFM system with a lowest dominant resonant frequency in the force control loop of 90 kHz with a Q of 4. Thus the velocity loop gain is given by $K_v = 2\pi (70 \text{ kHz})/4 = 140,000/\text{s}$. With an allowed amplitude error of 50 nm, this supports a slew rate $V_z$ of:

$$V_z = K_v \cdot e_{max} = 140,000/\text{s} \times 50 \text{ nm} = 7.0 \text{ mm/sec}.$$

Note that the previous discussion has been for the purposes of illustration, and it is possible to construct and implement much more sophisticated force control algorithms that enable higher slew rates and force control bandwidths. For instance, it is possible to decrease the impact of resonance by mechanically, electronically and/or digitally suppressing the amplitude response of the system at specific frequencies. This has the effect of damping the quality factor Q of the resonance, allowing higher values of $K_v$, and hence higher slew rates. For example, several groups have developed model-based control schemes. Authors on this subject include Stemmer, Schitter, Ando, Salapaka, and Zhou, for example. In a typical model-based SPM control scheme, the dynamic performance of one or more actuator is measured, and an optimal open-loop control scheme is designed to minimize unwanted excitation resonances. A typical first step is system identification, which is a procedure that maps the amplitude and phase response of the scanner versus frequency, resulting in characteristics called the "transfer function." This transfer function is used then to calculate an optimal controller that achieves the highest scanner bandwidth while attempting to minimize the oscillation of unwanted resonances. Typical strategies include H-infinity or H2 controllers that are described in the literature. In any case, it is desirable to implement the control systems and their subcomponents to support the maintenance of a steady-state error e to control tip/sample damage.

Returning to the major metric of slew rate, the current inventors have achieved closed loop force control slew rates in excess of 7 mm/sec in contact mode using designs described in this specification. To achieve these rates, the inventors have developed the following key capabilities: (1) a z-actuator thus is capable of holding and moving an AFM tip and that has a fundamental resonant frequency as high as 90 kHz, (2) high voltage amplifiers to drive the z-actuator with sufficient power and bandwidth, (3) feedback electronics fast enough to take advantage of this fast z-actuator. Each of these capabilities will be discussed in follow sections.

Figure 5A:
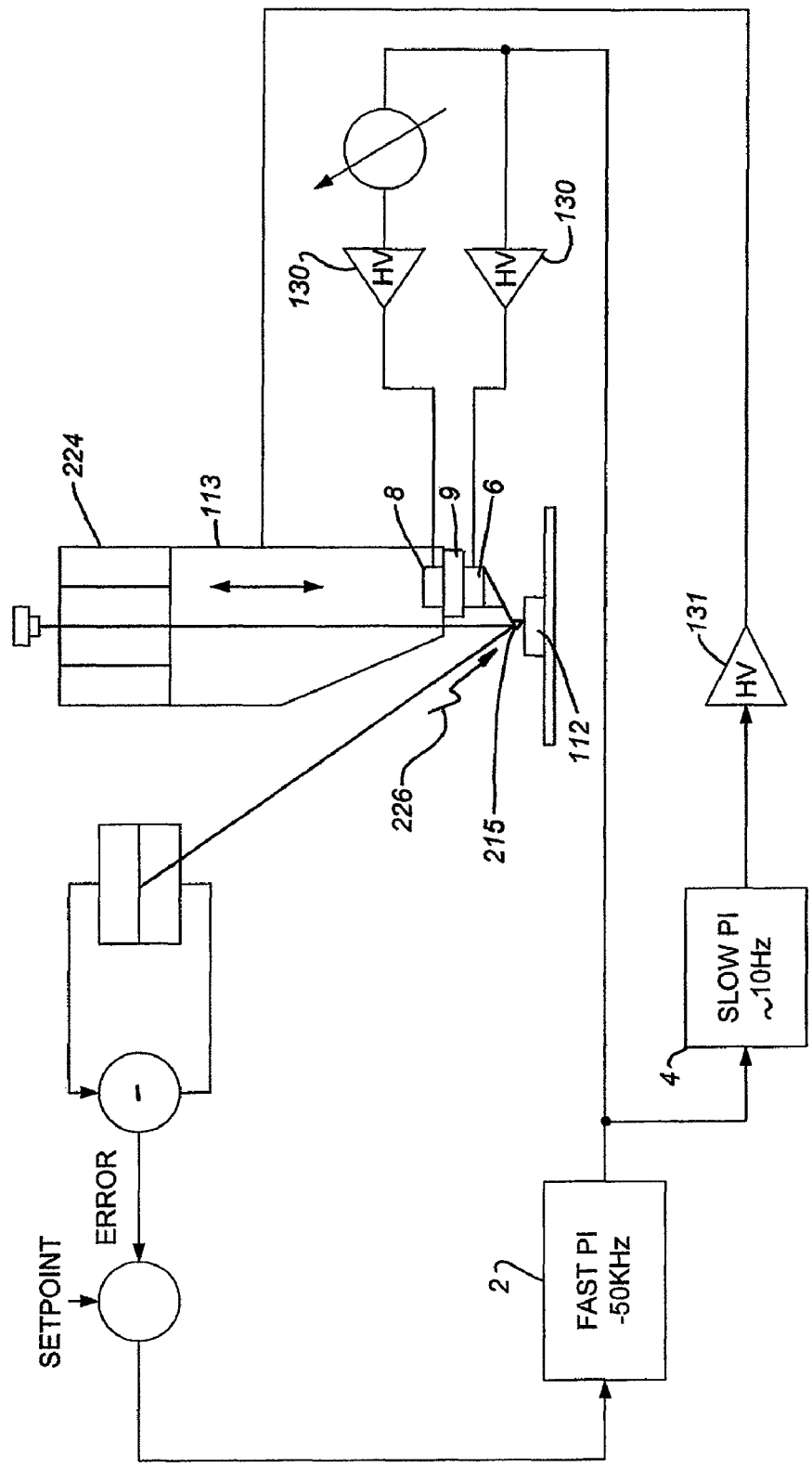
FIGS. 5A and 5B schematically illustrate a simplified diagram of the high bandwidth z-actuator of an embodiment of the AFM of the current invention.
Figure 5B:
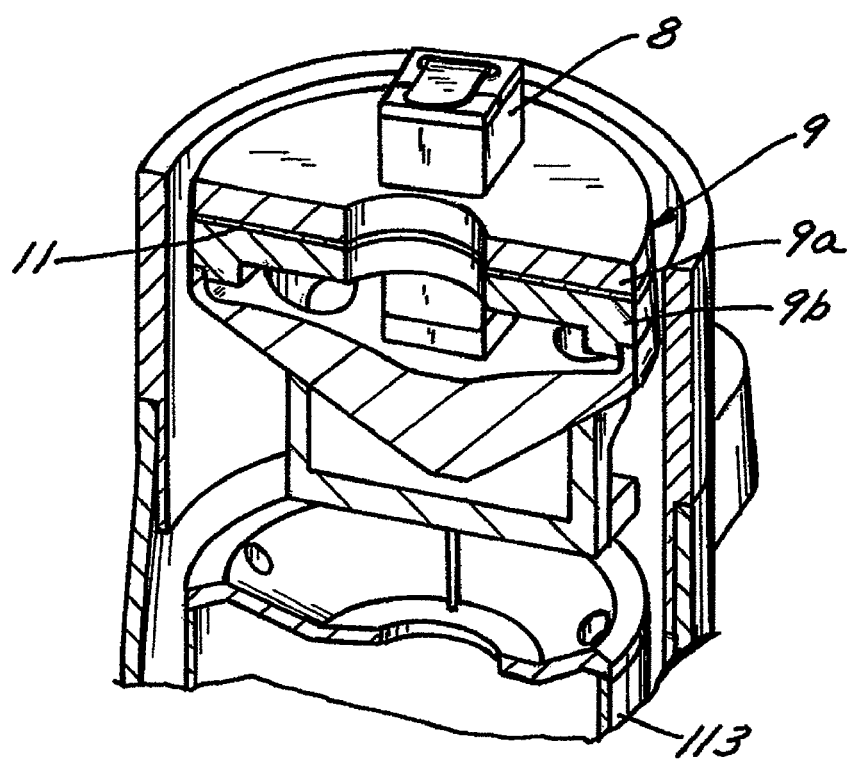

The inventors have built several embodiments of the current invention realizing improvements in bandwidth, slew rate, range and other major advantages. One such embodiment is shown in FIGS. 5A and 5B. This embodiment was built on a modified Dimension CL AFM head manufactured by the assignee, Veeco Instruments. The AFM is a scanning tip AFM with optical tracing as described in U.S. Pat. Nos. 6,032,518, 5,714,682, 5,560,244, and 5,463,897, which are assigned to Veeco Instruments, and which are hereby incorporated by reference.

Referring to FIGS. 5A-5B, fast actuator 226 is formed of opposing piezoelectric stacks 6 and 8. These piezo stacks are driven synchronously in opposite directions to minimize transmission of the high speed vertical motion to other parts of the AFM structure. (See, for example, U.S. Pat. Nos. 6,323, 483, 6,861,489, and 6,590,208, which are assigned to Veeco Instruments, and which are hereby incorporated by reference.) The opposing piezo stacks 6 and 8 are mounted onto a mounting plate 9 which is coupled to a slow z-actuator 113, which in this specific example is a portion of the piezoelectric tube actuator of the Dimension CL AFM head. A fast analog PI feedback controller 2 is nested with slow PI feedback controller 4 to control the tip-sample interaction force. High voltage amplifiers 131 and 130 amplify control signals for the slow and fast actuators, respectively. One of amplifiers 130 has an adjustable gain such that the momentum of the two opposed z-actuators 6 and 8 accurately cancel each other's motion. To achieve a high resonant frequency for the z-actuator 224, the inventors developed a mounting plate 9 composed of two rigid metal half discs 9a and 9b with a layer of polymeric viscoelastic damping material 11, shown in FIG. 5B, sandwiched between the half discs 9a and 9b. The mounting plate 9 was designed, using finite element analysis, to be rigid enough such that the forces generated at the mounting surfaces of piezo stacks 6 and 8 are minimally transmitted to the supporting slow z-actuator 113. A viscoelastic damping material (not shown) is also applied to the exterior surfaces of the piezo stacks 6 and 8 to reduce the quality factor Q of the actuators. Viscoelastic materials suitable for this are the layer between the disk halves 9a and 9b include, but are not limited to, modeling clay, silicone rubber, and other viscoelastic polymers.

To achieve scanning at rates in excess of 30 Hz with high linearity and image quality in this embodiment, the inventors employed an iterative model-based scan control as described in co-pending and commonly assigned application Ser. No. 11/800,679, which is incorporated by reference. The model-based control iteratively adjusted the scan waveform provided to the xy scanner 224 to minimize parasitic resonances and nonlinear distortion of the scan.

Figure 6A:
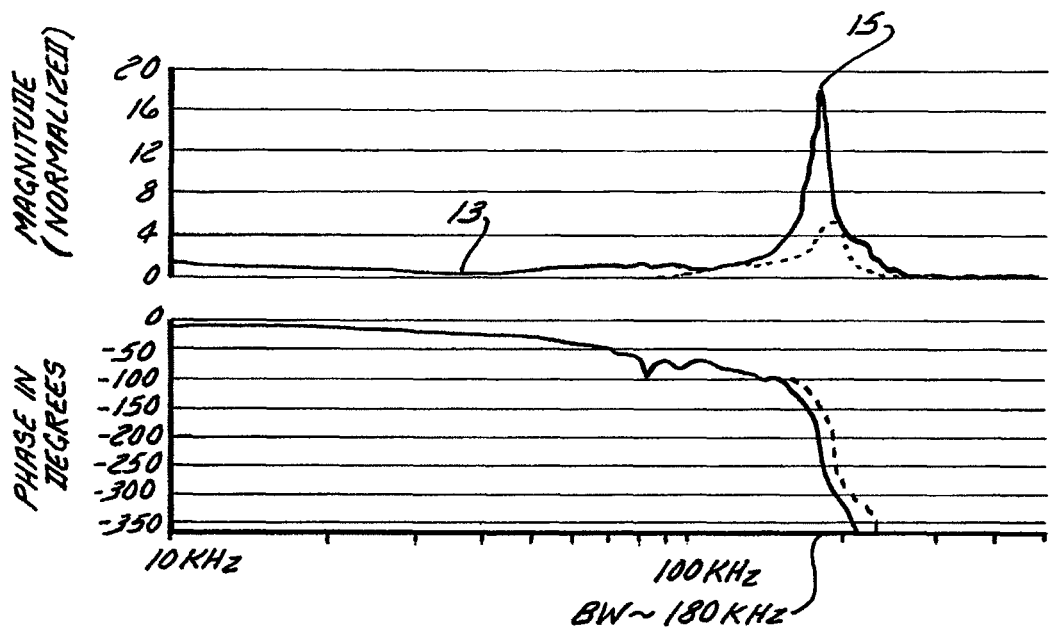
FIGS. 6A-6C are graphs illustrating response characteristics of the z-actuator of FIGS. 5A and 5B.
Figure 6B:
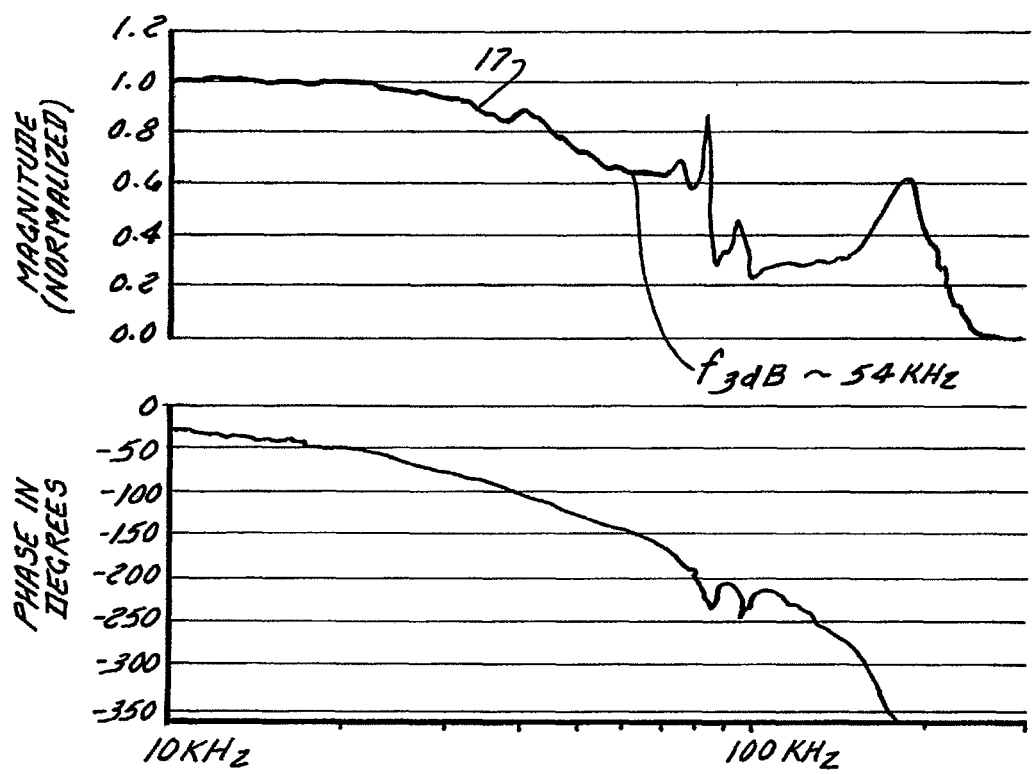
Figure 6C:
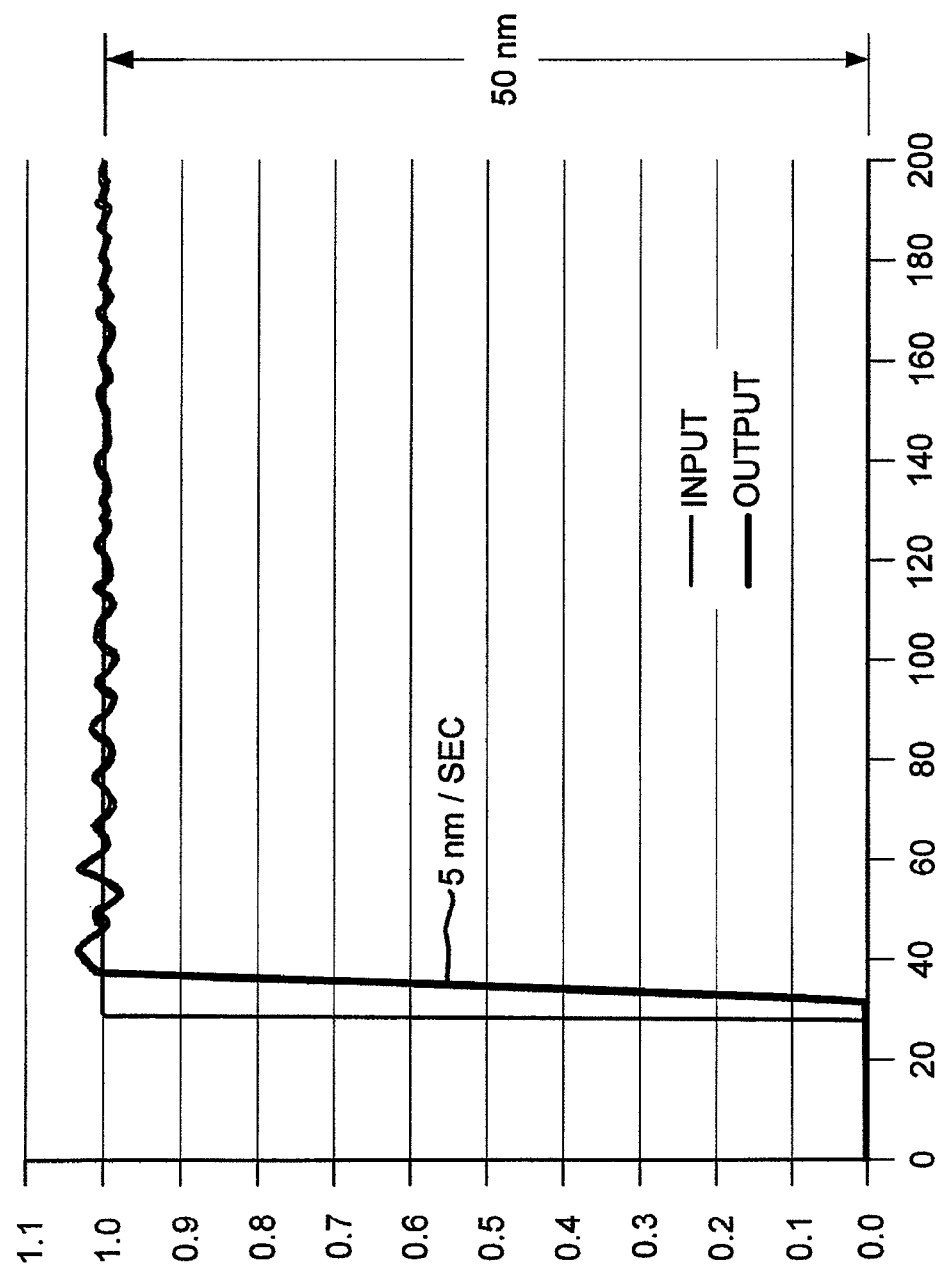

The open loop z-actuator dynamics of this design are shown by the curve 13 in FIG. 6A, showing a fundamental resonant frequency of the actuator assembly of roughly 180 kHz at point 15. This AFM system was tested in closed loop operation according to the schematic of FIG. 6A. This system achieved a closed loop bandwidth of 54 kHz and a step response slew rate of 5 mm/sec. as shown by the curves 17 and 18 in FIGS. 6B and 6C, respectively.

Figure 7:
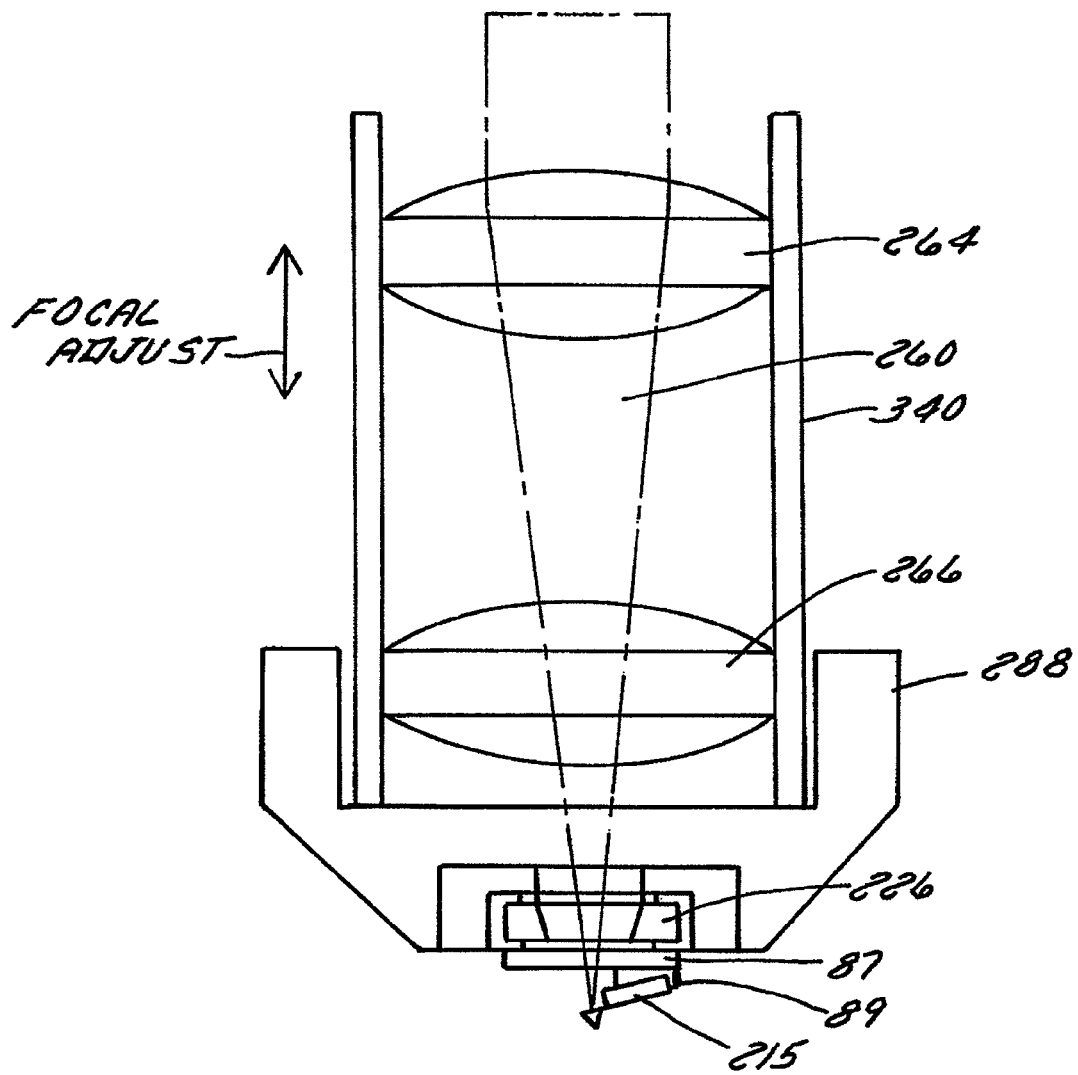
FIG. 7 schematically illustrates a simplified conceptual diagram of the objective lens and high bandwidth z-actuator of an embodiment of the AFM of the current invention.

The inventors have also built additional embodiments surrounding an alternative AFM design using a flexure-based scanner and a precision scanned objective. A simplified schematic diagram of the fast z-actuator 226 of this design is shown in FIG. 7. FIG. 7 also shows a simplified schematic design of focus and viewing objective according to one embodiment of the invention. A sensing light beam passes through scanning lenses 264 and 266 to focus near the tip of probe 215. Lenses 264 and 266 are held in a lens mount 340 that can be translated vertically relative to a sleeve 288. This relative motion allows the focal point of the objective to be adjusted to bring the probe 215 or the sample (not shown) into focus. Probe 215 is mounted below a liquid sealed window 87 that is coupled to the sleeve 288. Also coupled to the sleeve is a high-bandwidth z-actuator 226.

The z-actuator 226 of the embodiment shown in FIG. 7 is mounted in a way so as to minimize excitation of parasitic resonances of components of the scan head 210 of FIGS. 2 and 11-13. This can be accomplished, for example, by mounting the actuator on a very rigid mount that does not transmit vibrations to the surrounding structure. It could also be accomplished by a very compliant structure that absorbs vibrations, and/or by balancing the momentum of the z-actuator as described previously.

Figure 8:
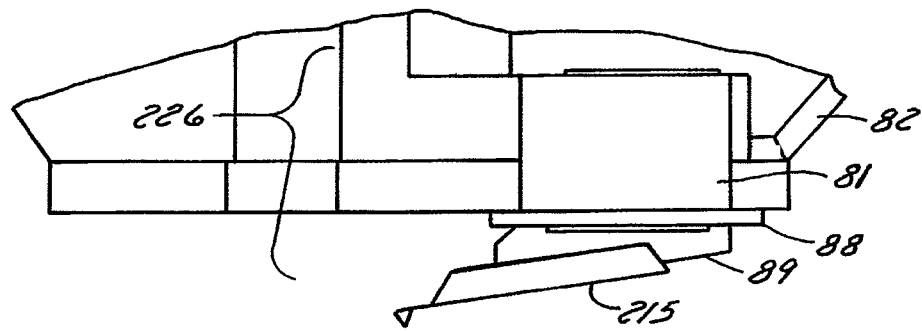
FIG. 8 schematically illustrates a portion of an SPM scan head constructed in accordance with a preferred embodiment of the invention.
Figure 9:
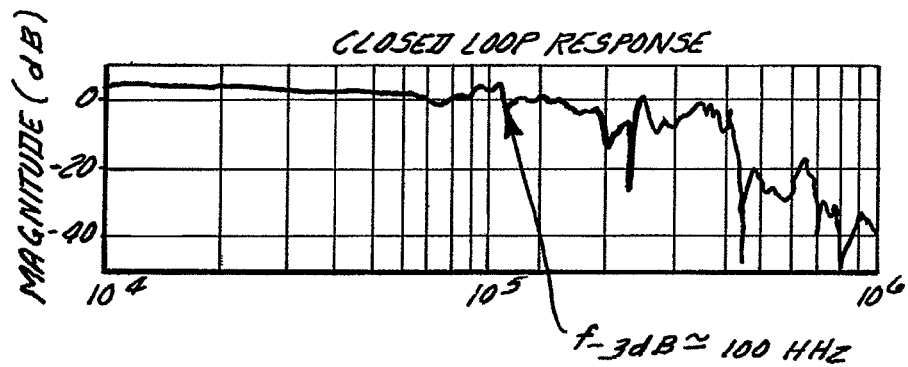
FIG. 9 is a graph illustrating the response of the z-actuator illustrated in FIG. 8.

Referring now to FIG. 8, one embodiment of a z-actuator 226 usable in scanner of FIG. 7 is shown. This embodiment was constructed using 2×3×3 mm piezo stack 81 glued to a rigid mount 82. A thin metal membrane 88 covers the moving end of the piezo stack 81. The membrane 88 acts as a flexure that stiffens and guides the piezo stack to minimize unwanted motion of the probe. A wedge 89 is mounted on the flexure membrane 88, and the cantilever probe 215 is mounted on the wedge. Using this design in combination with active damping of mechanical resonances of the system, the inventors achieved a closed loop actuator bandwidth in excess of 100 kHz, as shown in FIG. 9.

Figure 10:
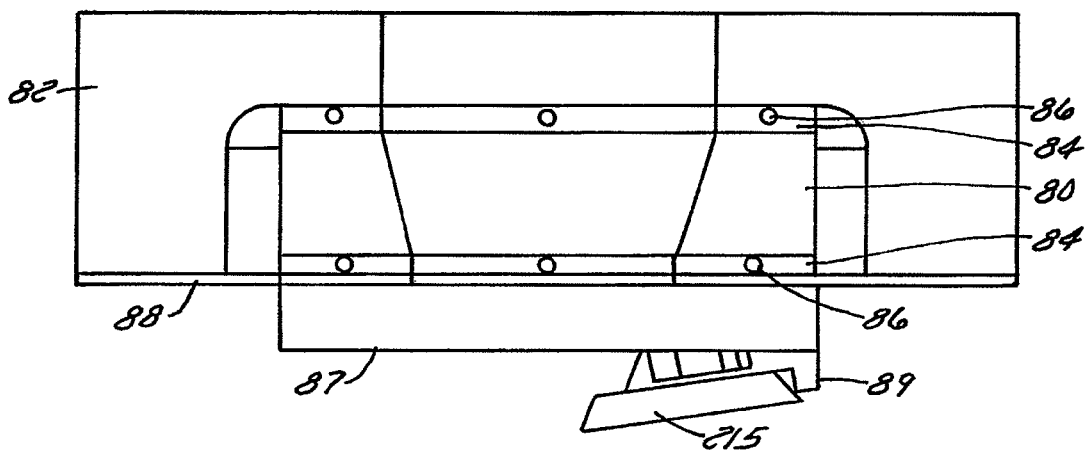
FIG. 10 schematically illustrates a portion of an SPM scan head constructed in accordance with another preferred embodiment of the invention.

Referring now to FIG. 10, in another embodiment, the z-actuator 226 comprises a piezoelectric ring stack 80 attached to a rigid mount 82. The piezoelectric ring stack 80 is fastened to the rigid mount 82 using a controlled thickness of a glue line 84. Steel balls 86 with a diameter of 0.3 mm are inserted between the piezo stack 80 and the rigid mount 82. The balls 86 can accomplish two things. First, they provide hard mechanical coupling between the rigid mounting surface and the piezo stack. Second, they control the thickness of the glue line. A flexible epoxy, for example Scotchweld 2216, was chosen as the glue to allow the mounting surface of the piezo stack 80 to expand without creating unwanted strains in the piezo stack or the mounting surface that could cause parasitic coupling of the z-actuator's motion to other axes and/or other system components. A flexure 88 is mounted across the face of the piezo ring stack 80, stiffening and attenuating xz and yz bending modes that might otherwise be of a lower frequency than the desired extensional (z-axis) mode. Note that the description of specific size balls, epoxy selection and piezo ring stack are for purposes of enablement and example. Many alternative arrangements may also be employed.

3. Tip Scanner

Figure 12:
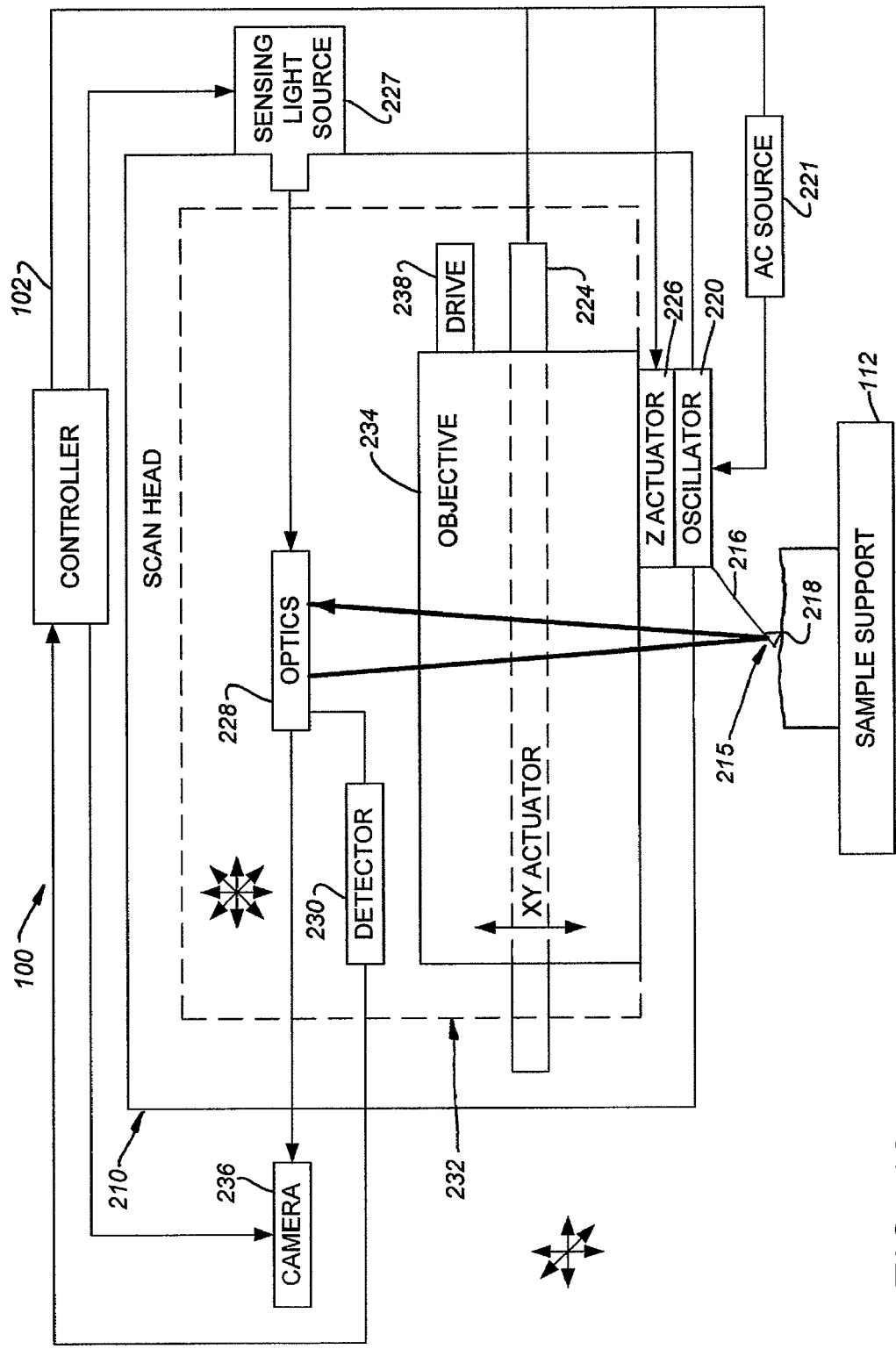
FIG. 12 schematically illustrates a tip scanner of the scan head of FIG. 11.

We will now describe the details of the other subsystems of a complete scan head 210 shown schematically in FIG. 12, along with an AFM 100 in which it is incorporated. That tip scanner is also described in co-pending and commonly assigned U.S. patent application Ser. No. 11/687,304 (the '304 application) and entitled *Fast-Scanning SPM Scanner and Method of Operating Same*, the subject matter of which is hereby incorporated by reference in its entirety. It should be understood, that a wide variety of other tip scanners and even sample scanners could also be employed without departing from the spirit of the present invention.

Turning to a FIGS. 11 and 13-15, the scan head 210 of this embodiment has an x-y actuator 224 that bears a tracking objective 234 as well as a z actuator 226. The scanner formed the moving components of x-y actuator 224 and the structure that moves with them move the probe or tip relative to the sample and can be thought of as a "tip scanner." The tip scanner preferably has a lowest fundamental resonant frequency of a least 5 kHz, more preferably of at least 7 kHz), and even more preferably of at least 10 kHz. It also has a relatively large scan range in the x and/or y directions, preferably of at least 4 µm, more preferably of the least 15 µm, and even more preferably of 20 µm or longer. The "scan range" will typically be the length of the scan in the long, or x, direction of a raster scan, but that need not be the case. Scanning could also take place in the y direction or, with an appropriately configured actuator, along a curved line having both x and y components. A tip scanner achieving these characteristics in the x and/or y directions is described in more detail below in conjunction with FIGS. 13-15.

Referring particularly to FIG. 12, the tip scanner of the preferred embodiment is mounted on the scan head 210. The tip scanner includes the moving portion of the xy actuator 224 and the structures that move with it, namely, the probe 215, the z-actuator 226, and the objective 234. Note that the z-actuator can alternatively or additionally be configured to be separate from the tip scanner and move the sample instead. Probe 215 can also be actuated to move in the z direction using a z-actuator 226.

The actuators for the x, y and z axes are piezoelectric stacks in one embodiment. However, they can also employ any number of alternative actuation technologies, including, but not limited to, other piezoelectric devices, actuators formed from electrostrictive, magnetostrictive, electrostatic, inductive, and/or voice coil drive mechanisms, and other actuators that generate a motion in response to an input signal. The x and y actuators may be integrated into an x-y actuator or stage 224.

Referring again to FIG. 12, the scan head 210 also supports an optical microscope 232 permitting the optical inspection of the sample. The microscope 232 includes a portion of the optics 228 as well as the objective 234. The optics 228 direct both the illumination beam and the sensing light beam to the probe 215 and direct the reflected sensing light beam to the detector 230 and the reflected illumination beam to a receiver 236. The objective 234 may additionally be focused on a sample that is beyond the position of the cantilever. In this case the illumination beam is focused on the sample, and an image of the same is transmitted through the objective 234 and to the receiver 236. The receiver 236 may, for instance, be an imaging device such as a camera. A CCD camera is a suitable imaging device. Alternatively or additionally, a separate light source and receiver could be provided on-board and/or off-board the scan head 210. In addition to or instead of a camera, the receiver 236 could be the human eye.

The illumination beam may be any form of light that can be observed either visually or with suitable instrumentation. It may come from an ultra bright Light Emitting Diode (LED) or an incandescent, fluorescent, or arc-based light source. It may be either monochromatic (e.g. a red LED) or a wider spectrum source approximating white light or even being white light.

The objective 234 is located in the optical path from the optics 228 to the probe 215. It may bear the z actuator 226 and the probe 215 so that all three devices move vertically as a unit. It may also be a scanned objective. That is, it may be coupled to the x-y actuator 224 so that the objective 234, z actuator 226, and probe 215 all move horizontally in the x-y plane under the power of the x-y actuator 224. In one preferred embodiment, the objective 234 accomplishes two tasks: (1) focusing the sensing light beam onto the probe; and (2) providing an optical image of the probe and/or sample. In alternative embodiments, the objective can be arranged to accomplish only one of these tasks and/or additional tasks. In one preferred embodiment, the objective 234 focuses incoming sensing and illumination light on an object beneath the scan head 210, typically the cantilever and/or the sample. In addition, in conjunction with the optics 228, it directs outgoing illumination light to the receiver 236 and outgoing sensing light to the detector 230. The outgoing illumination light forms an image of the object. A portion of the objective 234 containing its optics can be driven to move in the z direction under power of a drive 238 in order to extend the focus range of the objective as discussed below.

The interaction between the optics 228 and the objective 234 will now be described with reference to FIG. 13.

As discussed briefly above in connection with FIG. 12, the optics 228 and objective 234 direct the incoming sensing light beam to the cantilever 216 and direct the outgoing sensing light beam to the detector 230. The illumination beam is also directed to and from the objective 234 by a mirror 420 located above the remainder of the optics 228. A wide variety of arrangements and assemblies are capable of performing these functions. The design and implementation of such arrangements or assemblies are well within the knowledge of one skilled in the metrology art. One example is disclosed in detail in the above-referenced '304 application which, as discussed above, is incorporated by reference. A collimating lens 250 and an aperture 252 are located upstream from the optics 228 in the direction of incoming sensing light beam transmission. The collimating lens 250 transforms incoming light into a beam of parallel rays. It could be formed integrally with or contained in the sensing light beam source 227. The aperture 252 shapes the focused light beam at the cantilever 216 plane so as to have a generally elliptical or rectangular shape having a relatively narrow width or "minor diameter" to minimize the spot size, and also to maximize optical lever sensitivity. The minor diameter refers to the measurement of the spot size across the direction of least extent. This permits use of a smaller cantilever as described in detail below. Similarly-shaped apertures, such as ovoid apertures, could also be used for this purpose. This does not mean that an aperture is mandatory to the system. An aperture could be eliminated entirely or replaced by a circular aperture, in which case the minor diameter would be the only diameter.

Figure 13:
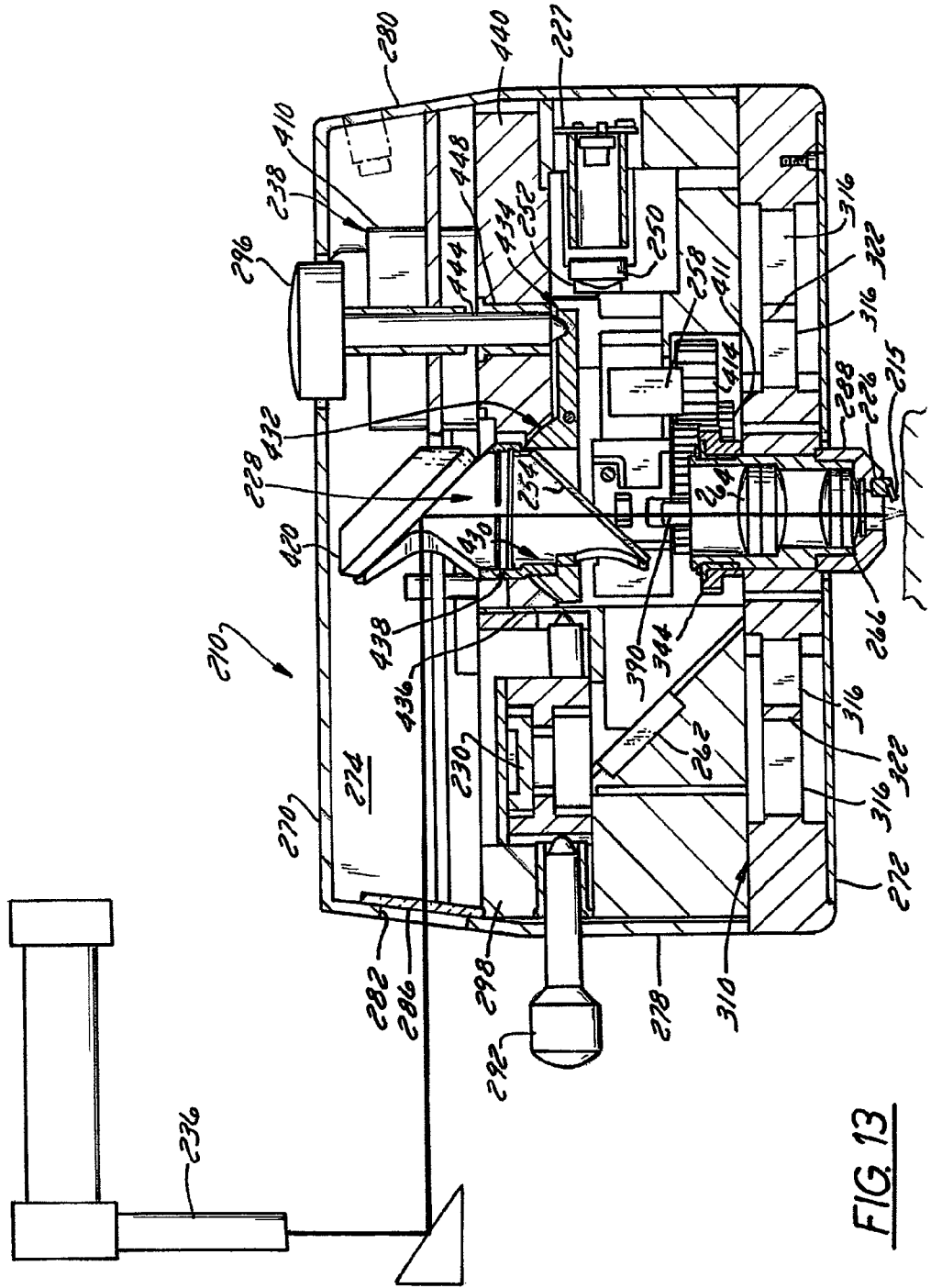
FIG. 13 is sectional elevation view of the scan head of FIG. 11.

Still referring to FIG. 13, the optics 228 include a device that deflects the shaped sensing light beam downwardly from the aperture 252. A standard mirror would be suitable for this purpose if some other mechanism were provided for directing the illumination beam through the objective 234. However, in the example in which the illumination beam enters the objective 234 directly from above, the device may be a filter 254 that is reflective of the wavelengths of the sensing light beam (on the order of 690 nm or higher for a red laser diode) and that is transmissive of the wavelengths of the illumination beam, generally covering a wide range of the visible light spectrum. For an alternate preferred embodiment employing an infrared light source for the sensing beam, the cutoff wavelength for filter 254 would be correspondingly higher. A prism 258 having two effective mirrors is provided for directing outgoing sensing light to a mirror 262. The mirror 262 then deflects the reflected light upwardly to the detector 230.

Figure 15:
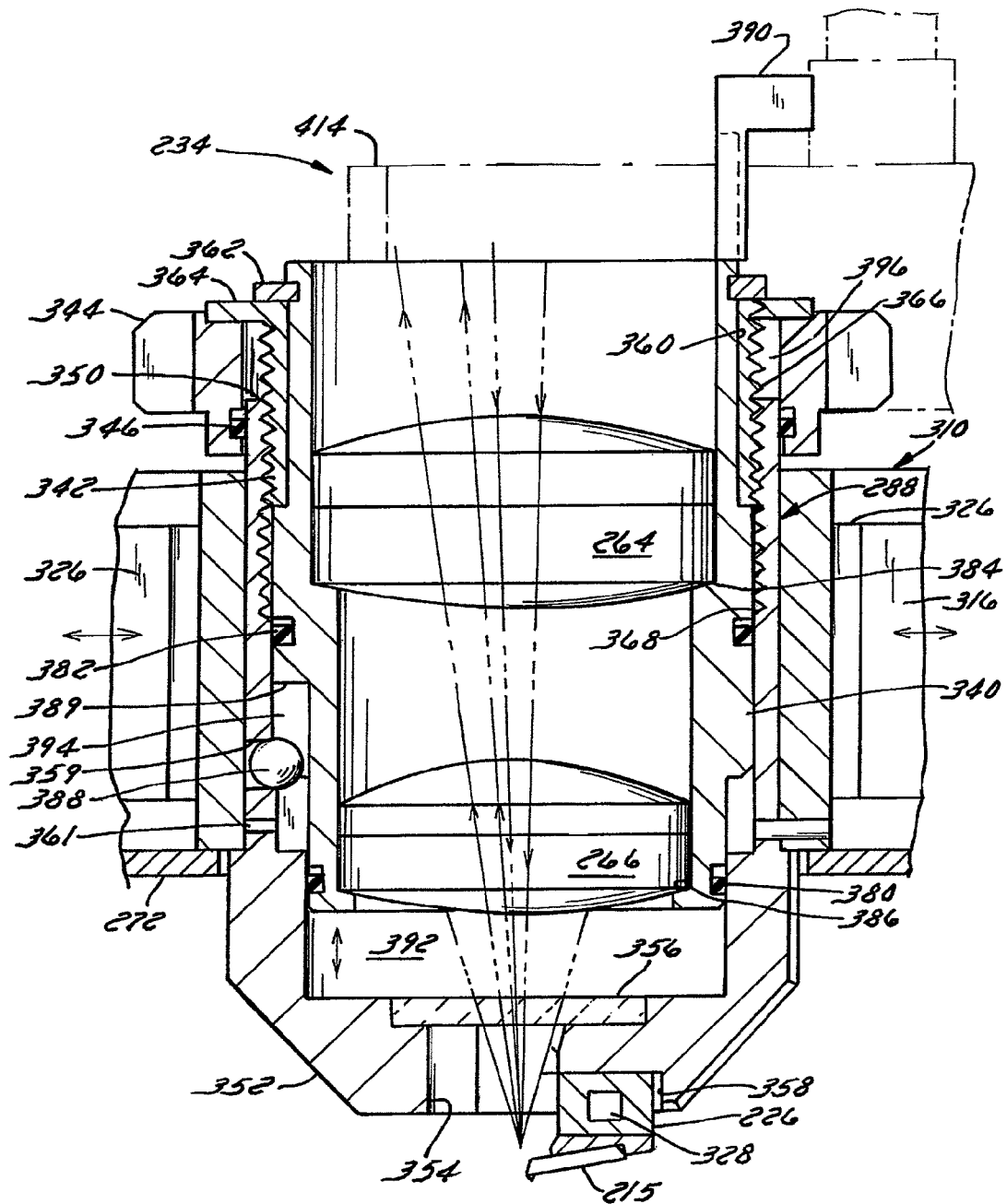
FIG. 15 is a sectional elevation view of the objective of the scan head of FIGS. 11 and 13.

Referring to FIGS. 13 and 15, in one embodiment, the objective 234 is a dual lens achromatic objective. It includes first and second vertically spaced lens assemblies 264 and 266 that focus an incoming sensing light beam to a focal point which, ideally, is located on the back surface of the cantilever 216. Each of the lens assemblies 264 and 266 of this specific embodiment is formed from two lenses affixed to one another. This combination of four lenses reduces the aberration of the objective to the levels desired to both focus the sensing light beam onto the probe and provide a high quality color image of the sample from the illumination beam. Lenses 264 and 266 may be achromatic doublets. Each lens may be customized to provide bright optical imaging and to provide a relatively broad wavelength spectrum.

The lenses of the currently-desired embodiment were custom designed using ZEMAX lens optimization software to minimize the optical path difference over the wavelengths of the illumination beam. In one embodiment, the lens assembly has a working distance of greater than 8 mm and more preferably greater than 10 mm.

The objective 234 may also be relatively wide so as to provide a relatively large numerical aperture (NA) to accommodate significant cantilever bending-typically on the order of ±4°. One preferred objective has an NA of more than about 0.28, preferably more than about 0.35, and most preferably of about 0.40. In one preferred embodiment, the light path for the illumination beam and the probe/sample imaging system is stepped down due to a numerical aperture of 0.28 to keep the aberrations at an acceptable level for the probe/sample image. A larger fraction of the objective is used to accommodate the reflected sensing light beam.

This combination of large numerical aperture and careful attention to minimizing aberrations produces the desired small laser spot diameter of less than 20 µm, preferably less than 10 µm, and most preferably of about 5 µm.

While the above description outlines the objective construction in one preferred embodiment, it is also possible to use a wide variety of different objective arrangements including more or fewer lenses. For a design that is optimized for maximum scan speed at the possible expense of image quality, it is possible to replace the four element objective with a single lens objective. Aspheric lenses, for example formed from lighter weight plastics, can achieve the combination of low aberration, wide NA, and low mass. Conventional stock lenses can also be used in a wide variety of configurations to form a suitable objective.

Figure 11:
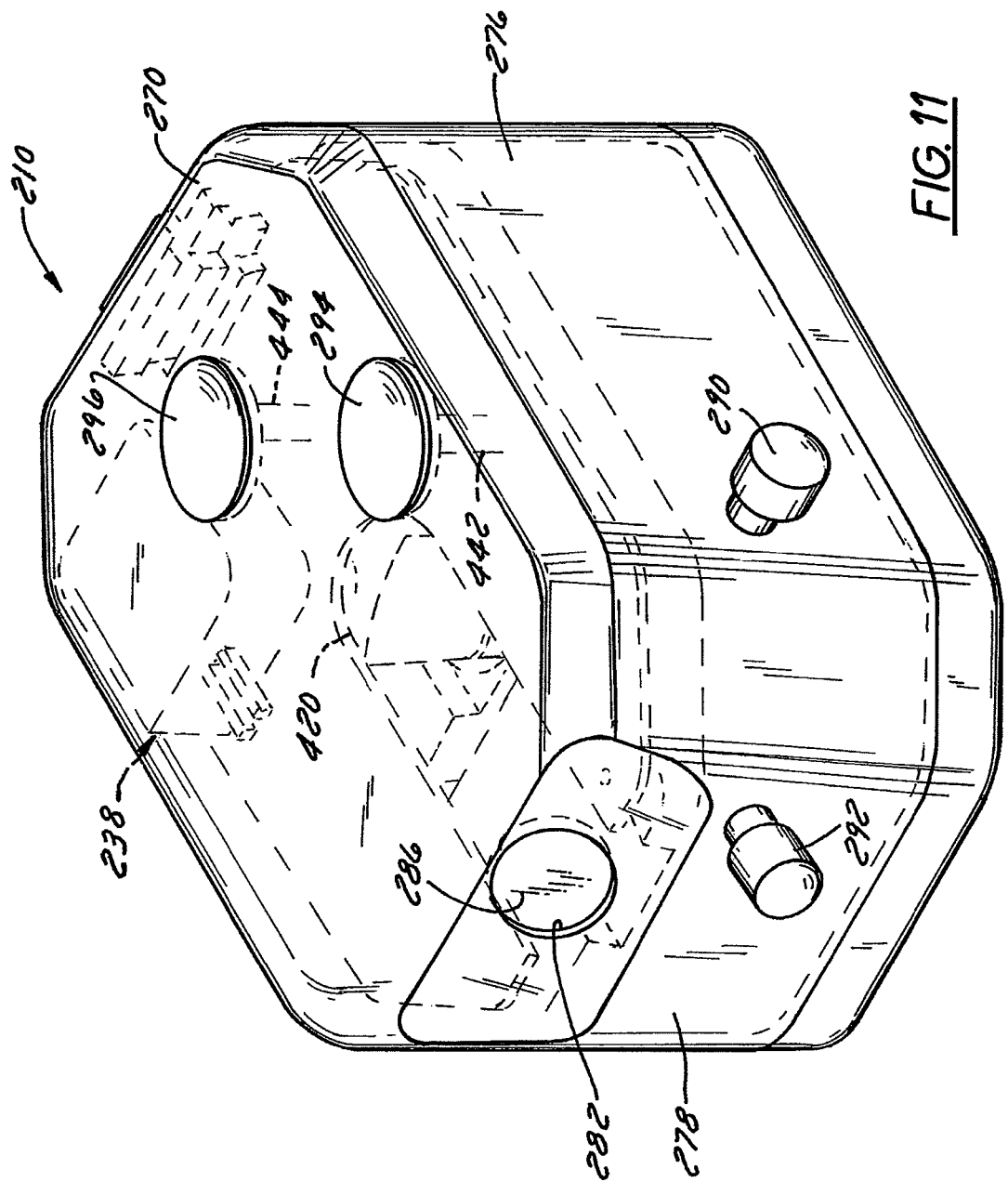
FIG. 11 is a perspective view of a SPM scan head usable in a preferred embodiment of the present invention.

Referring now to FIGS. 11, 13-15 and initially to FIGS. 11 and 13, a preferred embodiment of the scan head 210 is shown less schematically. Scan head 210 includes an enclosed housing having upper and lower surfaces 270, 272, left and right surfaces 278, and front and rear surfaces 278, 280. A first aperture 282 is formed in the front surface 272 for receiving a window 286 for the illumination light beam, and a second aperture is formed in the bottom surface 272 for receiving objective housing 288. First and second knobs 290, 292 extend from the right and front surfaces 276 and 278, and third and fourth knobs 294 and 296 extend upward from the upper surface 270. The first and second knobs 290 and 292 are threaded into a support in the scan head 210 and engage a carriage 298 that bears the detector 230. These knobs 290 and 292 can be manipulated to position the carriage 298 in the x-y plane to assure that the detector 230 is centered over the incoming sensing light beam. This permits the use of a smaller detector, potentially further increasing scan rate.

Figure 14:
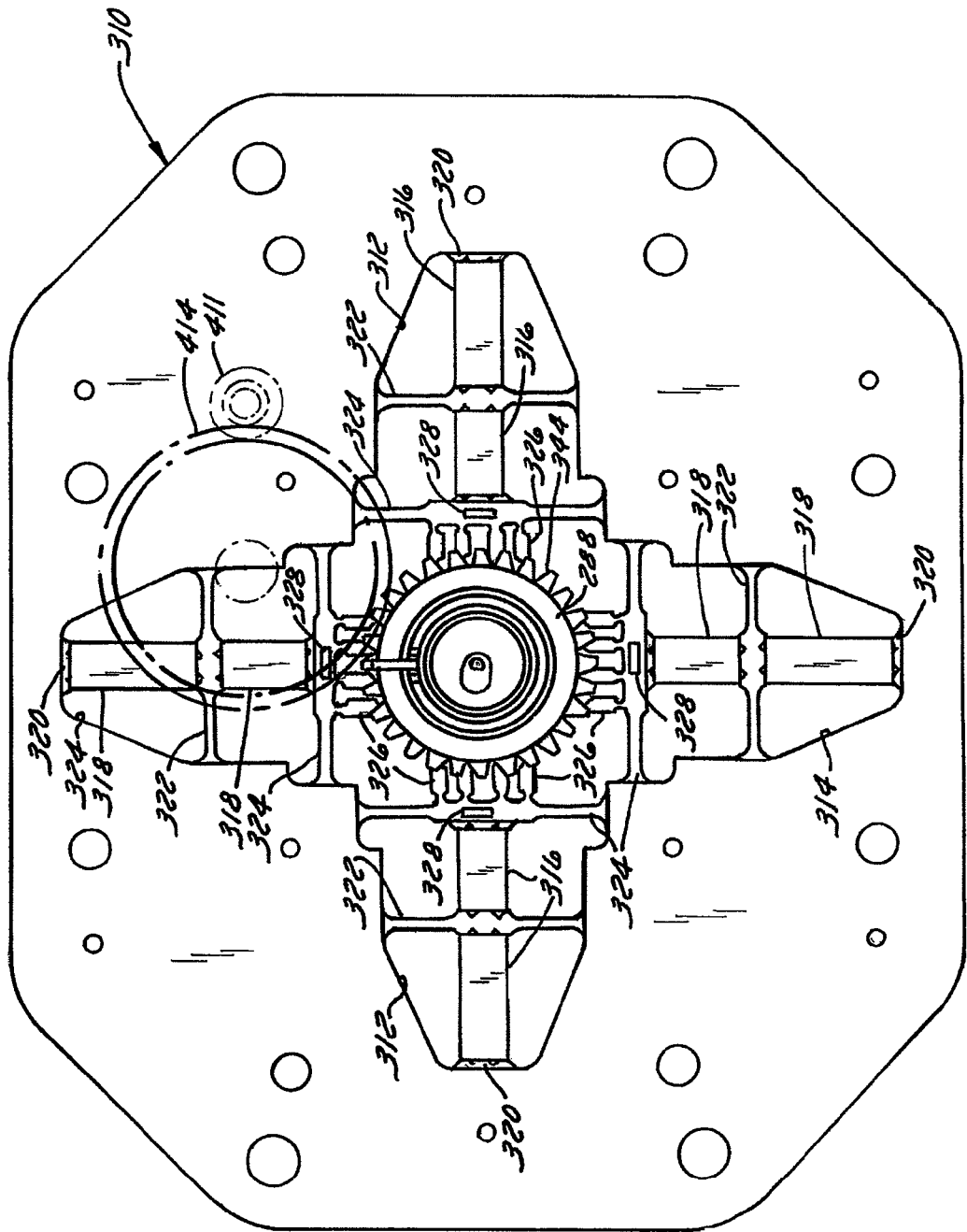
FIG. 14 is a top plan view of a portion of the scan head of FIGS. 11 and 13 including an x-y actuator, and objective, and an associated support structure.

The objective 234 may be mounted in the scan head 210 so as to permit the objective 234 to be moved up and down relative to the probe to increase the range of focus of the objective, hence permitting the use of a smaller cantilever 216 and potentially further increasing scan rate. This vertical measurement also permits focusing of the illumination beam on an object beneath the cantilever 216. This facilitates, for example, sample inspection in preparation for probe/sample engagement. It also is of relatively low mass so as to not significantly decrease the scanner's fundamental resonant frequency and, hence, maintain high scan rates. Toward this end, the lenses 264 and 266 that form the optics of the objective are mounted in the housing 288 or "barrel" as seen in FIG. 13 so as to be movable vertically relative to the barrel. The barrel 288 is mounted on the xy actuator 224. One preferred arrangement for the mounting of the barrel on the xy actuator is shown in FIG. 14. Before describing a preferred arrangement in detail, it should be noted that an xy actuator that is generally of the type described herein was developed by Dr. Paul Hansma's research group and is assigned to The Regents of the University of California. It is described, e.g., in published U.S. Patent Application Ser. No. 2006/0112760, the subject matter of which is incorporated herein by reference.

The illustrated arrangement includes a rigid mounting plate or scanner stage 310 fixed to the interior support of the scan head 210. The rigid mounting plate 310 has a generally-cross-shaped aperture formed centrally therein that has two sets of orthogonally arranged x and y segments 312 and 314. Two sets of x and y piezoelectric actuators 316 and 318 extend longitudinally along the centers of the respective segments 312, 314. One of the x-actuator sets 316 will now be described, it being understood that this description applies equally to the other x-actuator and the y-actuators 318 as well. One actuator of each set 316 has an outer end mounted on the end of the respective aperture segment 312 by a mount 320, and an inner end supported on a central flexure 322 that spans the aperture segment 312. The other actuator of each set 316 has an outer end connected to the central flexure 322 and an inner end connected to a second flexure 324 that also spans the aperture segment 312. The first or central flexure 322 of each set is not required but is beneficial because it increases the lowest resonant frequency of the associated piezoelectric actuator.

Actuators 316 and 318, in combination with the flexures 322, 324, and 326, provide an effective stiffness that, when loaded by the moving mass of the scanner, is designed to provide a fundamental resonant frequency of the scanner of at least 2 kHz, more preferably of at least 5 kHz, and even more preferably of more than 9 kHz. The significance of this feature will now be explained.

In scanning probe microscopes, feedback loops are used for multiple purposes. First, a feedback loop is used to attempt to maintain a relatively constant value of average tip sample interaction by maintaining constant cantilever deflection, amplitude, phase and/or frequency. This is often referred to as the z-feedback loop. The speed of the z-feedback loop is governed by the speed of the cantilever response, the z-actuator, and any associated electronics and amplifiers in the feedback loop. Another common form of feedback is position feedback. This type of feedback attempts to control the relative x-y position of the scanner to compensate for thermal drift, nonlinearities, hysteresis, and/or creep in the actuator.

The fundamental resonant frequency $F_o$ of a scanner can limit the usable feedback bandwidth of the scanner. In general, the dynamic behavior of a mechanical system is determined by the fundamental resonant frequency. The fundamental resonant frequency is characterized by a sharp increase in phase lag and gain in the frequency response of a mechanical system. The addition of feedback control is used to modify the dynamic behavior by changing the gain and phase of a system as a function of frequency. For example, consider a simple feedback loop for example a PI (proportional, integral) feedback loop common in probe microscopy. This type of control applies the sum of a constant gain (proportional) with that of 20 db/decade gain with 90 phase lag (integral gain). This feedback loop goes unstable as the gain is more than one at a phase shift of 180°. In this case, positive feedback occurs, and the control loop becomes unstable. When a mechanical body goes through a simple resonance, 90 degrees of phase shift are accumulated at the resonant peak, and there is generally an amplification of the actuator gain. (Real mechanical systems often have more complex phase behavior.) The controller gains are typically adjusted to roll off the overall system gain as the frequency approaches the actuator resonance. This strategy removes under-damped behavior in the control loop by minimizing the gain and reducing the phase lag near the fundamental resonant frequency. In practice, the feedback gains may be reduced even well below those at the limit of stability, to provide less overshoot in response to a step. In general, these steps will reduce the scanner system's usable bandwidth to a fraction of the fundamental resonant frequency. (Advanced control algorithms can mitigate the impact of these resonant frequencies.) For x-y scan motion, the bandwidth of the scanner is typically limited by resonances of the x-y scanner, and/or resonances in the z direction that couple to x-y motion. For the z-axis, the feedback bandwidth may also be significantly limited by the cantilever response time, in addition to or instead of the z-actuator resonance.

For the purposes of this application, the term "fundamental resonant frequency" is defined to be the lowest frequency at which there is a scanner resonance that has an impact on the usable bandwidth of a scanner. This definition of lowest fundamental resonant frequency specifically excludes those resonances that have no significant impact on the usable bandwidth of the scanner. These "minor resonances" may cause a variation in the system gain over a frequency range, but do not serve as a major limit for the feedback loop stability.

In a mechanical system, additional resonant behavior may exist in the frequency response at frequencies less than the fundamental resonant frequency. This resonant behavior does not affect the usable bandwidth if it is over-damped in nature due to a limited amount of associated phase lag and/or it is not of sufficient amplitude to be readily observed by the probe microscope electronics. The typical signature of a fundamental resonant frequency that limit the bandwidth of a scanner is a frequency with a 90° or more phase shift at the resonance peak that is observed by the probe microscope system electronics. To be observed, a resonance must be one which generates an under-damped response of sufficient magnitude to be detectable by an actuator position sensor such as one of the sensors 328 discussed below and/or the detector 230 and their associated electronics. The reason for this caveat in the definition of fundamental resonant frequency is that it is possible to construct a tip scanner that has a component (for example, a cantilever spring clip) with a resonant frequency that is very low and yet does not affect the scanner performance.

By the definition above, the fundamental resonant frequency of the tip scanner assembly of the preferred embodiment is about 9.4 kHz. The lowest resonant mode is a vertical or z-axis "drumhead" mode where the objective oscillates up and down relative to the x-y plane of the scanner.

To keep this resonance high for a given scanner mass, the fundamental resonant frequency can be increased by making flexures 322 and 324 that are very stiff against vertical bending and torsional rotation, and by making flexures 326 extremely stiff against vertical bending. The net effect of these optimizations is to make the vertical stiffness of the tip scanner very high. In one preferred embodiment, the vertical stiffness of the tip scanner is designed to be about $10^8$ N/m. An approximation of the fundamental resonant frequency is given by:

Where:

$$F_o = \frac{1}{2 \cdot \pi} \cdot \sqrt{\frac{K_{scanner}}{M_{eff}}} \qquad \text{Equation 6}$$

$F_0$=the fundamental resonant frequency of the scanner;

$K_{scanner}$=the stiffness of the scanner; and $M_{eff}$ is the effective mass of the scanner, which is the mass of all objects that move with the scanner.

The effective mass of the scanner of this specific embodiment is about 35 grams. Using the formula above would predict a lowest frequency of the order of 8 kHz. In practice, the resonant frequency calculation is more complex for distributed mass and spring systems such as the described scanner. As such, the described scanner was designed and optimized using a combination of analytical calculations in Matlab computing software by The Math Works in combination with finite element analysis. Using finite element analysis and measurements of the tip scanner prototype, the inventors achieved lowest vertical resonant frequencies in excess of 9 kHz, when loaded with the objective.

The torsional and bending stiffness of the flexure elements depends on the length, height, and thickness of the flexure elements. These relationships are well-known or at least readily available to those skilled in the art. For instance, they are available from various engineering texts, by finite element analysis, or by physical measurement. In general terms, it is desirable to make the length as short as practical and the height and thickness as large as practical. The practical limit to this optimization is when the bending stiffness in the desired direction of motion becomes so high that it resists the motion of the actuators.

In practice, the flexure elements 322, 324, and 326 have been designed to be so stiff that they reduce the range of motion of actuators 316 and 318, as shown in Equation 7 below.

The maximum actuator displacement, $\Delta X$, is given by:

$$\Delta X = X_o \cdot \left( \frac{K_{act}}{K_{act} + K_{flex}} \right) \qquad \text{Equation 7}$$

Where:
$X_0$ is the free range with no flexure;
$K_{act}$ is the actuator stiffness; and
$K_{flex}$ is the flexure stiffness.
The price of using a high stiffnesses $K_{flex}$ is a reduction of the available actuator range $\Delta X$.

To achieve high resonant frequencies of the assembled scanner system, the flexures 322, 324, and 326 are designed to have a stiffness in the direction of motion of 10-30% of the stiffness of actuators 316 and 318. This allows an acceptable trade-off of the scan range versus stiffness of the actuators to ensure that the combined system has a high lowest fundamental resonant frequency. In one embodiment, for example, a sacrifice of roughly 20% of the 22 µm range of the free actuator range achieves a stiffness sufficient for a resonant frequency of around 9.4 kHz while still achieving a scan size of 18 µm.

In a preferred embodiment, the actuators 316 and 318 are combinations of sets of two 5 mm×5 mm×13.5 mm piezo stacks and two 5 mm×5 mm×9 mm stacks, respectively. The combined stiffness of the actuator sets roughly $5 \times 10^7$ N/m in both the x and y directions. The total flexure stiffness was chosen to be around $1 \times 10^7$ N/m, or 20% of the actuator stiffness. This large bending stiffness of the flexures also gives a slight increase (~10%) over the actuator stiffness.

Additionally, the flexure materials and thicknesses of this embodiment have been chosen to ensure that the maximum stress in the flexures is well below yield stresses for those materials.

In one embodiment, the scanner stage 310 is constructed from an 7076-T6 aluminum alloy, and design stresses were kept below 10 kpsi, or under 14% of the yield stress. Alternative embodiments could also be constructed from invar (for superior thermal expansion performance) or titanium, for example.

It can be seen that the second or innermost flexures 324 form a generally square frame. The barrel 288 is mounted to this frame by four sets of flexures 326, each of which extends perpendicularly from a respective portion of the barrel 288 to respective one of the innermost flexures 324. Due the arrangement of the piezoelectric elements 316, 318 and the flexures 322, 324, and 326, actuation of the x or y actuator 316 or 318 drives the barrel 288 to move in the x or y direction within the x-y plane with virtually no movement in the other direction within that plane or in the z direction.

The scanner 310 shown in FIGS. 11-15 can be configured to translate the AFM probe, or can equally well be configured to translate a relatively small sample (not shown) instead of the scanned objective. Specifically, the scanner described herein, can translate samples up to a weight similar to the scanned objective (roughly 35 grams) without significant decrease in performance. For smaller samples, e.g. a few mm across, the performance will be even better.

Turning now to FIG. 15 the objective 234 includes the barrel 288, a lens support 340, and a sleeve 342 located radially between the lens support 340 and the barrel 288. A gear 344 is rotatably mounted on the outer surface of the upper end of the barrel 288. It is restrained from radial motion relative to the barrel 288 by an o-ring 346. The barrel 288, sleeve 342, and lens support 340 will now be described in turn.

The barrel 288 is a relatively rigid, preferably metal, structure affixed to the xy actuator 224 as described above. It takes the form of a hollow cylinder that is open at its top end 350 and is enclosed at its bottom end 352. It is also stepped at its bottom end. A central aperture 354, covered by a transparent window 356, is formed in the bottom end 352 to permit light to pass between the objective 234 and the probe 215. The aperture 354 is also counter-bored at its bottommost end to form a mounting location 358 for the z actuator 226 and the probe 215. A socket 359 is formed in the outer wall near the bottom end of the barrel 288, and a vent passage 361 is located beneath the socket 359.

The sleeve 342 comprises an annular metal ring located in a recess 360 in the outer periphery of the lens support 340. The sleeve 342 is retained in the recess 360 by a ring 362 at its upper end and by the bottom of the recess 360 at its lower end. This mounting prohibits the sleeve 342 from moving axially relative to the lens support 340 but permits free rotational movement therebetween. An annular shoulder 364 extends radially from the upper end of the sleeve 342 and is affixed to the gear 344 so that the gear 344 and sleeve 342 rotate as a unit. The outer periphery of the sleeve 342 beneath the shoulder 364 is threaded at 366 and mates with an internally threaded portion 368 of the inner surface of the barrel 288. The mating threads cause the sleeve 342 to screw into and out of the barrel 288 upon rotation of the gear 344 and sleeve 342.

Still referring to FIG. 15, the lens support 340 comprises a cylindrical tube having a maximum OD that closely matches the minimum ID of the barrel 288 so as to permit sliding movement of the lens support 340 within the barrel 288 with minimum "play" or side-to-side motion therebetween. The lower end of the lens support 340 is stepped to match the step in the barrel 288. First and second O-rings 380, 382 are mounted in the OD of the lens support 340 at its bottom and central portions, respectively, so as to virtually eliminate play between the lens support 340 and the barrel 288. The inner peripheral surface of the lens support 340 is stepped at two locations 384 and 386 to provide mounting locations for the first and second lens assemblies 264 and 266, described above. A ball 388, mounted in the socket 359, engages a groove 389 formed in the outer surface of the lens support 340 so as to prevent rotational movement of the lens support 340 relative to the barrel 288 while permitting longitudinal vertical movement therebetween. A flag 390 is mounted on the upper surface of the lens support 340 for engagement with a limit switch or a similar mechanical, electrical, or optical sensor when the lens support 340 reaches its uppermost or lowest limit of travel.

Still referring to FIG. 15, a bottom chamber 392 is formed between the bottom of the lens support 340 and the inner surface of the bottom portion of the barrel 288, and an annular chamber 394 is formed between the lower portion of the outer periphery of the lens support 340 and the inner periphery of the barrel 288 at a location above the step in the barrel. Another annular chamber 396 is formed between the ID of the gear 344 and the OD of the sleeve 342 above the upper end of the barrel 288. All three chambers 392, 394, and 396 increase in size as the lens support 340 moves upwardly within the barrel 288 and decrease in size as the lens support 340 moves downwardly within the barrel 288. Measures may be taken to vent air from the chambers 392, 394, and 396 during downward movement of the lens support 340. In the current embodiment, air from the bottom chamber 392 can vent into the annular chamber 394 by flowing past the O-ring 380, and air from both chambers 392 and 394 can be vented from the barrel 288 by passing through the vent passage 361. Air from the upper chamber 396 is vented by flowing between the gear 344 the outer surface of the barrel 288 and past the O-ring 346.

In use, when the gear 344 is driven to rotate by the drive 238 in FIG. 12, the sleeve 342 is driven to rotate relative to both the lens support 340 and the barrel 288. This rotation causes the sleeve 342 to screw into or out of the barrel 288, driving the lens support 340 to move upwardly or downwardly relative to the barrel 288. The ball 388 prevents the lens support 340 from rotating. Air trapped in the chambers 392, 394, and 396 during downward movement of the lens support 340 vents as described above. The range of motion that is available may vary with operator preference and system requirements. Ideally, the range of motion should be long enough to focus on the cantilever 216 and to also focus on the sample for inspection purposes when the probe 215 is located well above the sample surface. This requires a focus depth of on the order of 1 mm. In the illustrated embodiment, this focus depth is achieved by providing the lens support 340 with a stroke of at least 1 mm, preferably of 2 mm or more, and most preferably about 3 mm, with respect to the barrel 288.

The drive 238 of FIG. 12 may comprise any device, assembly, or system that can be used to drive the gear 344 to rotate through a precisely controllable angular range of motion. It also may be one that does not in any way constrain the lens support 340 from vertical motion or that interferes with the operation or reduces the range of operation of the x-y actuator 224. A manually operated knob could be used for this purpose. A powered motor is preferred. One-preferred drive comprises a stepper motor (not shown) mounted in the scan head 210. The stepper motor has an output gear 411 coupled to the drive gear 344 for the objective by an idler gear 414 (FIG. 14). The stepper motor, gear train, and thread pitch may be selected to achieve a precision of less than 1 µm of lens support vertical motion per motor step. The idler gear 414 and drive gear 344 have more than ample backlash to permit the range of motion provided by operation of the x-y actuator 224 and, accordingly, impose no constraints on operation of the x-y actuator 224.

In use, the sensing light beam emitted by the source 227 is collimated by the collimator 250, shaped by the aperture 252, and then deflected to the objective 234 by the filter 254 as seen in FIG. 13. The light is then focused onto the cantilever 216 by the objective 234 and is reflected back through the objective 234 to the filter 254. However, the outgoing sensing light beam is traveling along a subtly different path than the incoming light beam due to the effect of its deflection from the inclined cantilever 216; therefore, the outgoing beam impinges on the first prism surface after being deflected by the filter 254 rather than being directed back toward the aperture 252. It is then deflected to the detector 230 by the second prism surface and the mirror 262. The resultant data, or information derived from it, may be viewed, stored, and/or transmitted to a different location.

At the same time, the illumination beam from the camera 236 enters through the front window 286, is deflected off the upper mirror 420, and travels to the objective 234, which focuses the illumination beam onto an object, typically either the cantilever 216 or the underlying sample surface. The reflected light illumination beam thereafter returns through the objective 234 and is deflected again by the mirror 420 so that it is directed back to the camera 236. The optical image, or information derived from it, may be viewed, stored, and/or transmitted to a different location.

The illumination beam mirror 420, as well as the optics including the filter 254 and the prism, may be movable as a unit in order to pan the instrument in the x-y plane. Because it adjusts both the sensing light beam optics and the illumination beam optics, this adjustment permits the sensing light beam focal point to be centered or "targeted" on the cantilever 216 and to be at the center of the optical microscope's field of view. The ability to both target and focus the sensing light beam permits the use of a smaller cantilever, potentially further increasing scan rates.

In a preferred embodiment, this targeting is made possible by mounting the optics 228 and mirror 420 on a "tip-tilt" stage 430 as seen generally in FIG. 13. The tip-tilt stage 430 may, for instance, include a gimbal 432 in the center of a plate 434. The gimbal 432 is formed from an annular, generally spherical surface 436 that bears against a mating socket 438 formed in a support beam 440 in the scan head 210 as seen in FIG. 10.

Referring to FIGS. 11 and 12, knobs 294 and 296 are mounted on the upper ends of posts 442 and 444 threaded into the beam 440. Rotation of either of the knobs 294 or 296 screws the associated post 442 or 444 into or out of the beam 440, resulting in pivoting of the plate 434, rotation of gimbal 432, and tilting of the tip-tilt stage 430. The posts 442 and 444 are positioned such that vertical motion of the first post 442 rotates the gimbal in the y-z plane for y panning and vertical motion. The second post 444 rotates the gimbal 432 in the x-z plane for x panning.

As mentioned above, this panning permits the sensing light beam to be precisely centered on the cantilever 216, possibly under visual inspection with the aid of cross-hairs or the like on a lens or monitor. When combined with the focusing effect of movable objective 234, a sensing light beam spot having a minor diameter of less than 20 µm can be centered on the cantilever 216. That sensing light beam spot minor diameter is preferably less than 10 µm, and most preferably less than 5 µm. Spot diameters are defined to be the width at which the amplitude of light drops to $1/e^2$ of the amplitude at the center of the spot. Provision of this small sensing light beam spot permits the use of a correspondingly small, correspondingly high resonant frequency cantilever. Cantilevers having a width of 10 µm or less and a length of 35 µm or less have a resonance frequency more than 500 KHz. This high-bandwidth cantilever, in conjunction with the use of the high-bandwidth x-y actuator assembly 224, permits faster scans than would be possible with larger cantilevers and high-mass scanners. In fact, the fundamental resonant frequency of the scanner is greater than 2 kHz, preferably greater than 5 kHz, and even more preferably greater than 9 kHz.

4. AFM System Details

Figure 16:
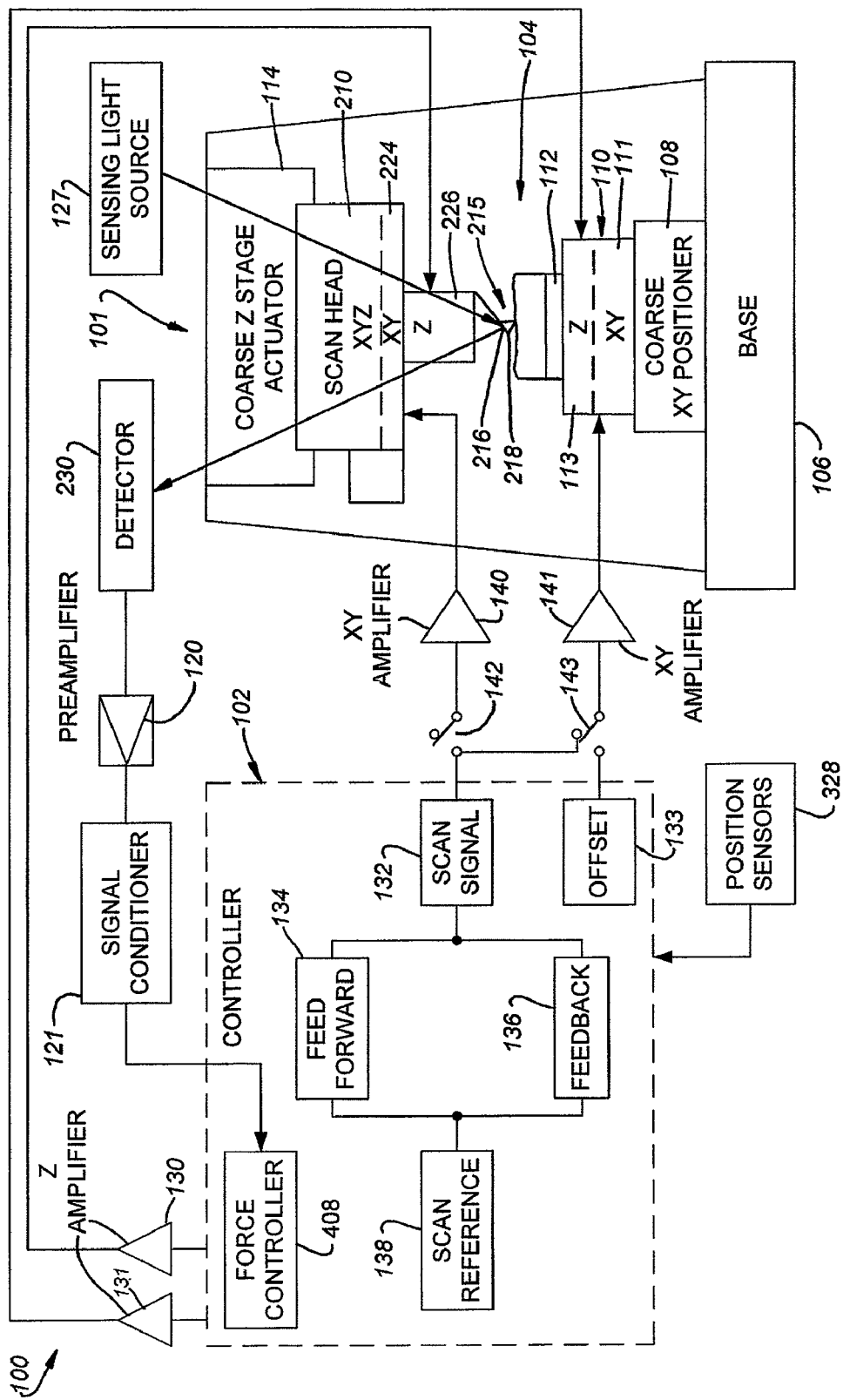
FIG. 16 is a simplified schematic view of a portion of an SPM system according to an embodiment of the current invention, including the scan control system.

Referring now to FIG. 16, an AFM 100 having capabilities described above is illustrated in greater detail and includes an instrumentation package 101 controlled by a controller 102. The instrumentation package 101 is mounted on a rigid frame 104 including a massive base 106. It includes a course x-y positioner 108 mounted on the base 106 and an optional xyz sample scanner 110 mounted on the coarse x-y positioner 108 and supporting a sample support 112. In addition, a course z-stage actuator 114 is mounted on the frame 104 so as to be positioned over the sample support 112. A scan head 210, which may for example be constructed as described in Section 3 above, is mounted on the course z stage actuator 114 and supports a probe 215. The coarse x-y positioner 108 has a relatively large range of movement so as to permit surveying of a large sample (for example 300 mm or more in diameter) to locate a region of interest. (A coarse z-stage can alternately be mounted on base 106 or coarse XY positioner 108 such that it translates the sample instead of the scan head.)

The coarse positioner 108, for example, may have about 100 mm of travel with about a 1 µm positioning accuracy. It may, for example, comprise a servo-motor or a stepper motor.

In addition to providing sample surveying, optional xyz scanner 110 expands the scan volume available for measurement by the AFM 100. For example, xyz scanner 110 may include an xy actuator 111 and a z actuator 113. The xy actuator 111 can also be used to offset the center of the scan area from a nominal central location as denoted by an offset signal 133 in FIG. 16, or can be used to image larger regions than the scan range of the xy actuator 224 in the scan head 210. It may, for example, have a scan range in the x-y plane of 100 to 200 microns and a z-travel range of 5-25 microns. Scanner 110 may also be controlled under the feed forward/feedback control scheme described in Section 7 below to perform a slow scan. Because it scans the sample rather than the probe, the scanner 110 can be thought of as a "sample scanner. Suitable sample scanners are commercially available, for example, from NPoint and Physike Instruments. Such sample scanners often employ position sensors to measure the motion of the scanner. Position sensors such as capacitive sensors and linear variable differential transformers (LVDTs) are most commonly used.

Still referring to FIG. 16, the probe 215 of this embodiment includes a cantilever 216 and a tip 218 mounted on the free end portion of the cantilever 216. Probe 215 may be a micro fabricated cantilever with an integrated tip. For optimal high speed performance, the preferred dimensions of the probes 215 are of the order of 35 µm or less in length with resonant frequencies greater than 800 kHz. Cantilevers smaller than around 10 µm and with resonant frequencies exceeding 5 MHz can also be used. Many other dimensions including larger and smaller cantilevers can be used successfully. Probe 215, alternatively, can be any of a wide field of probes that are used in scanning probe microscopy, including, but not limited to, probes for magnetic force microscopy, electric force microscopy, surface potential microscopy, chemical force microscopy, probes with carbon nanotube or carbon nanofibers, and probes for aperture-based or apertureless near-field scanning optical microscopy. One exemplary probe and its method of fabrication are discussed in greater detail in Section 5 below.

The preferred cantilever 216 has a force detection bandwidth greater than 30 kHz and preferably greater than 100 kHz and even more preferably greater than 500 kHz It also applies a very low force to the sample when activated in TappingMode. This force should be less than 10 nN and preferably less than 5 nN. It also has a step response time of less than 100 µsec, preferably less than 50 lts, and even more preferably on the order of 10-15 µsec. (As discussed in more detail in Section 5, below, the "step response time" is the time required for the encountering of a distinct step, such as a semi-conductor trench or line edge of a particular height, to be reflected in commensurate cantilever deflection.) A preferred probe and its method of construction are discussed in Section 5 below.

Figure 17:
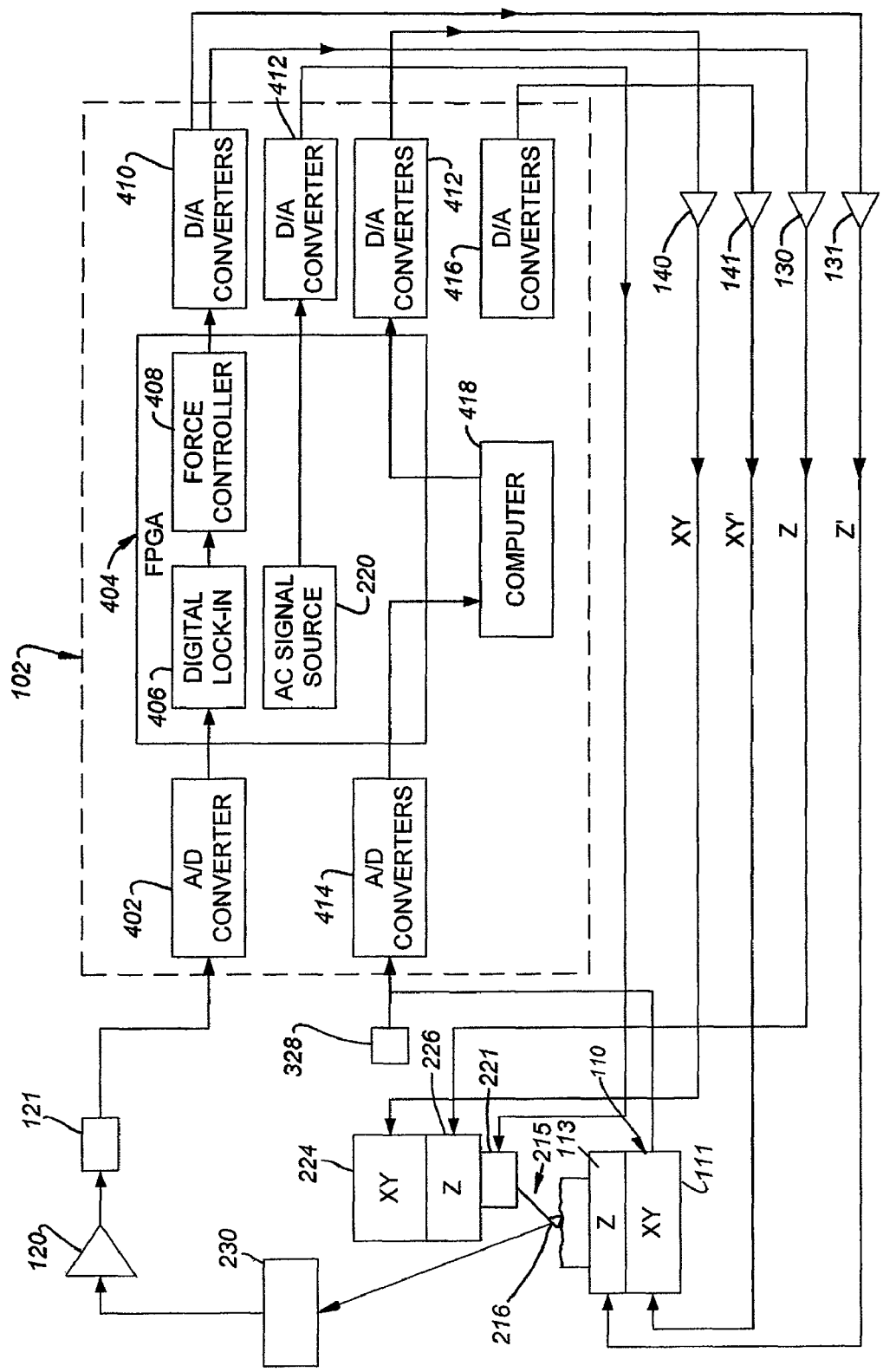
FIG. 17 is a simplified schematic view of a portion of an SPM system according to an embodiment of the current invention, including the force/z-axis control system.

Still referring to FIG. 16, the probe 215 may be operated in contact mode in which it is simply moved along the sample surface without oscillation or may be coupled to an oscillating actuator or drive 220 (FIG. 12) that is used to drive probe 215 to oscillate, for instance, at or near the cantilever's resonant frequency. The oscillation may be "flexural" or about the cantilever's longitudinal or major axis and/or "torsional" or about the cantilever's lateral or minor axis. The oscillating drive 220 may be coupled to an x-y actuator (described below) and probe 215, or may be formed integrally with the cantilever 216 of probe 215 as part of a self-actuated cantilever/probe. An electronic signal is applied from an AC signal source 220 (FIG. 17) under control of the AFM controller 102 to drive 220 to oscillate probe 215, preferably at a free oscillation amplitude $A_o$. The signal source 220 may be contained within the controller 102 as seen in FIG. 17.

Still referring to FIG. 16, controller 102 typically consists of at least one computer and associated electronics and software that perform the tasks of data acquisition and control of the AFM. In one embodiment, it has feedback control loop update rate of at least a 500 kHz and has an input/output delay of less than 5 µsec. This embodiment further supports a closed loop bandwidth in concert with the other system components described blow. The controller 102 may consist of a single integrated analog and/or digital unit, or may consist of a distributed array of electronics and software. The controller 102 may comprise a typical desktop computer, a laptop computer, an industrial computer and/or one or more embedded processors. It will most likely be located off-board the frame 104.

A workstation may also be provided in the controller 102 and/or in a separate controller or system of connected or stand-alone controllers. The workstation receives the collected data from the controller 102 and manipulates the data obtained during scanning to perform operating such as point selection, curve fitting, and distance determining. The workstation can store the resulting information in memory, use it for additional calculations, display it visually and/or audibly on a suitable monitor, or by printing, and/or transmit it to another computer or device by wire or wirelessly. The memory may comprise any computer readable storage medium, examples including, but not limited to, a hard disk, network storage, a flash drive, or a CD ROM. In one embodiment, the workstation is combined with the computer 102 discussed below in conjunction with FIG. 17. Alternatively, it may be located off-board the controller 102.

In operation, as the probe 215 is oscillated and brought near or into contact with a sample on the sample support 112, sample characteristics can be monitored by detecting changes in the oscillation of probe 215 caused by the probe-sample interation. In particular, a beam from a sensing beam light source 127 is directed by optics 228 (shown in FIG. 12) in the scan head 210 towards the backside of probe 215. The sensing light beam source 227 is typically a laser, most typically a visible or infrared laser diode. The sensing light beam can also be generated by other light sources, for example a He—Ne or other laser source, a superluminescent diode (SLD), a LED, an optical fiber, or any other light source that can be focused to a small spot. The term "laser" in the rest of this specification should be understood to cover a wide variety of these and other alternative light sources.

Still referring to FIG. 17, after impinging on the backside of the cantilever 216, the sensing light beam is then reflected back to the optics and then directed towards a detector 230, such as a four quadrant photodetector. The signals from the detector 230 are then amplified by a pre-amplifier 120. Preamplifier 120 typically includes a trans-impedance amplifier for each segment of the detector. Compensation of the trans-impedance amplifiers is typically selected to allow a measurement bandwidth greater than the resonant frequency of the cantilever 216. Other devices or assemblies that provide a signal that is related to the amount of sensing light impinging on the detector 230 may be used. The devices include, for example, switch capacitor preamplifiers. The preamplified signal is then processed by a preconditioner 121, and transmitted to the controller 102, which processes the signals to determine changes in the oscillation of probe 215. Preconditioner 121 typically performs any or all of the following tasks: (1) amplification, (2) filtering, (3) generation of vertical, lateral, and/or sum cantilever deflection signals.

Controller 102 of this exemplary embodiment uses the information provided by the detector 230 to generate z control signals that ultimately are transmitted to the z actuator 113 of the sample scanner 110, the z actuator 226 of the tip scanner 210, or both. In the present embodiment, the z-control control signals can be transmitted to both z actuators 113 and 226, which permits the z actuator 113 of sample scanner 110 to be used in a nested configuration with the z actuator 226 above. In the typical operation, the position of the z actuator 226 of the tip scanner is used as an error input to a feedback loop in the controller 102 that controls the z actuator 113 of the sample scanner 110. Specifically, the feedback loop attempts to servo the z actuator 226 back to a null position. Large offsets that might otherwise exceed the range of the z actuator 226 are accommodated by the larger range of the z actuator 113. This allows the combination of high bandwidth response (provided by z actuator 226) and large z range (provided by the z actuator 113). The resultant control signals for the actuators 113 and 226 can be thought of as a "large z-actuator control signal" and a "small z-actuator control signal," respectively.

Referring specifically to FIG. 17, the analog signal from the preconditioner 121 is forwarded to the controller 102, where it is converted to a digital signal by an analog-to-digital (A/D) converter 402. The A/D converter 402 may comprise a 50 MHz 16 bit converter. The resultant digital signal representative of probe position is then transmitted to a field programmable gate array (FPGA) 404. As is generally known in the art, a FPGA 404 is a semiconductor device containing programmable logic components and programmable interconnects. The programmable logic components can be programmed to duplicate the functionality of basic logic gates such as AND, OR, XOR, NOT or more complex combinational functions such as decoders or simple math functions. In most FPGAs, these programmable logic components (or logic blocks, in FPGA parlance) also include memory elements, which may be simple flip-flops or more complete blocks of memories. A hierarchy of programmable interconnects allows the logic blocks of an FPGA to be interconnected as needed by the system designer, somewhat like a one-chip programmable breadboard. Other devices, such as one or more application-specific integrated circuits (ASICs) or complex programmable logic devices (CPLDs) could be used instead of or in addition to the FPGA. In the FPGA 404, a digital lock-in 406 locks in the signals from the A/D converter 402, where the digital signal is mixed two references supplied by a digital synthesizer located in the FPGA. The first reference is an in-phase component, I, produced by combining the cosine of the digital reference signal with the signal from the A/D converter 402 in a first digital mixer and then filters it in a first filter. The second component is a quadrature component, Q, produced by mixing the sine of the reference signal with the AFM out signal from the synthesizer and filtering the mixed signal in a second filter. The I and Q signals are then converted by the FPGA to amplitude and phases signals, either or both of which may be used for force feedback control. The digital lock in 406 has a processing time of about 0.5 microseconds. That output from the lock-in 406 is fed to a force control algorithm 408, which generates the control signal(s) for the z actuators 226 and/or 113. The force control algorithm 408 may comprise a nested feedback force control algorithm that generates force control signals as described above. It typically has a processing time of abut 0.5 microseconds. The resulting force control signals are converted back to analog form in a digital-to-analog (D/A) converter assembly 410. Each connection in D/A converter assembly may comprise a 50 MHz, 16 bit converter. The resultant signals z and/or z' are then fed to the appropriate amplifier 130 or 131.

As mentioned above, the small z actuator and large z actuator control signals z and z' are amplified in the amplifiers 130 and 131 before being transmitted to the small z actuator 226 and the large z-actuator 113. The amplifier 130 for the z actuator 226 can be thought of a fast response amplifier. It should have a bandwidth of greater than 10 kHz, preferably greater than 30 kHz, and even more preferably greater than 100 kHz.

In the present embodiment in which the AFM is operated in TappingMode, non-contact mode or similar oscillating tip mode, the AC drive 220 signal for the oscillating drive 221 may also be generated in the FPGA 404 using, for example, a direct digital synthesizer (DDS) algorithm. The resulting high frequency digital drive signal is converted to analog form in a D/A converter 412 and forwarded to the oscillator 221. The converter may, for example, be a 500 MHz 16 bit converter.

As mentioned above, a major figure of merit for the force control loop is the force control range. This range determines the maximum height of a feature that can be scanned without applying excessive force to the tip and/or sample. In most cases, this range comprises the range of all the z-actuators, plus the maximum bend in the AFM cantilever or other tip support before unacceptable tip or sample damage occurs. The current inventors have developed an AFM system with a combined range of 28 um, 3 μm from the fast small z actuator 226, and 25 um from the slower large z-actuator 113.

The amplifier 131 preferably has a slew rate in terms of voltage per unit time sufficient to enable the force control slew rate described above. The amplifier slew rate required to obtain a desired actuator slew rate is dependent on the type and operating range of actuator that is driven by the amplifier and the shape of the waveform. For a piezo-stack actuator with an operating range 3 um, a 100 V maximum applied voltage, and a triangle drive waveform, the amplifier 131 should have a slew rate of at least 10 kV/sec, preferably of at least 17 kV/sec., and even more preferably of at least 33 kV/sec. Suitable amplifiers circuits can be built by those skilled in the art, for example using PA-93 or PA-98 high voltage op-amps from Burr-Brown and/or MP-38 high voltage amplifiers modules available from Burr-Brown. (In some cases it may be necessary to use multiple amplifier stages in series or parallel to achieve the desired slew rate and/or current capacity.) Another suitable amplifier design is described in co-pending application Ser. No. 11/831,175, entitled *High-Bandwidth Actuator Drive for Scanning Probe Microscopy* and filed Jul. 31, 2007. The subject matter of which is hereby incorporated by reference in its entirety.

The amplifier 131 for the large z actuator 113 can be thought of an offset amplifier. As mentioned above, the large z-actuator control signal may be used to attempt to null the position of the small z-actuator 226. The amplifier 131 may have a lower bandwidth than amplifier 130, but for the widest range of applications, it may also have a bandwidth similar to the fast response amplifier.

Other actuators, such as piezoelectric tubes, electrostrictive, magnetostrictive, electrostatic, inductive, and/or voice coil drive mechanisms would have different desired slew rates based on the operating voltage ranges.

After being amplified, the z-control signals z and z' are transmitted to the z actuators 226 and 113 and used to maintain a setpoint amplitude value, $A_s$, to ensure a generally constant force between the tip and the sample. Alternatively, a setpoint phase or frequency may be used for the monitored interaction. One or more other properties, such as adhesive properties, magnetic properties, electric forces, or conductivity could be used as setpoints for the monitored interaction. Regardless of the setpoint employed, the position of the of z actuator 226 is used as an error input to a feedback loop in the controller 102 that controls the z actuator 113 of sample scanner 110 as described above.

Returning briefly to FIG. 16, controller 102 also preferably generates a scan signal 132 that controls a scanner to move the probe 215 in the xy plane, typically in a raster scan in which the probe 215 is scanned along a number of lines in the x direction spaced closely to one another in the y direction. The scan signal 132, as well as the x-y control signal, may be generated under both feed forward control 134 and feedback control 136 to obtain the setpoint scan reference signal seen at 138. Position data for this control is provided by position sensors seen generally at 328. Capacitance, optical, strain gauge, or inductance sensors or any other sensor that produces an output indicative of actuator movement and/or position could be used for this purpose. In one embodiment, sensors are small strain gauge sensors discussed in Section 6 below.

The details of one embodiment for generating the scan signal 132 are illustrated in FIG. 17. There it can been that the analog signals from the sensors 328 are forwarded to the controller 102, where they are converted to digital signals by an A/D converter assembly. Two converters are provided in the assembly 414, one for each (x,y) axis. It should be noted at this time that each of the two A/D converters of the assembly 414, as well as the A/D converter for the force feedback signal, may actually be an assembly formed from three converters or digital-to-analog converters (DACs), namely, a scan DAC, a zoom DAC, and a triangle wave DAC. Such DAC assemblies are well known in the art.

The digital position data from the A/D converter assembly 414 is forwarded through the FPGA 404 to a computer 418 as seen in FIG. 17. (The FPGA 4404 merely acts as an interface for the transmission of the position data. It does not process that data.) Computer 418 may comprise software and/or hardware located within the controller or located in whole or in part off-board the controller 102. In one embodiment, it is a desktop PC located off-board and connected to the controller 102. It may incorporate a digital signal processor (DSP) that executes a feed forward/feedback control algorithm to perform the feed forward control 134 and the feedback control 136 of FIG. 16 and generates the digital scan signal. One preferred algorithm is described in Section 7 below. The scan signal is then directed back through the FPGA 404 (again, without being processed by the FPGA) to a D/A converter assembly 416. That assembly 416, like the A/D converter assembly 414, comprises separate converters for the x and y axes. Each converter comprises a 500 kHz 16 bit converter. The signals output from the converter assembly 416 form the scan signal 132 of FIG. 16.

Referring again to FIGS. 16 and 17, the scan signal 132 is amplified by one of two x-y amplifier assemblies 140 and 141. (While each amplifier assembly is shown as a single amplifier for the sake of simplicity, each amplifier assembly typically includes two or more amplifiers, one for each actuator of each (x,y) axis). Amplifier assembly 140 is coupled to the x-y actuator 224 of the tip scanner and receives signals from D/A converter assembly 410. It supplies an amplified xy device signal to the xy actuator 224. Amplifier 141 is coupled to the scan stage or xy actuator 111 of the sample scanner 110 and receive drive signals from a course D/A converter assembly 418 located on the controller. It supplies an xy drive signal to xy actuator 111. In the present embodiment, each amplifier of each assembly 140, 141 should have a bandwidth of greater than 210 Hz, more preferably greater than 350 Hz, and even more preferably greater than 700 Hz. These bandwidths will allow each amplifier of each assembly 140 and 141 to faithfully reproduce the first four Fourier components of a triangle wave scan pattern and will allow scanning in any orientation. (A simplified version would allow a lower scan bandwidth for the slow scan axis.) More or fewer Fourier components can be used depending on the precision desired for the scan pattern. For a piezo-stack actuator with an operating range of 125 V and a triangle drive waveform, the amplifiers 140 and 141 should have a slew rate of at least 7.5 kV/sec, preferably of at least 12.5 kV/sec., and even more preferably of at least 25 kV/sec. Other actuators, such as piezoelectric tubes, electrostrictive, magnetostrictive, electrostatic, inductive, and/or voice coil drive mechanisms would have different desired slew rates based on the operating voltage ranges. The amplified signals xy and/or xy' are then transmitted to an xy actuator 224 or 111. The driven xy actuator could be the actuator 224 of the tip scanner and could be operated by the signals xy to scan the probe relative to the sample. Alternatively, the xy actuator could be the xy actuator 111 of the sample scanner 110 and could be operated by the xy' signals to scan the sample relative to the probe 215.

This modular x-y scanner arrangement can be used in multiple ways depending on the needs of the user. For example, if a user wishes to first survey a large area, the system will enable a wide area scan with sample scanner 110. Once the user has zoomed to an area smaller than the scan range of tip scanner 224 (for example 15 um), the system can automatically switch to rastering the tip scanner 224 at the higher scan speeds enabled by it. Alternatively, the user may manually choose which scanner to enable. Additionally, the system can operate in "Pan and scan" mode where tip scanner 224 scans at high image rates and sample scanner 110 is used to offset (i.e. "pan") to different regions of the sample. Sample scanner 110 can also be used to manually or automatically piece together a mosaic of tiled images captured using the tip scanner 224.

Typical third party sample scanners often operate at speeds in the range of I line per second due to the greater masses involved and slower-acting actuators. However, the current inventors have applied adaptive feed-forward to such scanners and have achieved scan rates in excess of 50 Hz.

5. High Bandwidth Cantilever

As described above, the AFM of the current invention can be operated in contact mode, TappingMode, non contact mode and/or other oscillating tip modes. To obtain the highest imaging speeds, it is desirable to have a cantilever that can respond at high bandwidths. For TappingMode, the cantilever's response time is governed by several factors, including the resonant frequency of the cantilever, its quality factor Q when the tip is close to the sample surface, the fraction of the setpoint amplitude to the free air amplitude, and the frequency at which the cantilever is operated. In one embodiment of this invention, the cantilever is made of silicon nitride with an integrated sharp silicon tip. Alternative cantilevers can be made from silicon, silicon nitride, silicon carbide, metallic materials, polymer materials any combination thereof or other materials that may be formed and patterned in a thin film.

In the preferred embodiments, the cantilever has a resonant frequency from roughly 700 kHz to more than 5 MHz. Depending on the desired tip-sample interaction force and cantilever resonant frequency, the cantilevers are typically 5-50 µm long by 3-20 µm wide, by 1-5 µm thick. For example, a cantilever with a length of 10 µm and a width of 5 µm and a thickness of 0.5 um and a 2 um tall tip will have a resonant frequency of roughly 6 MHz and a spring constant around 20 N/m. A cantilever around 35 μm long with a width of 15 μm and a thickness of 0.8 μm has a resonant frequency of roughly 800 kHz, with a spring constant around 6 N/m. In one embodiment, the applicants have built trapezoidal cantilevers with a cantilever length of 35 μm, a base width of 40 μm, tapering to an end width of 7 μm, with a 0.6 μm thickness and a 3 μm tall tip. These probes were coated with 5 nm of Ti and 40 nm of gold (Au) to form a reflective coating. These probes have a resonant frequency of 750 kHz and a spring constant of around 8 N/m.

The shape of the high bandwidth cantilever probes may be rectangular, triangular, trapezoidal or other arbitrary shape to achieve the desired resonant frequency and spring constant. The dimension and shape can be optimized for particular combinations of resonant frequency, spring constant and quality factor Q, for example by calculations including formulas available in the literature and/or by computational fluid dynamics and/or experimentation. The quality factor Q depends not only on the viscous damping of the lever but also a "squeeze film" effect as the tip and cantilever come close to the sample surface. This affect can be optimized by controlling the shape of the cantilever and the height of the tip. Larger tips reduce the squeeze film effect resulting in higher Q cantilevers. In some cases it is desirable to make shorter tips to reduce the Q and thus decrease the cantilever response time. Using short tips around 1 μm tall, the applicants have made high frequency cantilevers with Q values of less than 50 in air with the tip close to the sample surface.

Again, the cantilevers are generally fabricated with a sharp tip. In that regard, for most high resolution imaging applications a tip having an end radius of <20 nm is desired. However, for some applications, especially force measurements on soft samples, a duller tip is preferred.

To have a short response time, it is often desirable to have a moderate quality factor Q, for example in the range of 10-200. A cantilever with a resonant frequency of 5 MHz, and a Q of 100, for example, will have a nominal bandwidth at resonance of 5 MHz/100=50 kHz. Higher bandwidths can be obtained with off resonance operation and/or at lower tapping amplitude setpoints. For example, a cantilever with a Q of 100 that is oscillated at an off-resonance frequency that only provides an amplification of 10× acts like a cantilever with an effective Q of 10 and will have a response time 10× faster than on resonance. Hence, a 5 MHz cantilever operated off resonance with an effective Q of 10, will have an approximate bandwidth of 500 kHz.

The slew rate (dA/dt) supported by a cantilever is given approximately by the equation:

$$dA/dt = (A_o - A_s)\omega/2Q \qquad \text{Equation 8}$$

Where:

$A_0$ is the free amplitude of the cantilever;
$A_s$ is the setpoint amplitude;
ω is the natural frequency of the cantilever; and
Q is the effective quality factor of the cantilever.

For the example above with ω=2π(5 MHz), and using Q=100, an $A_o$=50 nm and an $A_s$=25 nm, the estimated slew rate is roughly 4 mm/sec. The inventors have produced cantilevers with rise times as fast as 10 usec for a 30 nm step, corresponding to a slew rate of roughly 3 mm/sec.

Cantilevers having these characteristics can be fabricated in a precisely controlled manner using an electro-chemical etch to define cantilever length. Control over cantilever length is greatly improved in comparison to prior known techniques that use highly doped silicon to produce the probes. Precise control is maintained over silicon tip mass and tip height. Short cantilevers can thus be more readily and reliably produced with high yield. In that regard, yield is further facilitated by providing patterned holding tabs that minimize unintentional dislodging of the resultant thin levered prove devices from the substrate.

Figure 18A:
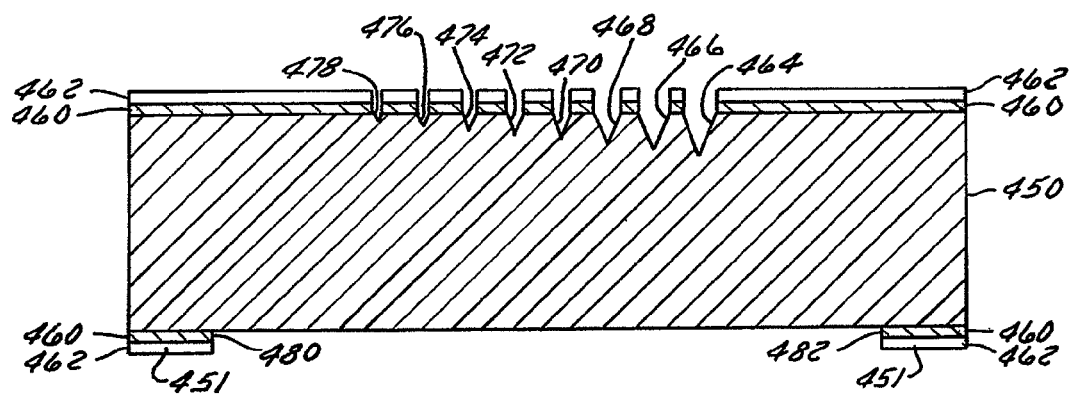
FIGS. 18A-18G schematically illustrate a procedure for producing a micro fabricated cantilever usable in a preferred embodiment of the present invention.

Turning now to FIG. 18A, using conventional thin film deposition and lithography techniques membrane thickness monitor windows are patterned on the wafer. In one embodiment, starting with a substrate such as a silicon wafer, a layer of oxide 60 (e.g., $SiO_2$) is deposited on the wafer, both sides, and then a layer of silicon nitride 62 is deposited on the oxide. The oxide and nitride act as etch masks for the following process steps. Next, a photoresist is spun onto the oxide and nitride layers and an appropriate mask (not shown) is used to pattern the monitor features on the wafer. More particularly, an array of windows (not shown) are patterned onto the top surface of the substrate. Thereafter, the silicon is etched anisotropically through array 452 of windows 454 so that membrane thickness monitor features 464-478 in the shape of V-grooves are formed as the etch terminates on the planes of the silicon crystal associated with the end points of the width "w" of the features. Again, the V-grooves have known depths directly related to the widths of the tip height features.

Figure 18B:
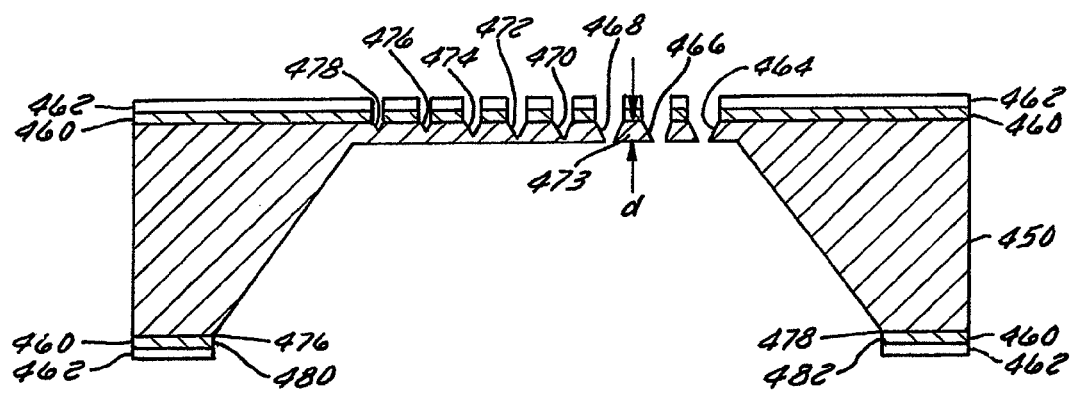

Next, large windows corresponding to the one or more arrays 452 are patterned on the backside of the wafer. The edges 480, 482 of these windows are shown schematically in FIG. 4B. The large windows on the backside are correspondingly aligned to one or more of the membrane thickness monitor arrays 452 using standard alignment features and standard front to backside alignment equipment, for example, a stepper using a frontside-backside aligner from the Karl Suss Co. In particular, the major axis of window 456 is positioned substantially perpendicular to the major axes of front side windows 454. This alignment is accomplished so that window 456 accommodates an etch through the wafer directly below membrane thickness monitor array 452, as shown in FIG. 18B.

More particularly, in process, the back side etch is monitored visually from the front side, typically using illumination from the front or back sides. The etch is stopped when the V-groove having a depth corresponding to a selected desired thickness d of monitor membrane 473 (which is directly related to tip height) breaks through to the backside of the wafer, as shown in FIG. 18B. Alternatively, the timing at which deeper V-grooves (for instance, V-groove 468 for desired V-groove 472) break through can be used to predict the appropriate time to stop the etch, i.e., an etch rate can be determined based on visual monitoring of V-groove break through and using that information to determine about when to terminate the etch.

At the same time monitor membrane(s) 473 is being formed, device membranes 515 (shown in FIG. 18C) of the probes of the array of probes being fabricated are etched with a thickness that is substantially the same as the thickness "d" of monitor membrane 473. Again, it is this thickness d of device membrane 515 that is used to control the AFM probe tip height.

Figure 18C:
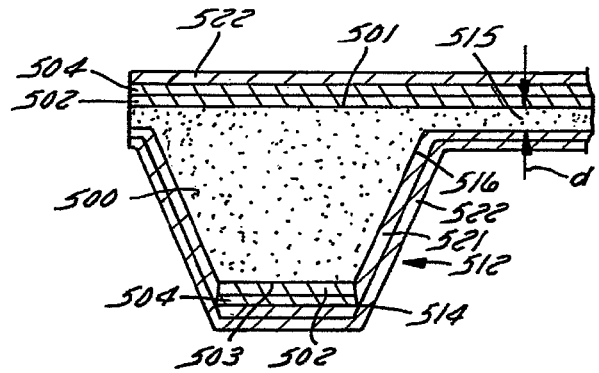

This formation of the probe is described in further detail and illustrated schematically in FIGS. 18C-18F. Referring initially to FIG. 18C, layers of silicon dioxide 502 and silicon nitride 504 remain on the wafer 500, both front and back sides, once the monitor membrane 473 is formed to a desired thickness d. In producing membrane 473 with the back side etch, a structure 512 also results. Structure 512 forms the base of the probe, described further below, which also substantially defines the location of a fixed end 516 of what ultimately will become the cantilever of each probe.

At this point, a layer of silicon nitride 522 is deposited on the silicon substrate, front and back sides 501, 503, the nitride 522 ultimately being processed to form the cantilever. The formation of nitride layer 522 is important in that the thickness of the layer determines the thickness of the cantilever which as noted earlier is a factor in determining the performance characteristics of the probe, including its fundamental resonant frequency. By controlling the thickness of the nitride deposition, the cantilever can be made thinner to facilitate a more optimum probe resonant frequency, thus allowing the probe, and the AFM as a whole, to have a higher bandwidth. Nitride thickness may be monitored using any thin film measurement tool, including, for example, an ellipsometer or another similar tool, such as optical tools that measure reflectivity. Alternatively, fourier transform spectroscopy (FTIR), which employs infrared interferometry to measure the thickness of the film, may be employed.

To deposit the nitride 522, low pressure chemical vapor deposition (LPCVD) may be used. LPCVD advantageously provides a nitride layer 522 that is low stress, thereby minimizing the adverse affects inherent to prior SPM probes fabricated, for example, with high stress silicon levers. High stress silicon levers most often require that the stress be compensated (accommodate lever bending, for instance), thus adding further complexity to the design, and ultimately limiting performance.

Substantially even thickness can be maintained in a range dependent on the length of the lever and the desired fundamental resonant frequency. With the present silicon nitride levers, lever thicknesses less than two microns are desired, thicknesses less than one micron are possible, with a corresponding tolerance of about 6% or about 0.1 micron. This precise control over lever thickness further facilitates yield, with the present embodiments being able to maintain uniform cantilever thickness within the stated tolerances across a wafer, as well as between wafers.

Prior to the deposition of the silicon nitride layer 522, a support film or layer 521 (e.g., silicon dioxide, a metal, a polymer) can be deposited, as an option. Support film 521 (a metal or a polymer, for instance) may be deposited prior to the nitride 522 to give the membrane 515 more structural integrity and/or to provide an etch stop for the formation of the cantilever. By reinforcing the probe in this way, the patterning of the tip (which occurs in the next step shown in FIG. 18D), can be re-run without compromising the integrity of the device membrane 515. This patterning and re-patterning may be performed if it is determined that initial alignment will not yield cantilevers having the desired length. Ideal positioning of the patterned tip, including the improved accuracy achieved over known techniques, is described further below.

Figure 18D:
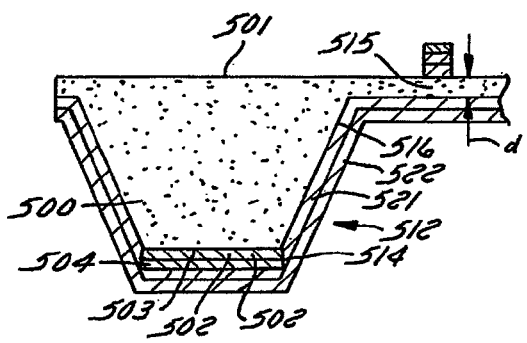
Figure 18E:
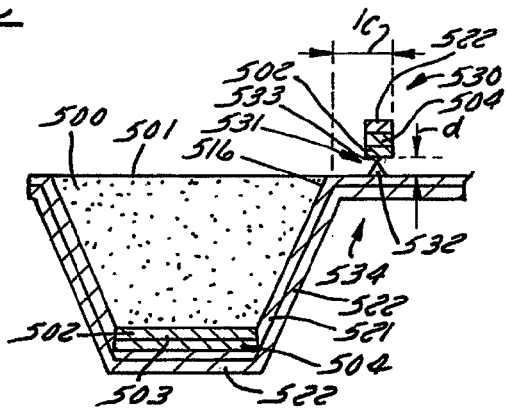

A tip feature 531 is then patterned onto the front side of the substrate as illustrated in FIG. 18D, in this case using global alignment marks. Then, as shown in FIG. 18E, an anisotropic etch is used on the front side to form the generally pyramid-shaped tip. In this case, the width of the base of the tip is substantially defined by the width of the pattern imaged onto the front side silicon nitride 522 (as well as the silicon oxide 502 and nitride 504 therebelow).

More specifically, when performing the front side etch in this way, the geometry of the resultant tip structure typically includes two pyramid-shaped structures 532, 533, disposed one on top of the other, tip-to-tip. Once the etch is complete, the oxide 502, nitride 504, and nitride 522 layers are removed thus causing the top pyramid-shaped structure 533 to be removed as well. This leaves a high aspect ratio tip 532 having a height equal to about two-thirds of the membrane thickness d results. This formation of the tip using an anisotropic etch to terminate the etch on particle facets of the substrate structure (i.e., crystal structure) facilitates producing tips with greater aspect ratios than known techniques that typically yield tips with rounded distal ends by patterning the surfaces of the tip with conventional lithography techniques.

When patterning the tip, especially for the high-speed AFM applications contemplated by the present invention, the location of this patterning is important to establishing overall device geometry, most notably cantilever length, $l_c$. The location of the tip relative to the fixed end of the lever substantially defines the effective length of the lever (except overhang, discussed below), and thus impacts the performance characteristics (e.g., resonant frequency) of the probe. In this regard, the user first patterns the tip based on global mask alignment associated with producing an array of probes. Once written, however, the distance between the patterned tip feature 531 and the fixed end 516 of the cantilever may be less than ideal for achieving the goals of the preferred embodiments. Fortunately, the fixed end of the lever is generally visible from the front side 501. The fixed end of the cantilever, point 116 on the backside, is visible because the deposited silicon nitride film is substantially transparent, unlike those methods for producing probes having silicon levers. Notably, to further facilitate this viewing, illumination (front or backside) is typically employed.

With point 516 known, the distance between the fixed end 516 and the patterned tip can be relatively accurately measured from the front side. Advantageously, cantilever length can then be substantially confirmed prior to etching the silicon to form the tip. In the event that the alignment between tip feature 531 and fixed end 516 is not acceptable, the probe fabricator can strip tip feature 531 from the front side and make appropriate position adjustments and re-write the feature in an attempt to produce the desired separation between the tip and the fixed end of the lever. This process can be repeated several times if needed to achieve the desired location of the patterned tip. As noted above, however, multiple stripping and re-writing steps can compromise the integrity of the device membrane, and thus that of the silicon nitride lever. As a result, and as also noted previously, an oxide layer (or a metal or another suitable film) may be used to reinforce the lever to resist membrane rupture during processing.

Figure 18F:
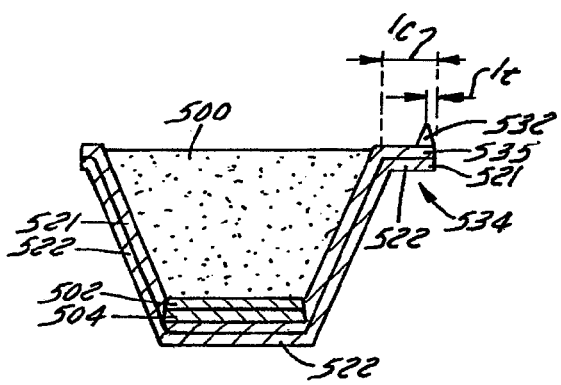
Figure 18G:
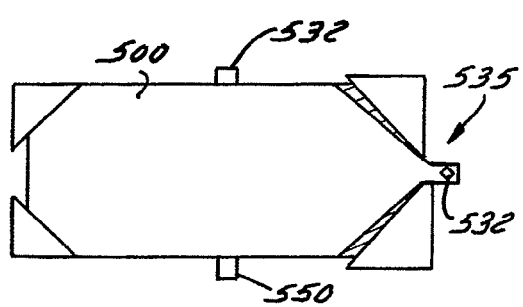

In sum, the tip masks can be positioned to pattern tips which can thereafter be measured, in-situ, to determine their location relative to the fixed end of the corresponding levers. As a result, the present techniques can be used to repeatedly and reliably produce sub-50 micron probe cantilevers 534 (FIGS. 18F and 18G). Ideally, probes having cantilevers with lengths that are less than about 50 microns, and even less than about 10 microns, can be repeatedly produced, across wafers. Moreover, fundamental resonant frequencies greater than 700 KH$_z$, or greater than 1 MHz, or even greater than 5 MHz, can be realized with the present probes, with quality factors Q less than 100 in air when the tip is interacting with the sample.

Turning to FIG. 18F, the cantilever is then patterned and etched from the back side, thus yielding, for example, the structure show schematically in FIG. 18G. Referring more specifically to FIG. 18F, with the tip 532 formed, the size and shape of the lever is patterned on the back side. A free or distal end 535 of what will become lever 534 is patterned with appropriate masking and defines an overhang or tip offset, $l_t$, defined as the distance between end 535 and an axis through the apex of the tip and generally orthogonal to the lever. Tip offset, similar to the other probe geometry discussed herein, is important to the overall performance substantially characteristics of the probe and can significantly limit the speed at which the SPM can reliably image a sample if made too large.

Using the present techniques, tip offset, $l_t$, can be maintained within at least about 5 um of the free end 532 of the fabricated lever. Notably, the tip is pyramid-shaped and the outside edge of the base of the pyramid may lie substantially in line with the outer edge of the free end of the lever. As understood in the art, for optimum AFM operation, only the tip of the probe interacts with the sample, therefore, by maintaining tip offset, $l_t$, less than about 5 microns the chance that the free end 135 of the probe interacts with the sample during AFM operation is significantly reduced over previous techniques, which typically produce probes with much larger, and less reliably controllable, overhang.

Ideally, the amount of overhang is controlled during probe fabrication. Notably, tip offset be reliably controlled using a stepper with a frontside-backside aligner, the tool having at least 100 nm position accuracy. However, such equipment is expensive. Therefore, other conventional alignment techniques may be used. According to one alternative, the resist used to pattern the lever may be a negative photoresist which produces a mask that is transparent when patterning the lever. In this way, with tip 532 visible, the mask may be positioned so that the distal end 535 can be accurately placed so that offset, $l_t$, can be carefully controlled.

Figure 19A:
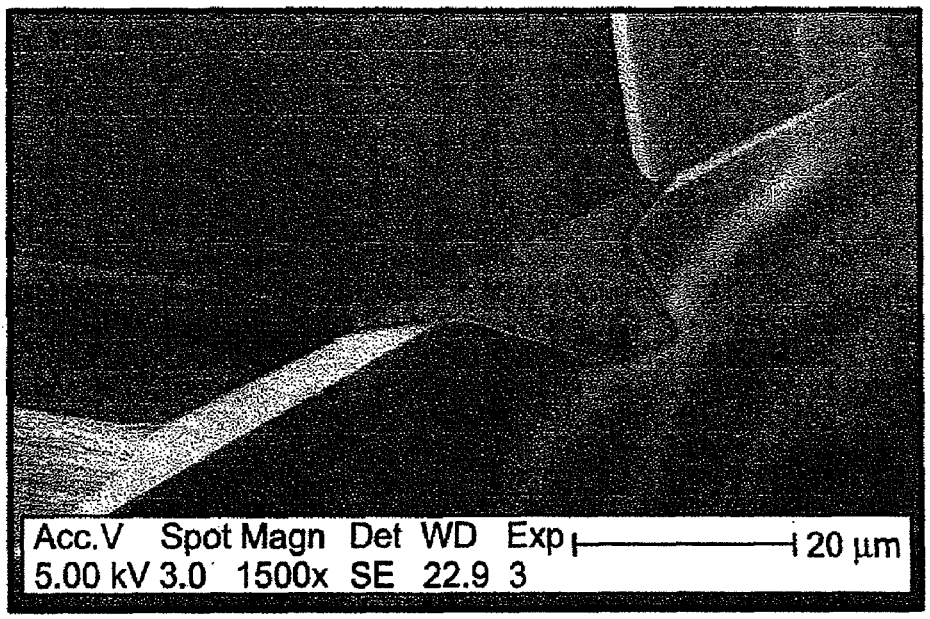
FIGS. 19A and 19B are a bottom plan and a side elevation view, respectively, of a cantilever produced using the procedure illustrated schematically in FIGS. 19A-20E.
Figure 19B:
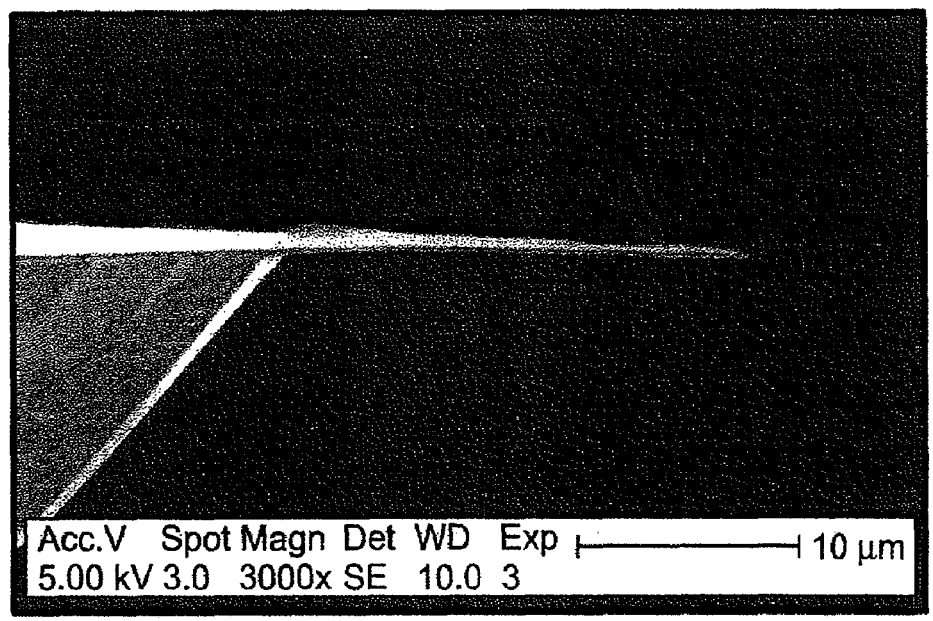

An image of a cantilever produced according to the preferred embodiments is shown in FIG. 19A in which a sub-30 micron cantilever length is produced with a tip height less than about 10 microns. FIG. 19B illustrates the probe of FIG. 19A from the side. Overall, by using the present techniques, cantilever size and shape can be precisely and repeatedly controlled to produce high yield levers suitable for high speed AFM operation. Moreover, probes having sub-50 micron cantilever length can be maintained even among several wafers with a standard deviation of less than about 0.5 microns.

The above-described technique is described in more detail in commonly assigned U.S. patent application Ser. No. 11/833,104, entitled *Probe Device for a Metrology Instrument and Method of Fabricating the Same* and filed Aug. 2, 2007. The subject matter of which is hereby incorporated by reference in its entirety.

Figure 20B:
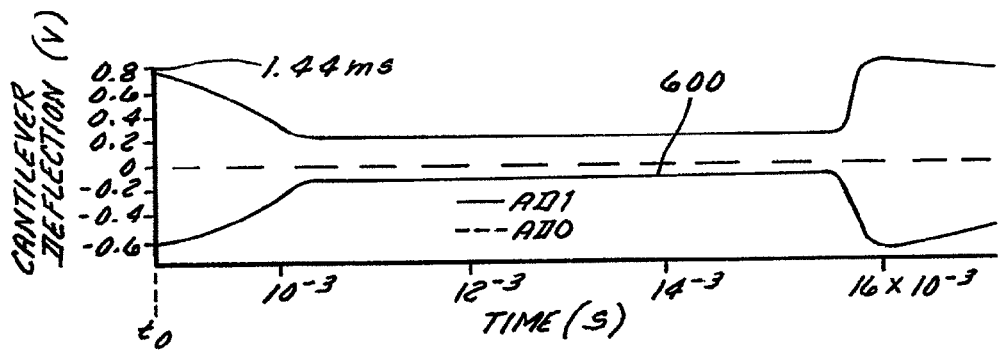
FIGS. 20A and 20B are force response curves for a cantilever used in the preferred embodiment of the present invention and a prior art cantilever, respectively.
Figure 20A:
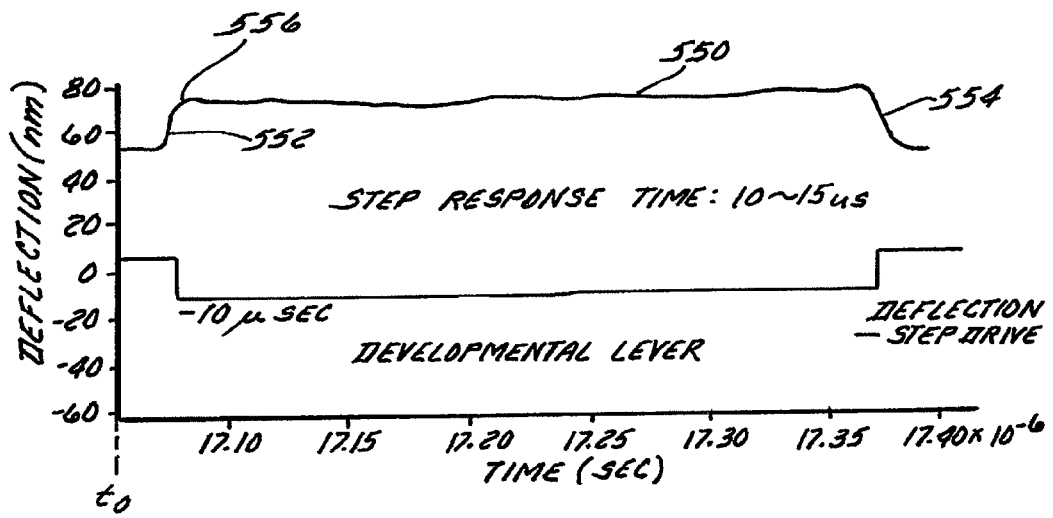

A probe produced using the micro-fabrication technique described above can have a force detection bandwidth greater than 30 kHz, preferably greater than 100 kHz, and even more preferably greater than 500 kHz. It also applies a very low force to the sample when activated in TappingMode. This force can be less than 10 nN and preferably less than 5 nN. The resulting probe has a step response time of less than 100 μsec, preferably less than 50 μs, and even more preferably on the order of 10-15 μsec. A step response time of on the order of 10 μs has been demonstrated with a micro fabricated cantilever of the type described above as noted by the steps 552 and 554 in the curve 550 of FIG. 20A. To generate the curve, the cantilever was oscillated in TappingMode operational mode at a frequency of around 1 MHz. The point 556 on curve 550 indicates that the encountering of a step such as a semiconductor line or trench is translated into corresponding cantilever deflection within about 10 μsec of encountering that step. In sharp contrast, referring to the curve 600 in FIG. 20B, a traditional cantilever operates in TappingMode at a frequency of 350 kHz does not reflect in corresponding cantilever deflection until more than 10 ms after the encounter. A small, fast cantilever therefore exhibits an increase in response time of a factor of about 1000.

6. Strain Gauge Sensors

As discussed in Section 3 above, the position sensors for the tip scanner may comprise small strain gauge sensors mounted on the x-y actuator 224. In addition to providing very precise position information, such sensors have the advantages of being relatively low cost, having low mass and therefore having negligible impact on the lowest fundamental resonant frequency of the tip scanner, and having small heat dissipation and therefore having negligible effect on scanner drift. It should be emphasized that the particular arrangement described is but one of many different contact and non-contact sensors that could be used to monitor the position of the tip scanner in the x-y plane. In addition similar sensors could be used to monitor the position of the tip scanner in the z direction and/or the sample scanner in the x, y, and/or z directions.

Figure 21:
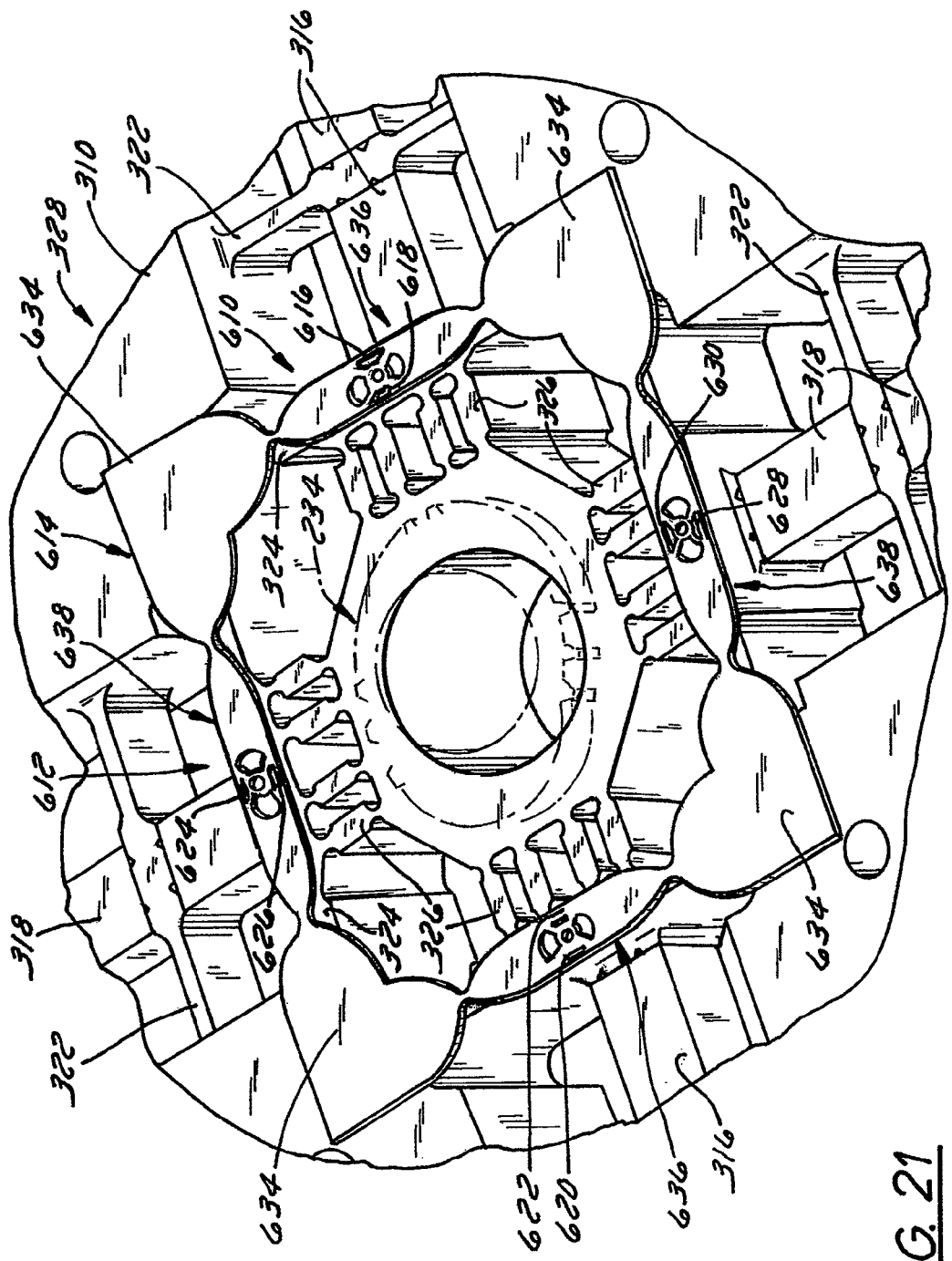
FIG. 21 is a perspective view of a strain gauge sensor assembly usable to monitor operation of the tip scanner of FIGS. 12-15.

Returning now to FIGS. 21-23 and initially to FIG. 21, the sensors 328 may comprise first and second sets of strain gauges 610 and 612 configured to monitor the position of the moving portions of the xy actuator 224, and hence the position of the tip scanner, in the x and y directions, respectively. The strain gauges 610 and 612 are mounted on a common generally rectangular frame 614 extending around the objective 234. The first strain gauge set 610 comprises four strain gauges 616, 618, 620, 622 arranged in two pairs, with each pair located on opposite sides of the objective 234 and being supported on the innermost flexures 324 for the x actuators 316. The second strain gauge set 612 similarly comprises four strain gauges 624, 626, 628, and 630 arranged in two pairs with each pair located on opposite sides of the objective 234 and being supported on the innermost flexures 324 for the y actuators 318. The strain gauges of each set 610 and 612 are wired together in a Wheatstone bridge configuration. The individual strain gauges may take any suitable form. They should have relatively high sensitivity through the desired range of actuator movement and relatively low noise. Semiconductor strain gauges are utilized in the present embodiment, but metal film strain gauges or alternative devices that change resistance as a function of strain could be used as well.

The support frame 614 preferably provides minimal resistance to actuator movement while constraining motion of the strain gauges to the intended direction. It also preferably maximizes the strain on the gauges in the intended direction to maximize sensitivity. The support frame 614 of the present embodiment comprises a thin metal frame mounted on the flexures 324 and the scanner stage 310. It could be formed of any of a variety of relatively rigid materials such as aluminum, invar, or titanium. The support frame 614 of the present embodiment is formed from photo-lithographically-etched stainless steel having a thickness of about 0.020". The support frame 614 comprises four relatively massive corner mounting portions 634 coupled to one another by two sets of mutually perpendicular strain gauge support arms 636 and 638. The corner mounting portions 634 are mounted on the scanner stage 310 by screws, adhesives, or other suitable measures. The strain gauge support arms 636 and 638 may be mounted on the flexures 324 by screws as described below, or by adhesives or other measures. Regardless of the mounting technique chosen, care should be taken not to prestrain the frame 614 when mounting it on the flexures 324 and the scanner stage 310.

All of the support arms 636 and 638 of the frame 614 are of at least essentially identical instruction. One support arm of the first set 636 will now be described with reference to FIGS. 22A and 22B, it being understood that the description applies equally to the other support arm of the first set 636 and both support arms of the second set 638. The support arm of this embodiment is configured to provide high symmetry so that the strain gauges 616 and 618 mounted on it are subjected to tension and compression, respectively, of generally equal magnitude. Support arm 636 comprises a relatively long, wide support segment 640 connected to the associated mounting portions 634 by first and second relative short, narrow connecting portions 642, 644.

The connecting portions 642 and 644 provide pivot points for connecting the support segment 640 to the corner mounting portions 634. They, in combination with the support segment 640, are configured to minimize the areas that are under strain in order to minimize the amount of work required to deform the strain gauges 616 and 618. Hence, deformation is constrained to the areas containing the strain gauges 616 and 618, hence maximizing the range of actuator motion that may be monitored. To achieve this effect, the connecting portions 642 and 644 would ideally be two geometric points of zero mass about which the central support segment 640 pivots. They of course need to be wider than that to survive the pivoting process. The minimum width of each end portion 642 and 644 and the taper from that point to the central support segment 640 and to the corner mount 634, respectively, may be determined, e.g., by finite element analysis.

Figure 22A:
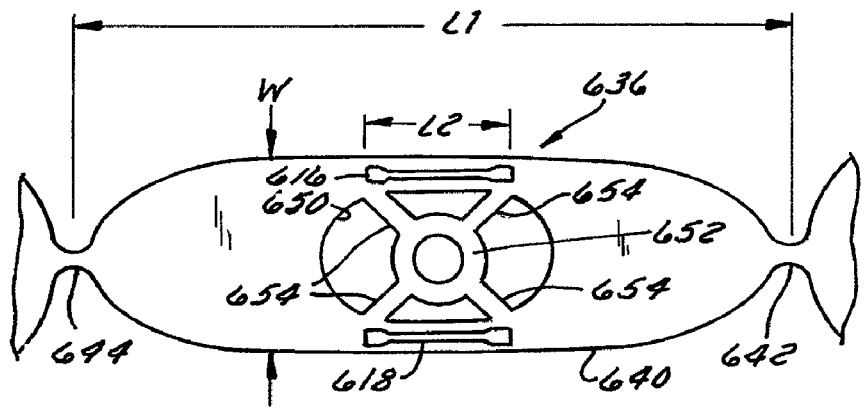
FIGS. 22A and 22B are top plan views of portions of the strain gauge sensor assembly of FIG. 21.
Figure 22B:
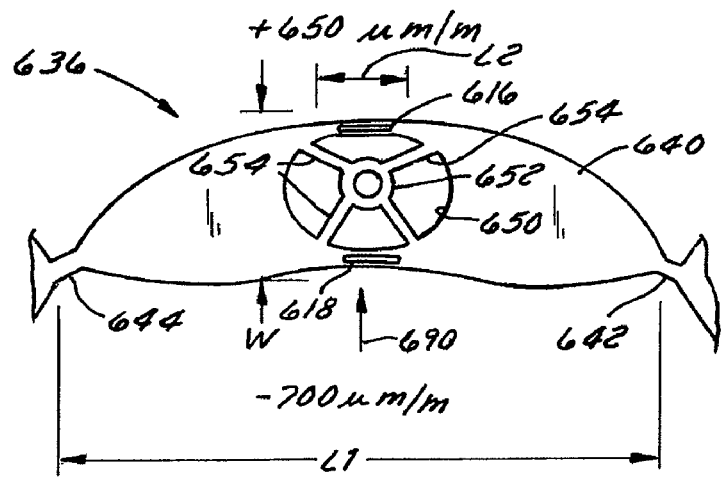

Still referring to FIGS. 22A and 22B, the support segment 640 has a longitudinal length L1 and a lateral width W. The strain gauges 616 and 618 each have a length L2 and extend in parallel with the longitudinal axis of the support segment 640. In order to maximize linearity, the length L1 should be maximized within the constraints of the scale of the x-y actuator 224 to maximize linearity. L2 should be minimized to maximize strain on the strain gauge 616 and 618 and to maximize the signal per unit work. However, since extremely small strain gauges tend to be relatively noisy, there is a practical limit to the amount that L2 can be reduced while still achieving an acceptable signal to noise ratio. W may be empirically determined, using a finite element analysis in conjunction with the determination of L1 and L2, to maintain linear deformation of the strain gauges 616 and 618 over the range of movement of the actuators 316. Stated another way, it is optimized for a desired strain range. In the illustrated embodiment, it is optimized for a strain of 600-700 microns/meter. Using these design parameters, the lengths L1 and L2 and width W are 0.84", 0.06", and 0.20", respectively.

Still referring to FIGS. 22A and 22B, the strain gauges 616 and 618 are mounted on relatively narrow strips on opposite sides of an ovoid opening 650 in the central support segment 640. An annular mounting portion 652 is located in the opening 650 and is connected to the remainder of the support segment 650 by a number of legs 654 extending outwardly from the mounting portion 652. The mounting portion 652 receives a screw (not shown) connecting the support segment 640 to the underlying flexure 324. The legs 654 of this embodiment extend at acute angles relative to the x and y directions so as not to be subject to kinking or buckling forces that would otherwise occur upon support segments deformation (seen in exaggerated fashion in FIG. 22B) and, hence, to minimize resistance to actuator motion. Four legs 654 are provided in the illustrated embodiment and extend at angles of 45 degrees relative to the x and y axes, but more or fewer legs could be provided that extend at different angles.

With this arrangement, movement of the x actuators 316 compresses one of the strain gauges of each set and tensions the other strain gauge as seen in FIG. 23B. The geometry and compliance of the frame 614 provides relatively high sensitivity to actuator movement. In the illustrated embodiment, movement of the actuator in the direction of arrow 690 in FIG. 23B compresses the strain gauge 618 about 700 microns/meter and tensions strain gauge 616 about 650 microns/meter. Referring to FIG. 22, the strain gauges 622 and 620 are similarly compressed and tensioned, respectively.

Figure 23:
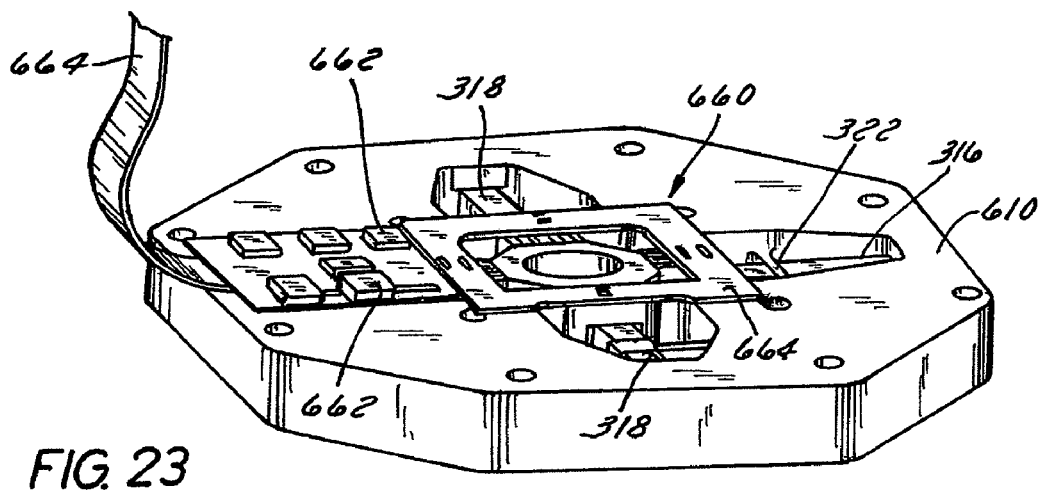
FIG. 23 is a perspective view of a portion of a tip scanner including a strain gauge sensor assembly of FIG. 21 and illustrating a flexible cabling device that is used to provide electrical connections between the various strain gauges and readout electronic components.

Referring now to FIG. 23, a flexible cabling device 660 such as Kapton circuit may be mounted on the frame 614 to provide electrical connections between the various strain gauges 616-630 to form the Wheatstone bridges and between the Wheatstone bridges and readout electronically components 662. The Kapton circuit of this embodiment is generally co-extensive with the frame 614 and has openings through which the strain gauges 616-630 protrude. The ends of the strain gauges are electrically connected to the Kapton circuit by, for example, wire bonding or soldering. The readout circuitry 662, typically including a strain gauge pre-amplifier and may be wired to the Kapton circuit before or after its installation on the frame 614. The Kapton circuit is electronically connected to the controller 102 by a cable 664.

7. Feed Forward/Feedback Control

Figure 24:
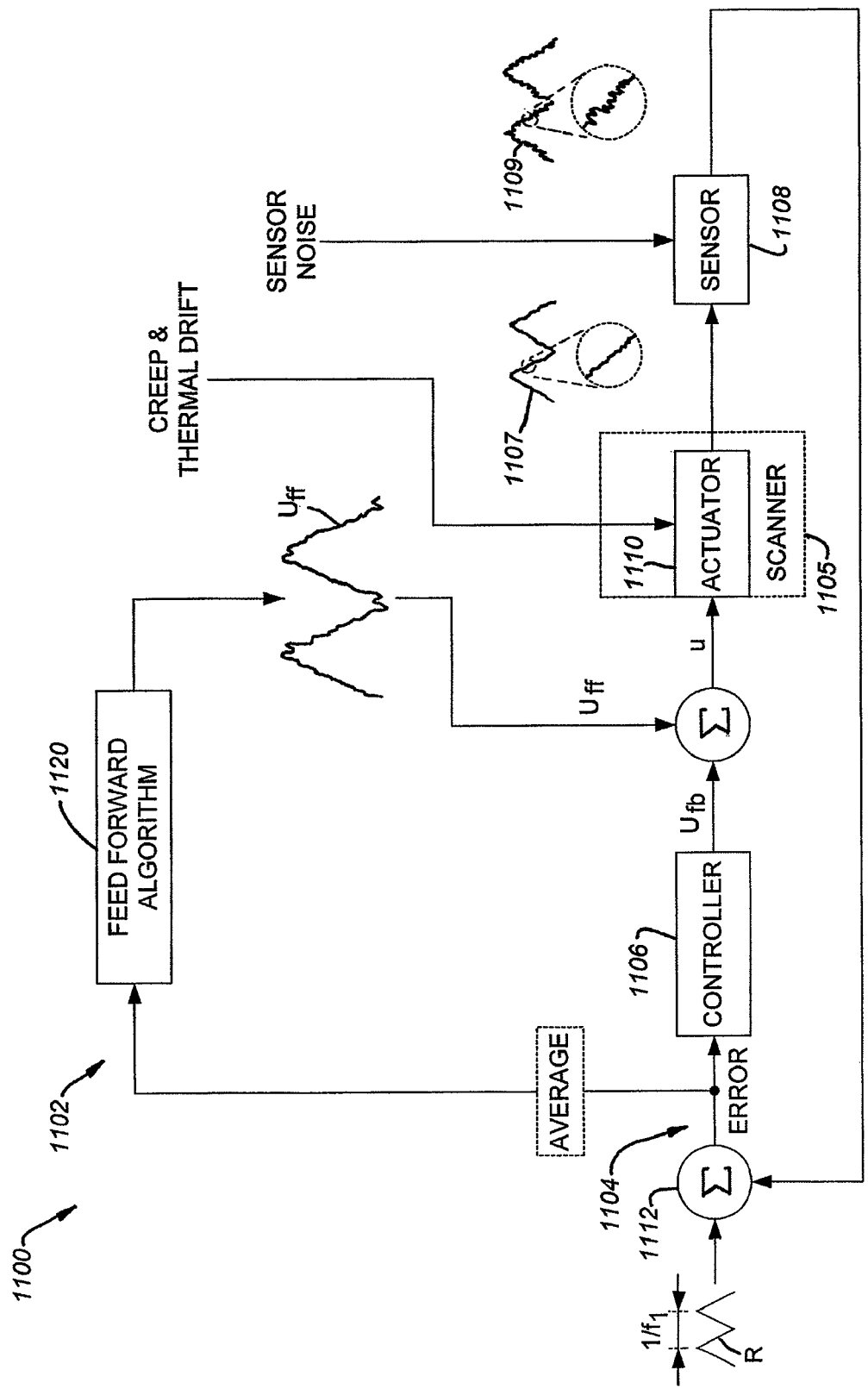
FIG. 24 schematically illustrates the components of a feed forward-feedback control loop usable in a preferred embodiment of the present invention.

We will now describe one implementation of a controller that operates at a high scan frequency and that minimizes the effects of creep, thermal drift and the dynamics of xy scanner while rejecting position sensor noise. As shown in FIG. 24 controller 1100 is configured to employ a reference waveform, signal, or dataset "R" (for example, a triangle wave) representative of the desired scanning motion which, during operation, is compared to the measured motion of an actuator 1110 of a scanner 1105 using a comparison block 1112. Controller 1100 in this embodiment employs a relatively slow feedback loop 1104 that compensates for position errors from low frequency sources like creep and drift, as well as a feed forward loop 1102 that compensates for scanner dynamics and/or nonlinearities.

When scanner 1105 performs zig-zag raster scanning the turn around motion corresponds to a large increase in deceleration and acceleration force. Such force, as described previously, contains many high frequency excitations which can cause the scanner to resonate uncontrollably. When such resonant motion is superimposed on the linear motion of the scanner, the image will be distorted, showing ripples in the data adjacent to the turn around corner. Severe resonance can lead to a ripple effect throughout the entire image. To reduce the impact of a sharp corner at the turn around, the reference waveform R may be low pass filtered to produce a rounded shape at the peaks. In one embodiment, the reference waveform R is synthesized by summing together the first four Fourier terms of a triangle wave at the scan frequency $f_1$. The first four Fourier components including the fundamental $f_1$ and three overtones at $3f_1$, $5f_1$, and $7f_1$ give a good approximation of a linear triangle wave, with the possible exception of a smoother transition at the peaks. It is possible to use more or fewer Fourier components depending on the desired tradeoff between linearity and impulse forces at the turn-around. In one embodiment, a window technique, for example but not limited to a Hanning window, is used to adjust the Fourier components to reduce the amount of ripple caused by the finite number of Fourier components. The ripple amplitude can be reduced to $\frac{1}{20}^{th}$ of the ripple amplitude by applying such a window.

The division of labor between the feedback and feed forward loops is possible because thermal drift and piezo creep typically occur at substantially different times than scanner motion and scanner dynamics. Thermal drift and piezo creep have time constants on the scale of seconds to hours, corresponding to frequencies of about 0.1 Hz to $10^{-5}$ Hz. On the other hand, typical conventional AFMs have scanner dynamics in the range of $10^2$ Hz range with fast AFMs having dynamics in the $10^3$ to $10^4$ Hz or higher. Typical AFM scan speeds range from roughly 0.1 Hz to 10 Hz for conventional AFMs, and up to 10 Hz to $10^4$ Hz for higher speed AFMs. Thus the low bandwidth feedback loop is generally selected arranged to have a bandwidth of less than the scan frequency, but higher than the frequency associated with drift and creep. As an example, for an SPM system scanning at 30 Hz, a feedback bandwidth of 1 Hz is well above that required to compensate for drift and creep, but still well below the scan frequency. In the current embodiment the low bandwidth of the feedback loop substantially attenuates the effect of the sensor noise to scanner/actuator motion.

To illustrate this effect with an example, consider a scanner operating at a scan frequency $f_1$ of 10 Hz and subjected to a random sensor noise. To faithfully reproduce a triangle wave reference waveform, the closed loop bandwidth is at least several times the frequency of the reference waveform. If, as described above, it is desirable to have at least the first four Fourier components of the triangle wave well reproduced, then the prior art feedback loop would need to have a scan bandwidth of $7f_1$, or roughly 70 Hz. If however, the feedback loop is only required to compensate for creep and/or drift, a bandwidth of 0.1 Hz may be chosen, for example. In a simple case, the sensor noise is a white noise. So cutting the feedback bandwidth from 70 Hz to 0.1 Hz may result in attenuating the impact of sensor noise on actuator position by a factor of $$\sqrt{\frac{70}{0.1}} = 26.$$

For a high speed AFM, operating at a scan frequency of say 500 Hz, the improvement in sensor noise impact could be almost a factor of 200 over previously known feedback loop architectures.

Note that the bandwidth of $7f_1$ used in this example to estimate the noise attenuation figure is not required for the present invention. Instead, it is simply used as a convenient benchmark to estimate the reduction in the impact of the sensor noise on the actuator position. A scan bandwidth can be selected to be larger or smaller than $7f_1$ depending on the accuracy desired for the scan waveform. Higher scan bandwidths increase the number of Fourier components used to construct the scan waveform.

Noise in actuator position may be measured in any of several ways. It is possible, for example, to measure the voltage noise of the control signal u (FIG. 24) that drives the actuator, and multiply this by the actuator sensitivity. The total noise in a specified noise bandwidth can be used to characterize the noise performance of the system. Note that we distinguish the term "scan bandwidth" from "noise bandwidth." Noise bandwidth defines the bandwidth over which a noise measurement is performed. By specifying a noise bandwidth for noise evaluation purposes, we are not implying that the system's scan bandwidth be the same. Also note that the generally triangular waveform would be removed from the data prior to a noise analysis.

Alternatively, one can measure the noise in the location of a topographic feature, for example the position of a step edge on a graphite surface as observed in a SPM image. A traditional closed loop AFM image may show noise of one to several nm on such a step edge, while the current invention can achieve noise of less than 1 Å, on par with the operation of a quality open loop scanner.

Returning to the feedback system, loop 104 employs a closed loop feedback controller 1106 (a PI control block, for instance, implemented digitally or with analog circuitry), and a sensor 1108 which yields a signal 1109 representative of detected motion of a scan actuator 1110 in response to the input signal, u. Note the large noise component associated with the detected motion 1109. It is this noise that introduces noise in the actuator position. However, when using the controller of this embodiment, the actuator position, as represented by signal 1107, follows the trajectory of desired scanning motion as represented by reference R. Overall, contrary to known AFM controllers, noise associated with actuator position (signal 1107) compared to the noise associated with the detected motion (signal 1109) is dramatically reduced, as shown schematically (exploded) in FIG. 24.

In one embodiment, closed loop feedback controller 1106 contains only integral gain for high rejection of sensor noise and low steady state error. In this embodiment, the value of the integral gain is set to provide a control bandwidth sufficiently low to allow substantial rejection of sensor noise, yet sufficiently high bandwidth to compensate for low frequency creep and/or drift. In this embodiment, the integral gain is set such that the feedback bandwidth is generally lower than the scan frequency. Alternatively, controller 1106 may be a PI or PID controller, for example. It may also be a more complex model-based controller that uses prior knowledge about the system properties, nonlinearities and/or hysteretic behavior in addition to feedback.

Based on the position error determined by comparison block 1112 feedback controller 1106 generates an appropriate control signal, $u_{fb}$. Comparison block 1112 may comprise analog circuitry and/or digital computation element(s) that create a signal and/or data representative of the error between the reference waveform and the measured actuator trajectory. (Note that the contribution to u from feed forward branch 1102 (i.e., $u_{ff}$) will be discussed below.) Controller 1106, and specifically $u_{fb}$, operates to compensate the low frequency position error between reference signal "R" defining desired scanner motion and actual scan actuator scanner motion as represented by the output signal of sensor 1108. As a result, adverse effects on relative probe-sample positioning due to creep and/or thermal drift are minimized. Moreover, by operating at low bandwidth, the adverse positioning effects of the sensor noise (high frequency noise) on the control signal, u, and thus on actuator motion, are minimized, as described above. In one embodiment, the actuators 1110 for the x, y and z axes are piezoelectric stacks coupled to flexures with different amounts of stiffness, as described in copending application Ser. No. 11/687,304, filed Mar. 16, 2007, entitled "Fast-Scanning SPM Scanner and Method of Operating Same." However, the actuators can also employ any number of alternative actuation technologies, including but not limited to, piezoelectric tubes or other piezoelectric devices, actuators formed from electrostrictive, magnetorstrictive, electrostatic, inductive, and/or voice coil drive mechanisms and other actuators that generate motion in response to an input signal. Actuator 1110 may by itself make up a scanner, for example in the case of a piezoelectric tube. Actuator 1110 may also be a component of scanner 1105 that contains other components, for example, the flexure-based scanner showed in FIG. 24. In practice, the dynamics of both the actuator and the other scanner components can otherwise limit the maximum scan frequency. The current invention can be used to generate improved performance of both individual actuators and more complex scanner assemblies.

Position sensor 1108 most often produces a signal that is indicative of the position of actuator 1110. Suitable position sensors may also produce a signal that is indicative of actuator velocity which may then be integrated (e.g., by a processor) to determine the relative actuator position. Position sensors may be arranged to measure the motion of the actuator directly or the position of a separate reference point or surface that is moved by the actuator. Position sensor 1108 may further include a preamplifier and/or signal conditioning that amplify, linearize, and/or demodulate the raw signal from the sensor into one that can be better used by the controller.

We now turn to the operation of the feed forward algorithm. Referring again to FIG. 24, feed forward branch 1102 of controller 1100 utilizes a feed forward control algorithm 1120 to facilitate high speed scanning with minimized scanner resonance distortion. In general, a feed forward algorithm is an algorithm that uses prior knowledge of the properties of a system to estimate a control signal required to generate desired output. Feed forward control algorithm 1120 is described in further detail below, but primarily uses knowledge of the actuator (or scanner unit) dynamics (i.e., non-linearities, etc.) to generate a feed forward component, $u_{ff}$, of the scanner control signal u that drives actuator 1110 along a desired trajectory.

In one embodiment, actuator 1110 is exercised with a first estimate of a waveform $u_{ff}$ that will drive the actuator to approximate the reference waveform. This estimate can come from a prior measurement or an initial calibration step, for example. Controller 1100 updates the drive waveform $u_{ff}$ to minimize high frequency errors in scan position (output of comparison block 1112) by generating an updated scan control waveform $u_{ff}$. In one embodiment, the waveform $u_{ff}$ contains elements that suppress oscillation of parasitic resonances of the scanner and/or correct for non-linearities in the actuator. Known versions of feed forward control algorithms have been described generally in Stemmer, Schitter, Ando, Salapaka, Devasia, and Zou, for example G. Schitter et al., "A new control strategy for high-speed atomic force microscopy, Nanotechnology 15 (2004) 108-114; Q. Zou et al., "Control Issues in High-speed AFM for Biological Applications Collagen Imaging Example, Asian J Control 2004 Jun.; 6(2):164-178; and S. Devasia, et al., "Nonlinear Inversion-Based Output Tracking," IEEE Transactions on Automatic Control, Vol. 41, No. 7 (pp. 930-942) (1996), each of which is expressly incorporated by reference herein.

More particularly, in this case, the feed forward branch 1102 of controller 1100 operates to reduce, for example, are periodic errors, including high frequency position errors, by accounting for the dynamics (e.g., non-linearities) of actuator 1110 and/or overall scanner 1105 during AFM scanning. In one embodiment, feed forward algorithm 1120 is an adaptive algorithm, sometimes referred to hereinafter as an inversion-based iterative control (IIC) algorithm, that operates using sensor error to determine an appropriate control signal $u_{ff}$ for correcting position error. The IIC algorithm inverts the transfer function of the scanner or actuator. Based on the sensor error and previous control signals, IIC calculates a new control signal $u_{ff}$ that is likely to reduce the measured position errors over the scan. One such IIC algorithm is described by Zou et al. in "Precision tracking of driving wave forms for inertial reaction devices", Review of Scientific Instruments 76 023701 (pp. 203701-1-203701-9), (2005). In one embodiment, the scan control signal $u_{ff}$ is computed as a scan table, or an array of control values as a function of scan position and/or time. The scan table associated with the scan actuator is updated repeatedly to generate an appropriate $u_{ff}$ to minimize the position error as quickly as possible.

8. System Capabilities

As should be apparent from the above, the AFM as described above can perform very rapid scans while still obtaining high-quality images. In fact, when scanning with the tip scanner described above, sample features on the order of 0.5 Angstrom can be resolved at high quality while scanning along lines of 4, 5 or 10 µm or even longer at rates exceeding 30 Hz, preferably exceeding 50 Hz, and even more preferably exceeding 100 Hz. The system's force feedback controller, including the z actuator, the controller, and the detector, permits these scan rates to be achieved at a force control bandwidth, i.e., a bandwidth of the force control feedback used to control the z actuator, of at least 5 kHz, and even of 7 kHz to 10 kHz or more in TappingMode operation and 30 kHz or more in contact mode operation.

Examples of data storage samples include a hard disk head, a media surface, a rowbar, a slider, and a head wafer.

The quality of the information obtained under these conditions can be verified using several different criteria.

The process as discussed herein as well as other processes falling within the scope of the present invention could be used to scan a wide variety of samples, including but not limited to, a patterned wafer such as a semiconductor wafer, a thin film, a polymer, a biological sample, or a data storage component.

Other features and advantages of the invention will become apparent to those skilled in the art from the following claims.

The invention claimed is:

1. A method of operating a scanning probe microscope (SPM) comprising:
   actuating a piezoelectric actuator assembly to move a probe of the SPM to scan the probe past a sample through a scan range of at least 4 microns at a rate of at least 30 lines/sec and moving the probe in z a direction under control of a piezoelectric z actuator;
   measuring motion of the probe using a sensing light beam and a detector;
   moving at least one lens so that the sensing beam at least substantially follows the scanning motion of the probe; and
   controlling probe-sample interaction with a force control slew rate of at least 1 mm/sec; and
   at least one of storing, transmitting, and displaying at least one of the measurement and information derived from the measurement.

2. The method of claim 1, wherein the force control slew rate is at least 4 mm/sec.

3. The method of claim 1, wherein the force control slew rate is at least 7 mm /sec.

4. The method of claim 1, wherein the scanning is performed at a rate of at least 100 lines/sec.

5. The method of claim 4, wherein the scanning is performed at a rate of at least 1000 lines/sec.

6. The method of claim 1, wherein the scanning comprises scanning through a scan range of at least 10 µm.

7. The method of claim 6, wherein the scanning comprises scanning through a scan range of at least 20 µm.

8. The method of claim 1, wherein the scanning is performed with a force control bandwidth of at least 10 kHz.

9. The method of claim 1, wherein the generating step also causes the sample to move in the xy plane in a nested control relationship with probe movement.

10. The method of claim 1, wherein the controlling step further comprises moving the sample in the z direction in a nested control relationship with probe movement.

11. The method as reciting in claim 1, further comprising oscillating the probe.

12. The method of claim 11, wherein the controlling step comprises maintaining a probe oscillational amplitude at least generally constant.

13. The method of claim 11, wherein the controlling step comprises maintaining a probe oscillational phase at least generally constant.

14. The method of claim 1, wherein the sample is one of a patterned wafer, a biological sample, a data storage device component, a polymer, and a thin film.

15. A method of operating a scanning probe microscope (SPM) comprising:
- actuating a piezoelectric actuator assembly to move a probe of the SPM past a sample to scan the probe through a scan range of at least 4 microns at a rate of at least 30 lines/sec and moving the probe in a z direction under control of a piezoelectric z actuator;
- measuring motion of the probe using a sensing light beam and a detector;
- moving at least one lens so that the sensing beam at least substantially follows the scanning motion of the probe; and
- controlling probe-sample interaction with a force control bandwidth of at least 10 kHz; and
- at least one of storing, transmitting, and displaying at least one of the measurement and information derived from the measurement.

16. The method of claim 15, wherein the scanning is performed with a force control bandwidth of at least 20 kHz.

17. The method of claim 15, wherein the scanning is performed with a force control bandwidth of at least 50 kHz.

18. The method of claim 15, further comprising controlling probe-sample interaction with a force control slew rate of at least 1 mm/sec.

19. The method of claim 18, wherein the force control slew rate is at least 4 mm /sec.

20. A scanning probe microscope (SPM) comprising:
- a piezoelectric actuator assembly that moves probe of the SPM past a sample to scan the probe through a scan range of at least 4 microns at a rate of at least 30 lines/sec;
- a piezoelectric actuator that moves the probe in a z direction;
- means for measuring motion of the probe using a sensing light beam and a detector;
- means for moving at least one lens so that the sensing beam at least substantially follows the scanning motion of the probe; and
- means for controlling probe-sample interaction with a force control slew rate of at least 1 mm/sec.

21. The SPM of claim 20, further comprising means for at least one of storing, transmitting, and displaying at least one of the measurement and information derived from the measurement.

22. A scanning probe microscope (SPM) comprising:
- a scanner including 1) a piezoelectric actuator assembly that moves a probe of the SPM past a sample to scan the probe through a scan range of at least 4 microns at a rate of at least 30 lines/sec and 2) a piezoelectric actuator that moves the probe in a z direction;
- a sensing light beam and detector that measure motion of the probe;
- at least one lens disposed between the scanning light beam and the sample, the lens being movable to cause the sensing beam to at least substantially follow the scanning motion of the probe; and
- a controller that controls probe-sample interaction with a force control slew rate of at least 1 mm/sec.

23. The SPM of claim 22, further comprising a device that at least one of stores, transmits, and displays at least one of the measurement and information derived from the measurement.

24. The SPM of claim 22, wherein the probe has a force detection bandwidth greater than 30 kHz and applies a force to the sample of less than 10 nN when activated in oscillation mode.

25. The SPM of claim 22, wherein the probe has a force detection bandwidth greater than 100 kHz and applies a force to the sample of less than 5 nN when activated in oscillation mode.

26. The SPM of claim 22, wherein the probe has a step response time of about 10 μs.

* * * * *